United States Patent
Burns

(10) Patent No.: US 10,180,153 B2
(45) Date of Patent: *Jan. 15, 2019

(54) DEVICE FOR AND METHOD OF CONNECTING TWO ITEMS TOGETHER

(71) Applicant: Rotite Limited, Manchester (GB)

(72) Inventor: Stuart Burns, Manchester (GB)

(73) Assignee: Rotite Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,053

(22) Filed: Feb. 6, 2017

(65) Prior Publication Data

US 2017/0328394 A1    Nov. 16, 2017

Related U.S. Application Data

(63) Continuation of application No. 13/818,673, filed as application No. PCT/GB2011/051617 on Aug. 26, 2011, now Pat. No. 9,562,553.

(30) Foreign Application Priority Data

Aug. 26, 2010  (GB) .................................. 1014263.6

(51) Int. Cl.
  *F16B 7/18*   (2006.01)
  *F16B 21/02*  (2006.01)
  (Continued)

(52) U.S. Cl.
  CPC ................ *F16B 7/18* (2013.01); *F16B 7/182* (2013.01); *F16B 21/02* (2013.01); *F16B 33/02* (2013.01);
  (Continued)

(58) Field of Classification Search
  CPC .... F16D 1/02; F16B 33/02; F16B 7/18; F16B 7/182; F16B 7/20; F16B 21/02; Y10T 403/68; Y10T 403/7045
  (Continued)

(56) References Cited

U.S. PATENT DOCUMENTS 144,943 A * 11/1873 Ashworth ............. F16L 37/252
                                                                285/70
2,204,392 A *  6/1940 Arm ........................ F16B 7/20
                                                                285/119
(Continued)

FOREIGN PATENT DOCUMENTS

DE      4022299 A1   1/1992
WO   1982001830 A1   6/1982
WO   2008052245 A1   5/2008

OTHER PUBLICATIONS

International Search Report and Written Opinion of PCT/GB2011/051617 dated Feb. 21, 2012 from the EPO.
(Continued)

*Primary Examiner* — Joshua T Kennedy
(74) *Attorney, Agent, or Firm* — Thedford I. Hitaffer; Hitaffer & Hitaffer, PLLC

(57) ABSTRACT

A device includes first and second inter-engageable parts, each having a longitudinal axis and a connecting face extending substantially transversely to the longitudinal axis. The first part has an engagement formation extending substantially axially and the second part has a receiving formation extending substantially axially, and in which the engagement formation is receivable. The engagement and receiving formations each includes a substantially helicoidal surface extending at least partially around the longitudinal axis of the respective part of the connector, so that rotation of the parts relative to one another about the longitudinal axes, when the parts are substantially co-axially aligned, so that the connecting faces of the parts face one another in a substantially axial direction, causes engagement of the engagement formation with the corresponding receiving formation.

17 Claims, 50 Drawing Sheets

(51) Int. Cl.
*F16B 33/02* (2006.01)
*F16B 3/00* (2006.01)
*F16B 7/20* (2006.01)

(52) U.S. Cl.
CPC . *F16B 3/00* (2013.01); *F16B 7/20* (2013.01); *Y10T 29/49881* (2015.01); *Y10T 403/68* (2015.01)

(58) Field of Classification Search
USPC ....... 403/339–340, 381, 348, 353, 364, 343; 411/423
See application file for complete search history.

(56) References Cited

U.S. PATENT DOCUMENTS

| | | | |
|---|---|---|---|
| 2,206,223 A | 7/1940 | Dearborn | |
| 2,606,224 A * | 8/1952 | Modrey | H01R 13/623 439/272 |
| 3,104,896 A | 9/1963 | Kennedy, Jr. | |
| 3,557,574 A | 1/1971 | Avery | |
| 3,877,731 A | 4/1975 | Kraus et al. | |
| 3,918,823 A | 11/1975 | Alexander | |
| 4,435,104 A | 3/1984 | Held | |
| 4,878,695 A | 11/1989 | Whitham | |
| 5,149,255 A | 9/1992 | Young | |
| 5,184,851 A | 2/1993 | Sparling et al. | |
| 5,857,713 A | 1/1999 | Horimoto | |
| 5,987,287 A | 11/1999 | Huang | |
| 6,254,146 B1 * | 7/2001 | Church | E21B 17/042 285/334 |
| 6,537,625 B2 | 3/2003 | Flach | |
| 7,530,607 B2 | 5/2009 | Luft | |
| 8,061,923 B2 | 11/2011 | Simmons | |
| 8,267,436 B2 * | 9/2012 | Church | E21B 17/042 285/334 |
| 8,348,542 B2 * | 1/2013 | Church | E21B 17/04 403/296 |
| 8,925,331 B2 * | 1/2015 | Carrere | F23R 3/002 403/348 |
| 2002/0015815 A1 | 2/2002 | Flach et al. | |
| 2005/0123346 A1 | 6/2005 | Nakamura | |
| 2013/0170901 A1 | 7/2013 | Schuermann | |
| 2015/0328803 A1 * | 11/2015 | Burns | B29C 33/3857 264/482 |

OTHER PUBLICATIONS

State Intellectual Property Office of the People's Republic of China, Examination Report, dated Jul. 10, 2014, in Chinese Patent Application 201180051469.20, related to U.S. Appl. No. 13/818,673.

State Intellectual Property Office of the People's Republic of China, Second Examination Report, dated May 13, 2015, in Chinese Patent Application 201180051469.20, related to U.S. Appl. No. 13/818,673.

Intellectual Property Office of New Zealand, Examination Report, dated Sep. 4, 2013, in New Zealand Patent Application 608615, related to U.S. Appl. No. 13/818,673.

English Summary of the Examination Report, dated Jul. 10, 2014, in Chinese Patent Application 201180051469.20, related to U.S. Appl. No. 13/818,673 (Item 2 above).

UK Intellectual Property Office, Search Report in related application GB1014263.6 dated Dec. 14, 2010.

Office Action, dated Feb. 19, 2015, in U.S. Appl. No. 13/818,673, filed Feb. 25, 2013.

Office Action, dated Oct. 13, 2015, in U.S. Appl. No. 13/818,673, filed Feb. 25, 2013.

* cited by examiner

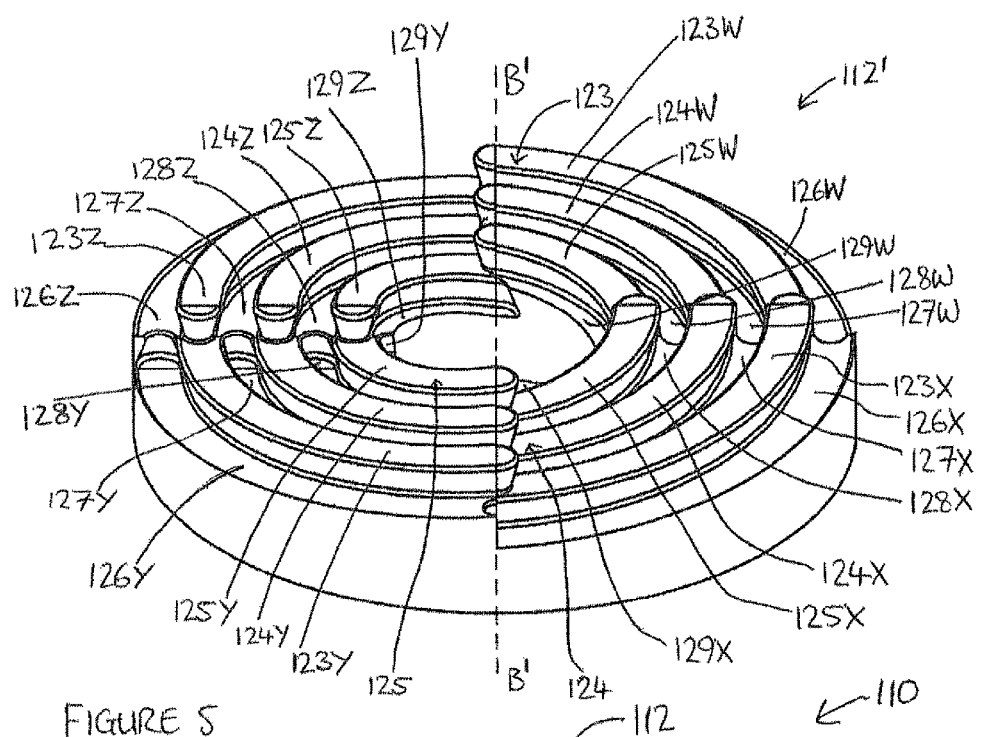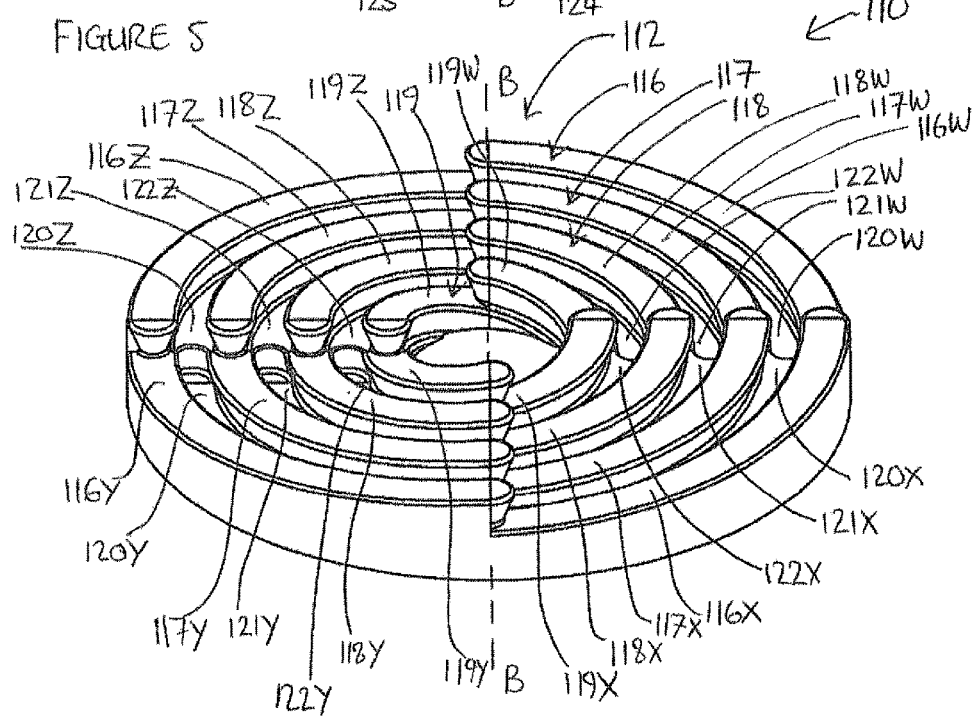
FIGURE 5

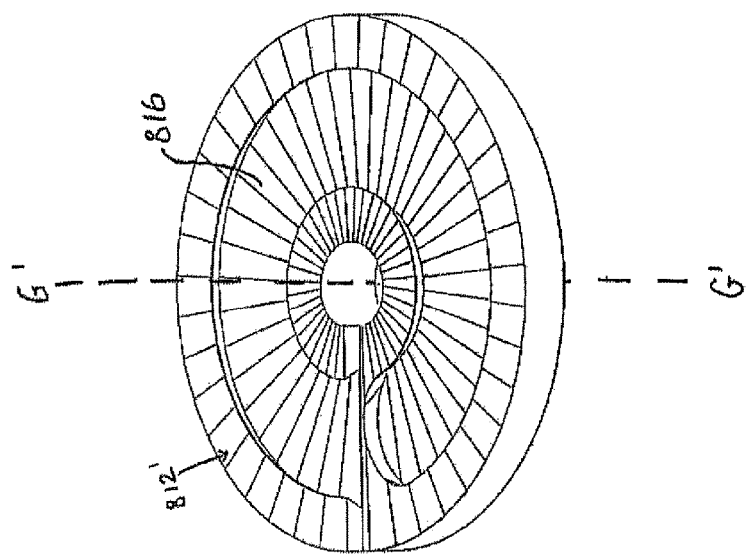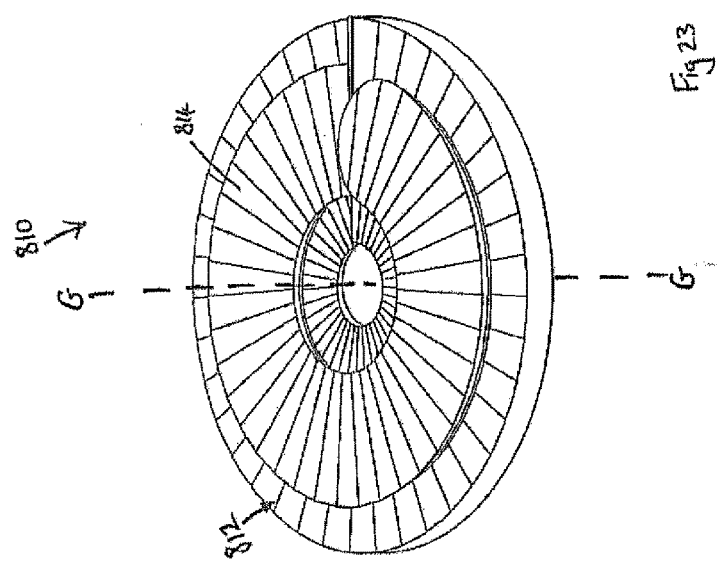
Fig 23

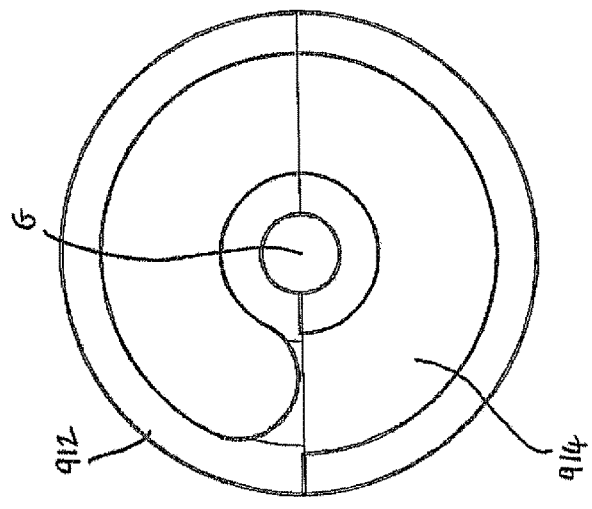
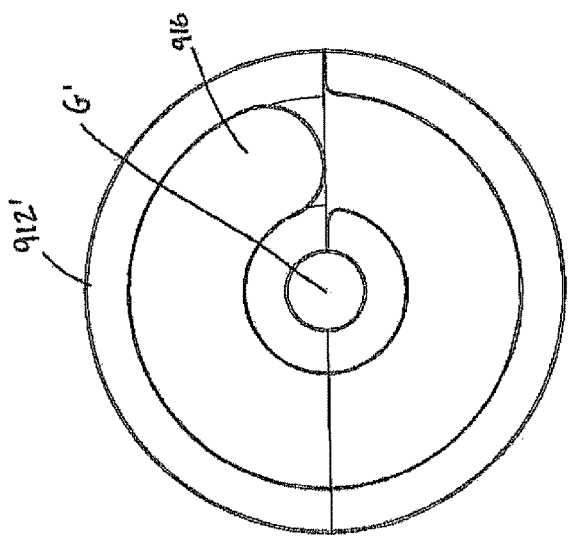
Fig 27

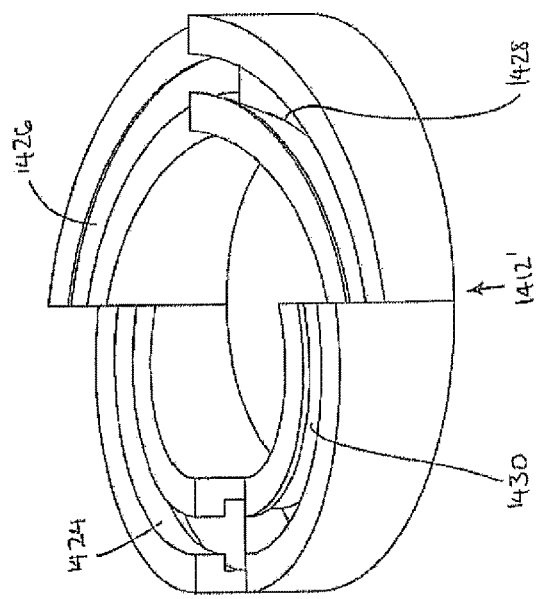
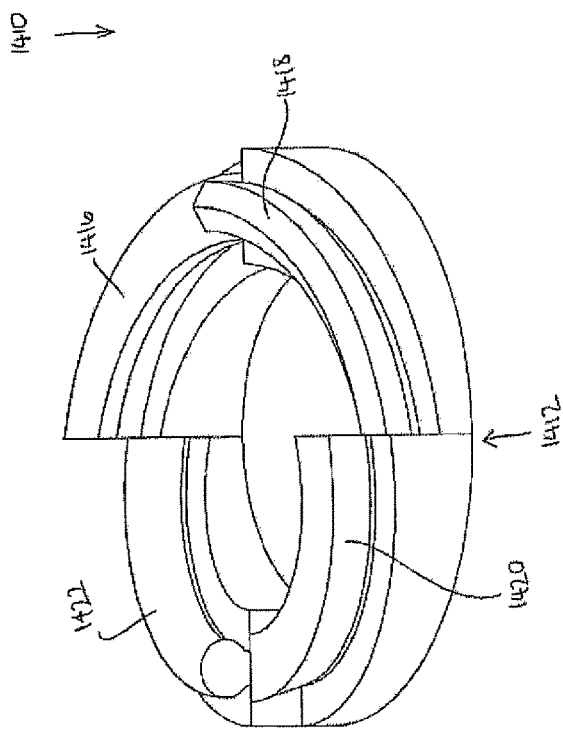
Fig 41

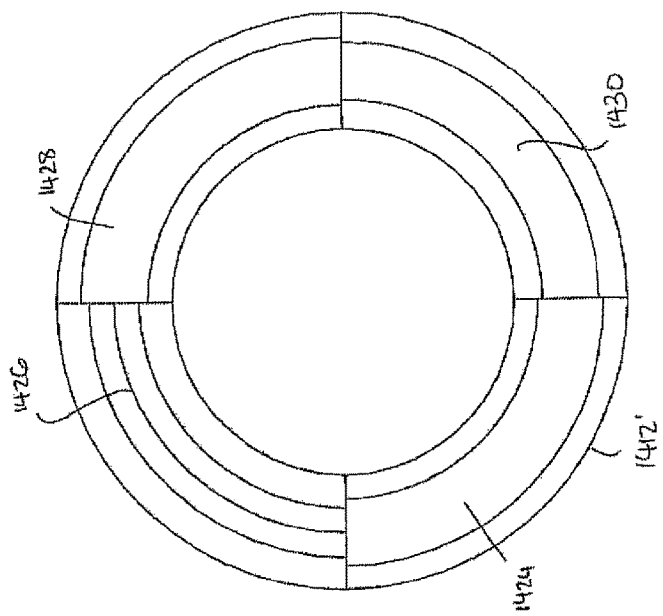
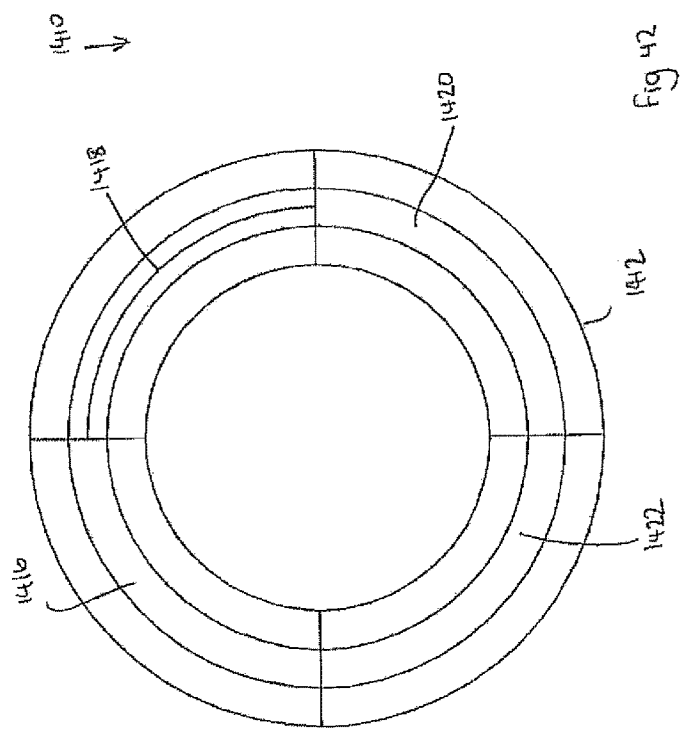
Fig 42

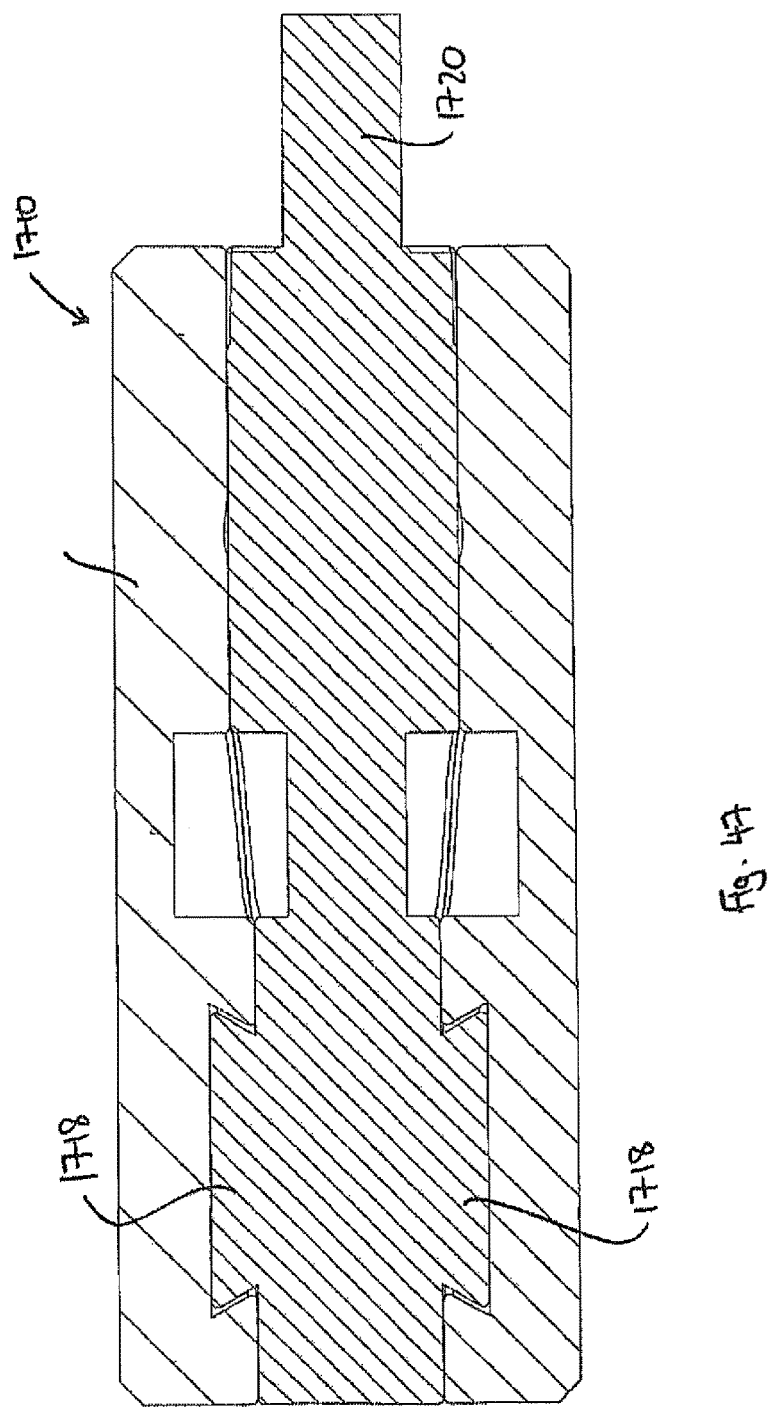

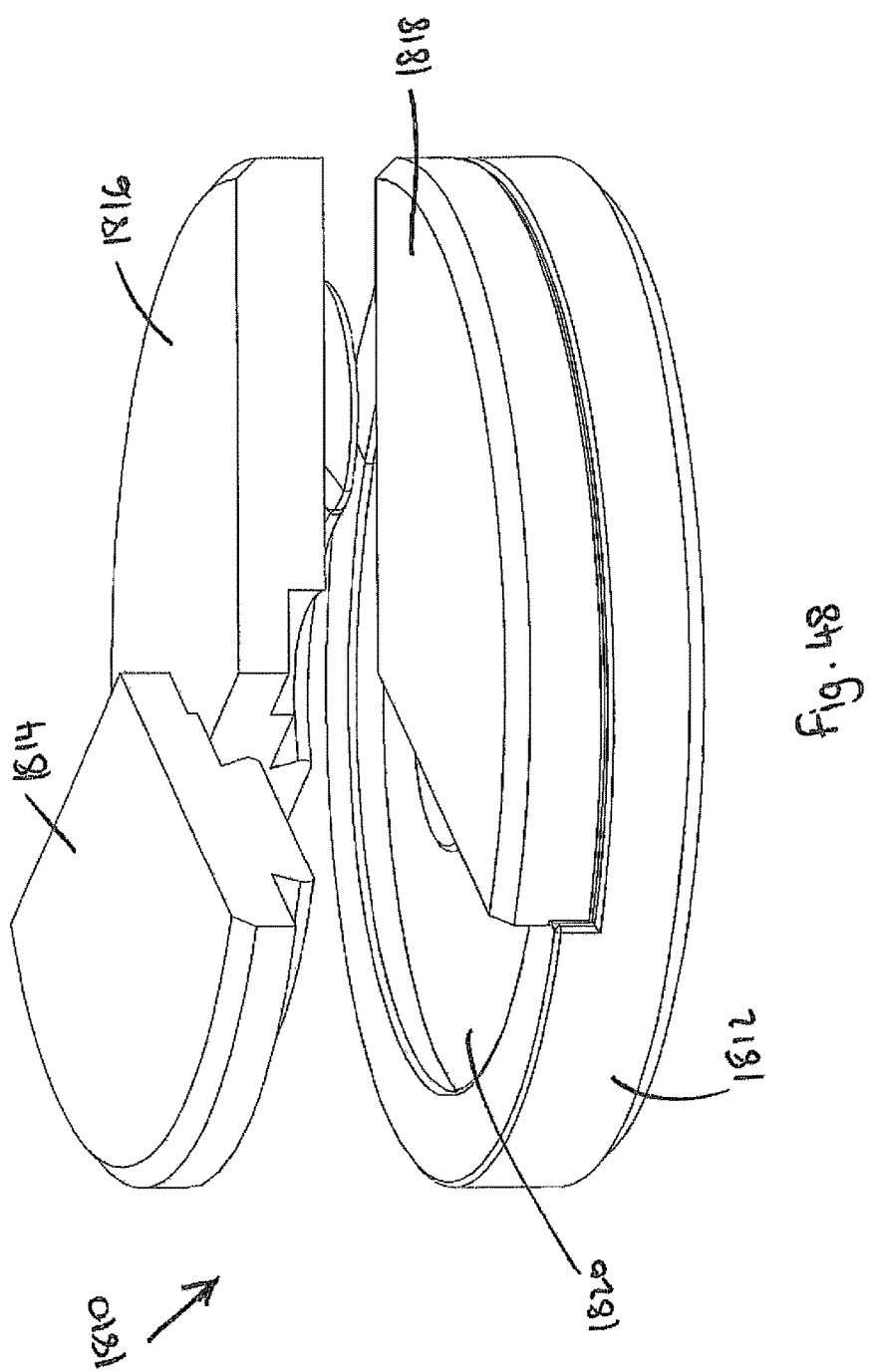

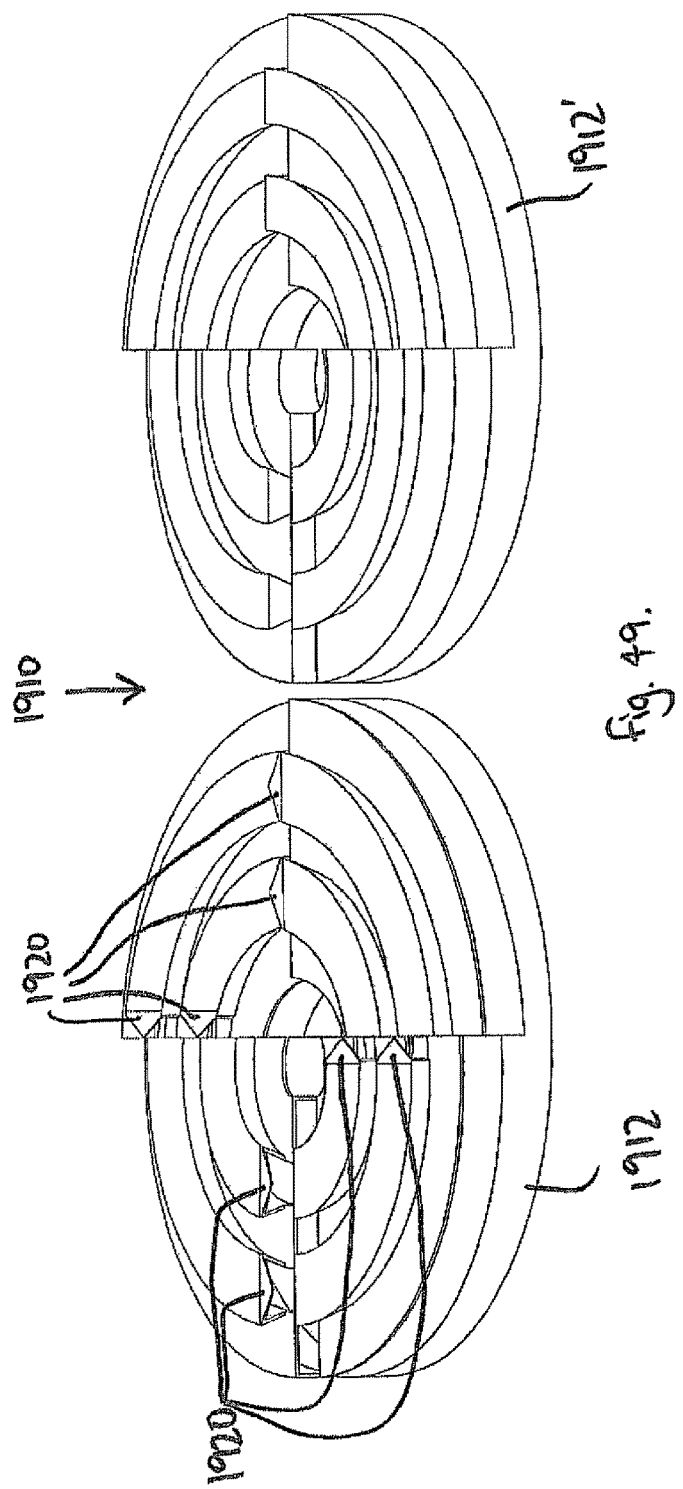

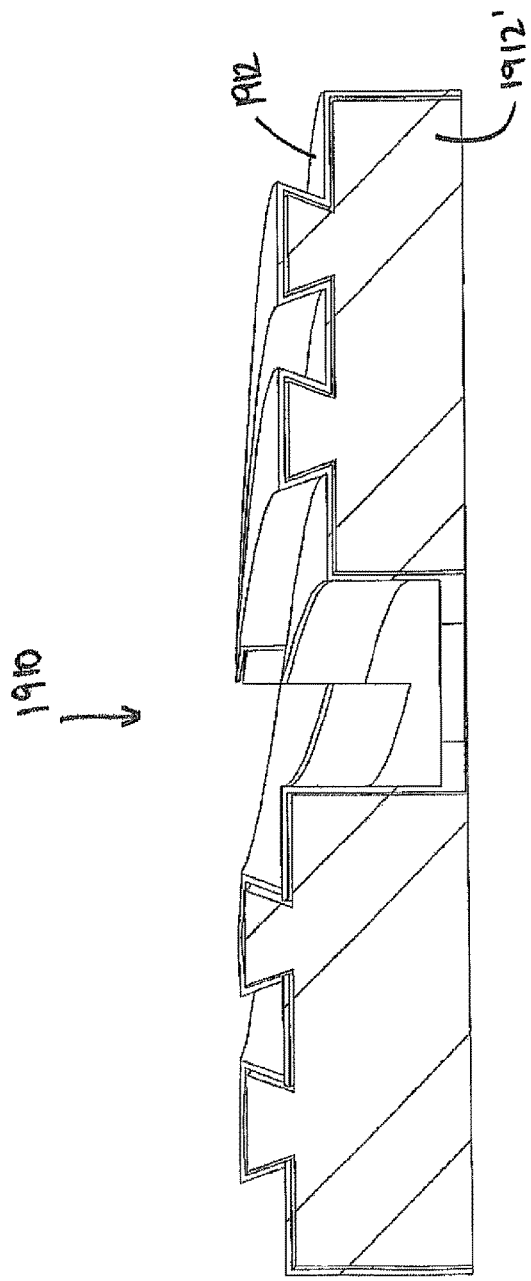

DEVICE FOR AND METHOD OF CONNECTING TWO ITEMS TOGETHER

CROSS-REFERENCE TO RELATED APPLICATIONS

This application is a continuation of U.S. patent application Ser. No. 13/818,673, filed Aug. 26, 2016, which is a National Phase of International Application No. PCT/GB2011/051617, filed Feb. 25, 2013, which claims priority to UK Application No. GB 1014263.6, filed Aug. 26, 2010, the disclosures of which are incorporated herein by reference in their entirety.

BACKGROUND OF THE INVENTION

This invention relates to a device which may be used, and hereinafter is described principally in relation to its use, as a connector. However, it will be understood that the device may be used for other purposes, a number of which will be referred to below.

It is known to connect items together by means of connectors or fasteners. Fasteners and connectors including threaded portions are known, for example screws, and screw caps.

A screw includes a body and a generally helicoidal projection which extends radially outwardly of the body, along a length of the body. A screw cap also includes a generally helicoidal projection having a first end and a second end, and which extends generally radially inwardly of the cap. The helicoidal projection of the cap is engageable with a corresponding projection which extends generally radially outwardly from a neck of a bottle (or other item). The helix of the neck of the bottle also has a first end and a second end.

In use, the second end of the helicoidal projection of the cap is positioned adjacent the first end of the helicoidal projection of the neck of the bottle. Relative rotation of the screw cap relative to the neck, about a generally central longitudinal axis, causes inter-engagement of the helicoidal projections. As the cap and the neck are rotated relative to one another, the length of each helicoidal projection which is engaged with the other helicoidal projection increases, until a first end of the helical projection of the cap is adjacent the first end of the helicoidal projection on the neck, and the second end of the helical projection of the cap is adjacent the second end of the helicoidal projection of the neck. An in use upper surface of the helicoidal projection of the cap abuts an in use lower surface of the helicoidal projection of the neck. Inter-engagement of the helical projections inhibits linear movement of the cap relative to the neck in a direction which is parallel to the longitudinal axis.

A disadvantage of known threaded connections is that it is necessary for multiple relative revolutions of the two parts to be carried out in order to achieve a satisfactory connection which inhibits or prevents linear movement in the direction of the central, longitudinal axis.

SUMMARY OF THE INVENTION

In accordance with the present invention, there is provided a device including a first part and a second part which are inter-engageable with one another, the first part having a first longitudinal axis and a connecting face which extends substantially transversely to the first longitudinal axis and includes an engagement formation which extends substantially axially, and the second part having a second longitudinal axis and a connecting face which extends substantially transversely to the second longitudinal axis and includes a receiving formation which extends substantially axially and in which the engagement formation of the first part is receivable, wherein each of the engagement formation and the receiving formation includes a substantially helicoidal surface which extends at least partially around the longitudinal axis of the respective part of the device, such that rotation of the two parts relative to one another about the longitudinal axes, when the two parts are substantially co-axially aligned, such that the connecting faces of the two parts face one another in a substantially axial direction, causes engagement of the engagement formation of the first part with the corresponding receiving formation of the second part.

An advantage of this invention is that each part of the device may be shallow, and a large surface area of each part may be brought into engagement with the other part of the device quickly and easily, compared with the amount of time and effort required to achieve a similar degree of engagement with a known connector/fastener, for example a screw.

The engagement forces are distributed over relatively large surface areas relatively quickly. Thus, such a device is considered to have a "mechanical advantage" compared with known connectors/fasteners.

The device provides efficient load distribution and a secure connection, in view of the frictional engagement of a large proportion of the surface area of one part of the device with the other part of the connector.

According to a second aspect of the invention there is provided a method of connecting items together, including providing a first part of a device on a first item and a second part of the device on a second item, the first part of the device including a longitudinal axis, and a connecting face which extends substantially transversely to the longitudinal axis and has an engagement formation which extends substantially axially, and the second part including a longitudinal axis and a connecting face which extends in substantially transversely to the longitudinal axis of the second part, and has a receiving formation which extends substantially axially, and in which the engagement formation of the first part is receivable, wherein each of the engagement formation and the receiving formation includes a substantially helicoidal surface which extends at least partially around the longitudinal axis of the respective part, the method further including substantially aligning the longitudinal axes of the two parts of the device, such that the connecting faces of the two parts of the device face one another substantially axially, and rotating the two parts of the device relative to one another about the longitudinal axes, such that the engagement formation of the first part is received in the receiving formation of the second part.

BRIEF DESCRIPTION OF THE DRAWINGS

Embodiments of the invention will now be described, with reference to the accompanying drawings, of which:

FIG. 5 is a perspective view of a second embodiment of a device in accordance with the present invention;

FIG. 23 is a perspective view of a seventh embodiment of the device of the present invention;

FIG. 27 is a plan view of the device of FIG. 26;

FIG. 41 is a perspective view of a thirteenth embodiment of the device of the present invention;

FIG. 42 is a plan view of the device of FIG. 41; and

FIG. 47 is a cross-sectional view of the embodiment shown in FIG. 46;

FIG. 48 is a perspective view of a seventeenth embodiment of the invention;

FIG. 49 is a perspective view of an eighteenth embodiment of the invention;

FIG. 50 is a cross-sectional view of the embodiment shown in FIG. 49.

DETAILED DESCRIPTION OF THE PREFERRED EMBODIMENT

Figure 1:
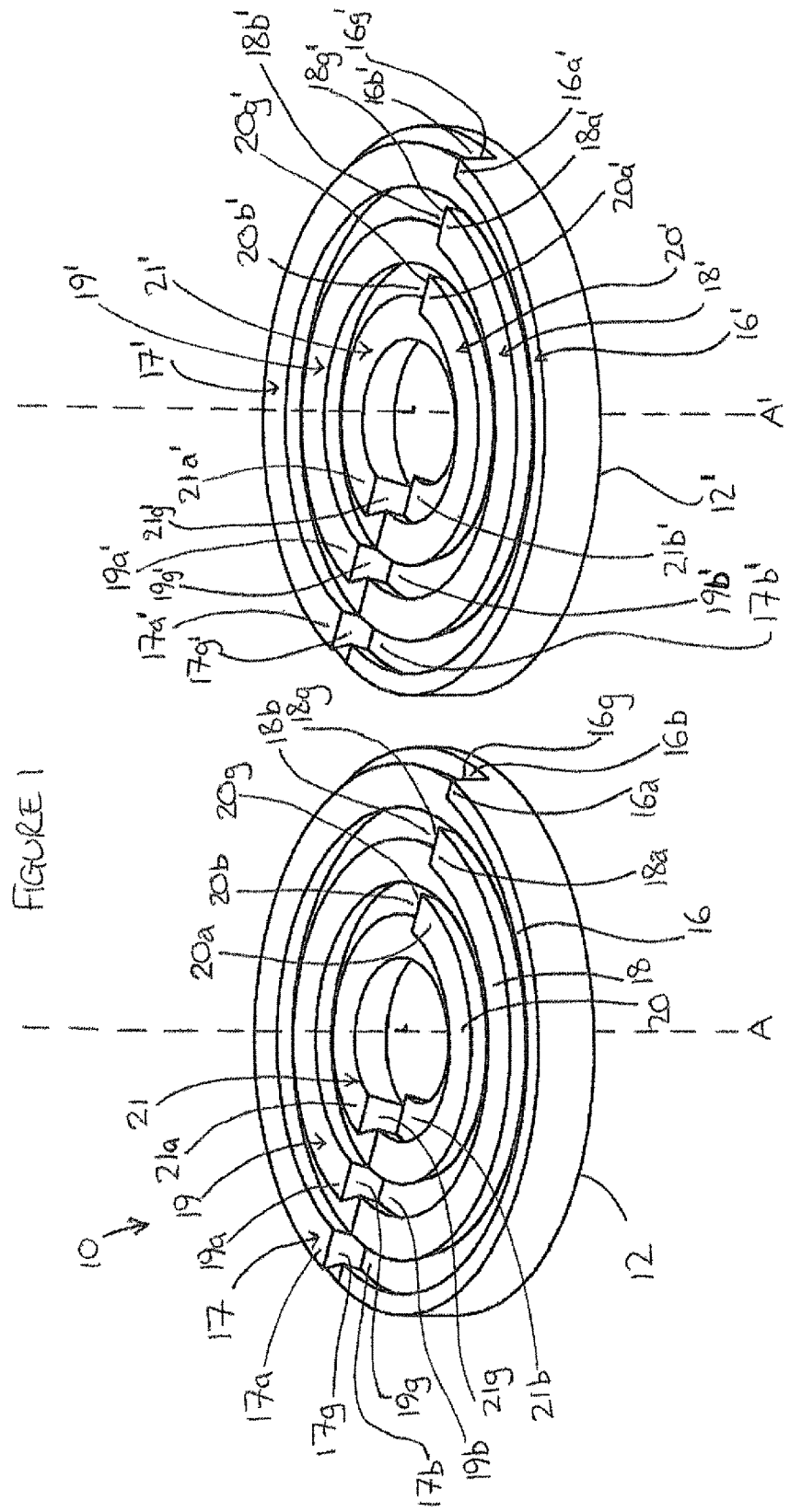
FIG. 1 is a perspective view of a first embodiment of a device in accordance with the present invention.

Referring to FIG. 1, there is shown a first embodiment of the invention. A connector 10 includes a first part 12 and a second part 12'. In this embodiment of the invention, the first part and the second part are identical to one another. The first part 12 and the second part 12' each includes a plurality of engagement formations, 16, 17, 18, 19, 20 and 21, and the second part 12' includes a plurality of engagement formations 16', 17', 18', 19', 20' and 21', Whilst in the example described herein, each part 12, 12' includes six engagement formations 16-21 16'-21', any number of engagement formations, including one, may be provided. Each of the engagement formations 16-21 and 16-21' is substantially annular and has a first end 16a, 17a, 18a, 19a, 20a, 21a, 16a', 17a', 18a', 19a', 20a', 21a'', and a second end 16b, 17b, 18b, 19b, 20b, 21b, 22b, 16b', 17b', 18b', 19b', 20b' and 21b'. Each engagement formation 16-21, 16'-21' has a first portion which extends between the first end 16a-21a, 16a'-21a' of the engagement formation 16-21, 16-21' and a mid-point thereof, and a second portion which extends between the mid-point of the engagement formation 16-21, 16'-21' and the second end 16b-21b, 16b'-21b' thereof. The engagement formations 16-21 and 16-21' are concentric about respective central axes A, A'. Each part 12, 12' has a connecting face which extends substantially transversely to the respective axis A, A'.

Each engagement formation 16-21 and 16'-21' extends from the connecting face of the respective part 12, 12' in the same general direction as the respective longitudinal axis A, A', and is substantially parallel to the respective longitudinal axis A, A'. Thus, each engagement formation 16-21, 16'-21' extends substantially axially.

Figure 4:
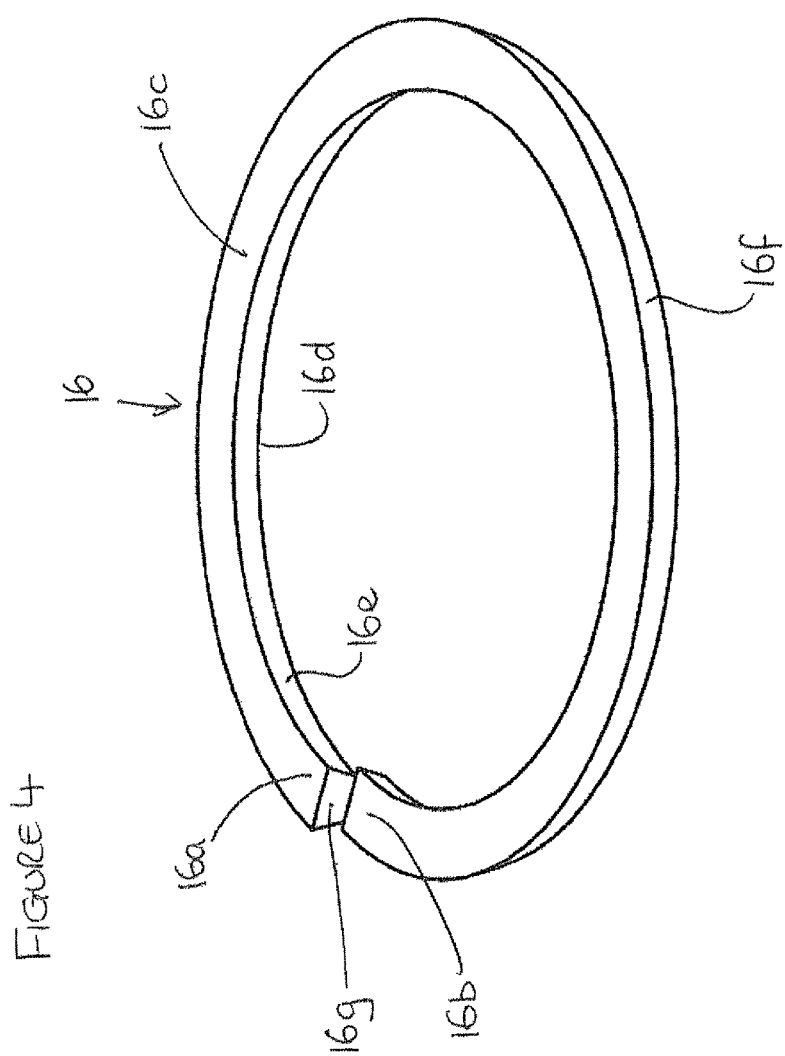
FIG. 4 is a perspective view of one engagement formation of a part of the device shown in FIG. 1.

FIG. 4 shows one engagement formation 16 in isolation, such that the features of the engagement formation 16 can be seen more clearly. The engagement formation 16 is substantially helicoidal, and includes an upper substantially helicoidal surface 16c, a lower surface 16d, an inner circumferential wall 16e and an outer circumferential wall 16f. The inner and outer circumferential walls 16e, 16f are undercut, such that the engagement formation 16 has a substantially trapezoidal cross-section. It will be appreciated that this shape is exemplary only, and each engagement formation may be any shape, as desired. For example, the inner circumferential wall 16e, the upper surface 16c and the outer circumferential wall could form a series of continuous curves.

Figure 2:
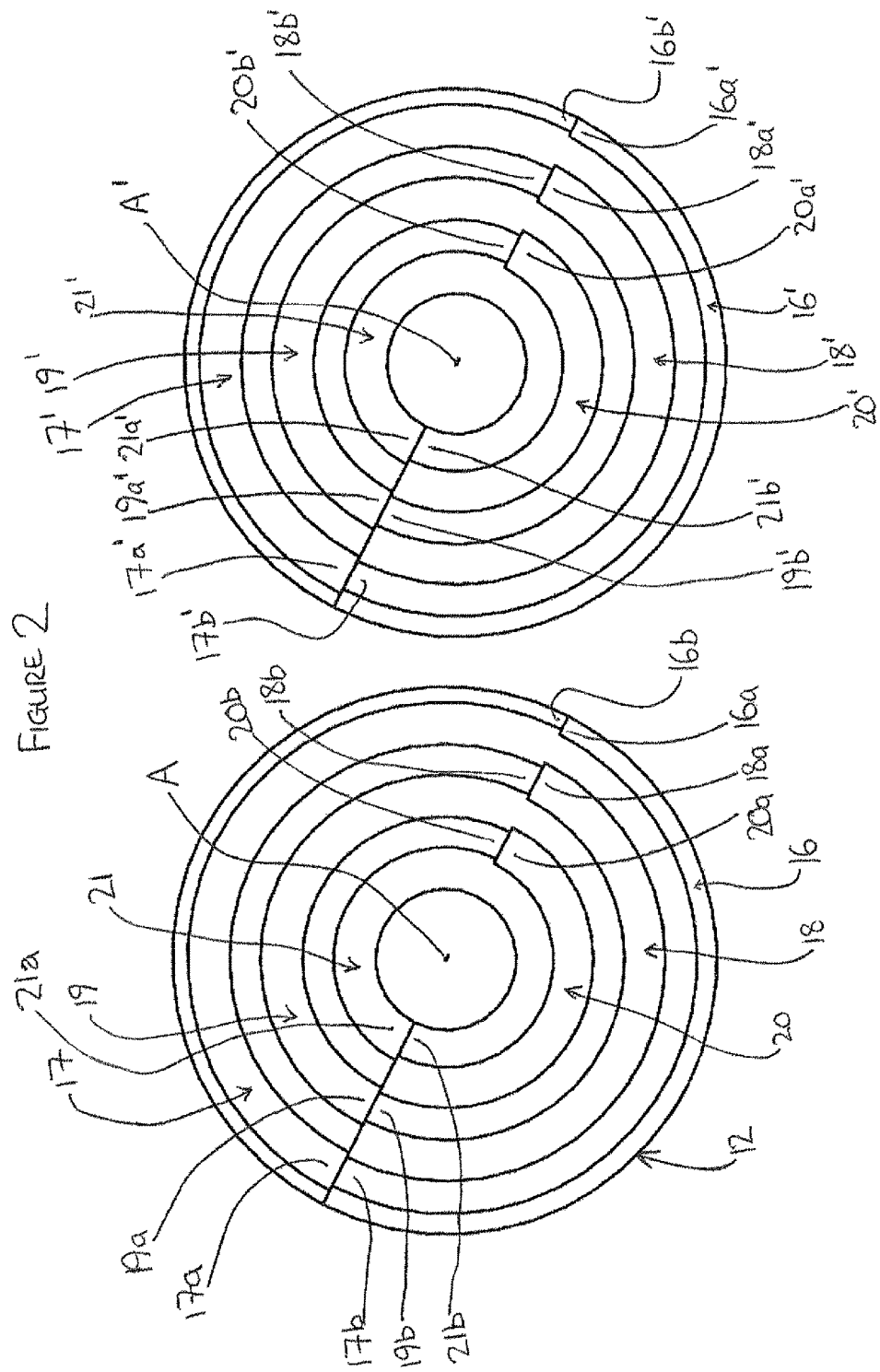
FIG. 2 is a plan view of the device of FIG. 1.

The upper surface 16c describes a single revolution of a helicoid, and the first end 16a of the formation 16 is adjacent the second end 16b of the formation. The upper surface 16c of the second end 16b of the engagement formation 16 meets the lower surface 16d of first end 16a of the formation 16, as shown in FIG. 2. Thus, a junction between the first end 16a of the engagement formation 16 and the second end 16b of the engagement formation 16 forms an end face 16g which extends generally radially. The junction of the first end, 16a and the second end 16b forms a 'step' in the engagement formation 16. The end face 16g need not extend in the same general direction as the longitudinal axis A, and need not be planar. The end face 16g may be curved, ramped, chamfered or angled, for example.

The end faces 16g-21g, 16g'-21 g' of adjacent engagement formations 16-21, 16'-21' are circumferentially offset from one another, by 180 degrees. Therefore, the end faces 16g, 18g, 20g, of the first part 12 are aligned along a first radius which extends from the longitudinal axis A, and the end faces 17g, 19g, 21 g of the first part 12 are aligned along a second radius which extends outwardly from the longitudinal axis A, in the opposite direction to the first radius. Similarly, the end faces 16g', 18g', 20g' of the second part 12' are aligned along a first radius which extends from the longitudinal axis A', and the end faces 17g', 19g', and 21 g' of the second part 12' are aligned along a second radius which extends outwardly from the longitudinal axis A', in the opposite direction to the first radius.

Since, in this example, the two parts 12, 12' of the connector are substantially the same as each other, and the second portion of each engagement formation 16-21, 16'-21' forms a receiving formation for the corresponding engagement formation 16-21, 16'-21' of the other part 12, 12', this connector is described as being 'hermaphroditic'.

The engagement formations 16-21, 16'-21' are substantially circular and arranged generally concentrically, i.e. the average radius of the outermost engagement formation 16, 16' of each part 12, 12' is largest, and the average radius of the innermost engagement formation 21, 21' of each part 12, 12' is smallest. The outer circumferential wall of each engagement formation other than the outermost engagement formation 16, 16' abuts the inner circumferential wall of the adjacent engagement formation.

In use, the two parts 12, 12' of the connector 10 are placed adjacent one another, with the engagement formations 16-21 of the first part 12 facing the engagement formations 16'-21' of the second part 12' and the longitudinal axes A, A' substantially aligned. The first end 17a, of the second formation 17 of the first part 12 is positioned adjacent and between the first ends 16a', 18a' of the first and third formations 16', 18' of the second part 12', such that the first portion of each engagement formation 16-21 of the first part 12 overlies the second portion of the corresponding engagement formation 16'-21' of the second part 12. The second portion of each engagement formation 16'-21' forms a receiving formation for the first portion of the corresponding engagement formation 16-21, 16'-21' of the opposite part 12, 12.

Similarly, the first end 17a' of the second formation 17' of the second part 12' is positioned adjacent and between the first ends 16a, 18a of the first and third formations 16, 18 of the first part 12 such that the first portion of each engagement formation 16'-21' of the second part 12' overlies the second portion of the corresponding engagement formation 16-21 of the first part 12.

The first end 19a of the fourth formation 19 of the first part 12 is positioned adjacent and between the first ends 18a', 20a' of the third and fifth engagement formations 18', 20' of the second part 12' of the connector 10, and so on.

The upper face 16c-21c, of each of the engagement formations 16-21 of the first part 12 abuts the upper face 16c'-21c' of the corresponding formation 16'-21' of the second part 12', and vice versa.

The engagement formations 16-21, 16'-21' of the two parts 12, 12' of the connector 10 face each other, in a generally axial direction.

Rotation of the two parts 12, 12' relative to one another about the longitudinal axes A, A', causes the engagement formations 16-21 of the first part 12 to inter-engage with the engagement formations 16'-21' of the second part 12'. Relative rotation of the two parts 12, 12' through 180° effects full inter-engagement of the two parts 12, 12', wherein the end faces 16g-21g of the engagement formations 16-21 of the first part 12 abut the end faces 16g'-21g' of the engagement formations 16'-21' of the second part 12'. The distance moved by the two parts 12, 12' in a direction generally parallel to the longitudinal axes A, A' during rotation to bring the two parts 12, 12' into full interengagement is approximately half of the height of the end face 16g.

Figure 3:
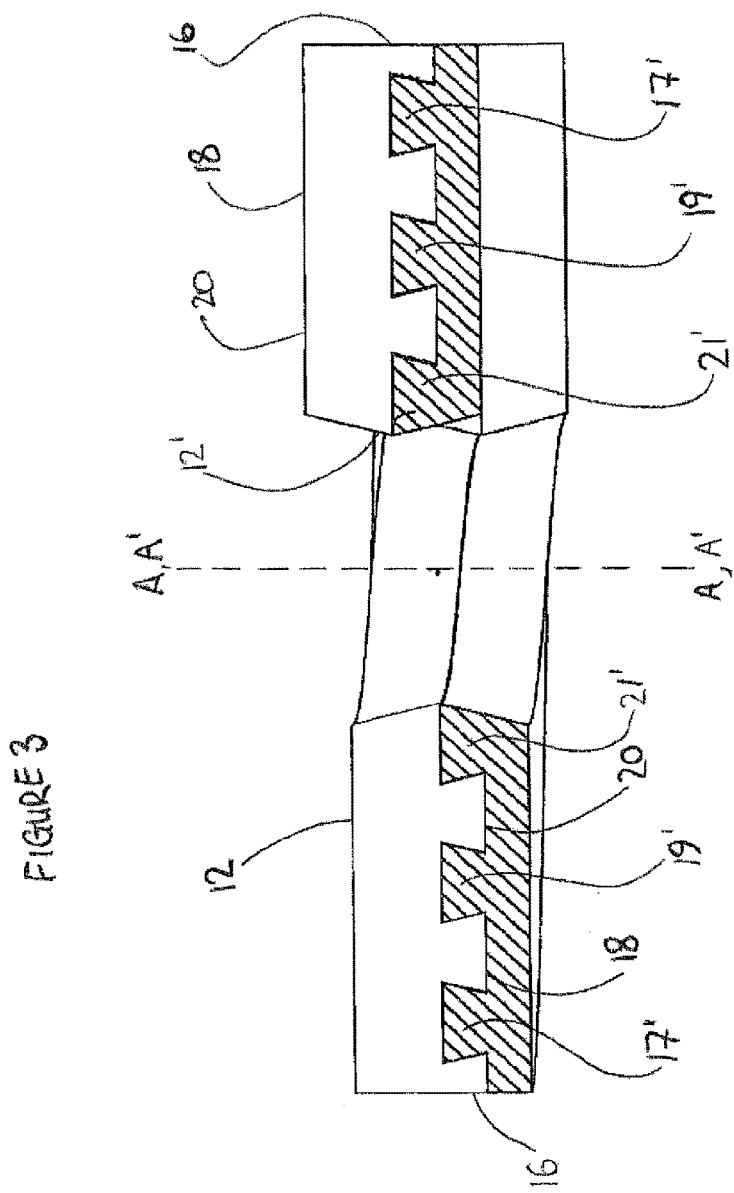
FIG. 3 is a side cross-sectional view of the device of FIGS. 1 and 2, and with two parts of the device inter-engaged.

Since the shape of the receiving portion of each engagement formation 16-21, 16'-21' is the inverse of the shape of the engagement portion of the corresponding engagement formation of the opposite part of the connector 10, the engagement formations 16-21 and 16'-21' "tessellate" or "dovetail" together as shown in FIG. 3. The outer circumferential wall of the second engagement formation 17' of the second part 12' abuts the inner circumferential wall of the first engagement formation 16 of the first part 12 and the inner circumferential wall of the second engagement formation 17' of the second part 12' abuts and is engaged with the outer circumferential wall of the third engagement formation 18 of the first part 12 and so on.

Such inter-engagement inhibits or prevents linear movement of the two parts 12, 12' relative to one another in a direction parallel with the axes A, A'. Full inter-engagement of the two parts 12, 12' prevents any such relative linear movement whatsoever. In other words, the connector 10 is difficult or impossible to pull apart.

Rotation of the two parts 12, 12' relative to one another through less than 180° provides some inter-engagement of the two parts 12, 12', and inhibits relative linear movement in a direction parallel to the axes A, A', and may completely prevent such relative movement.

It will be appreciated that in order to engage the engagement formations 16-21, 16'-21' of the two parts 12, 12' of the connector 10, there is only one possible initial relative orientation of the two parts 12, 12'. This is embodiment of the invention is referred to as a "single pick-up" connector. All of the formations 16-21, 16'-21' engage the adjacent formation(s) 16-21, 16-21' of the opposite part 12, 12' simultaneously. However, the engagement formations of the first part 12 and the second part 12' may be arranged such that orienting the two parts in more than one position relative to one another permits relative rotation of the two parts 12, 12' about the axes A, A', and interengagement of the two parts 12, 12'.

Rotation of the two parts 12, 12' relative to one another in a direction opposite to that which effects engagement of the two parts 12, 12', effects disengagement or partial disengagement of the two parts 12, 12'.

Figure 6:
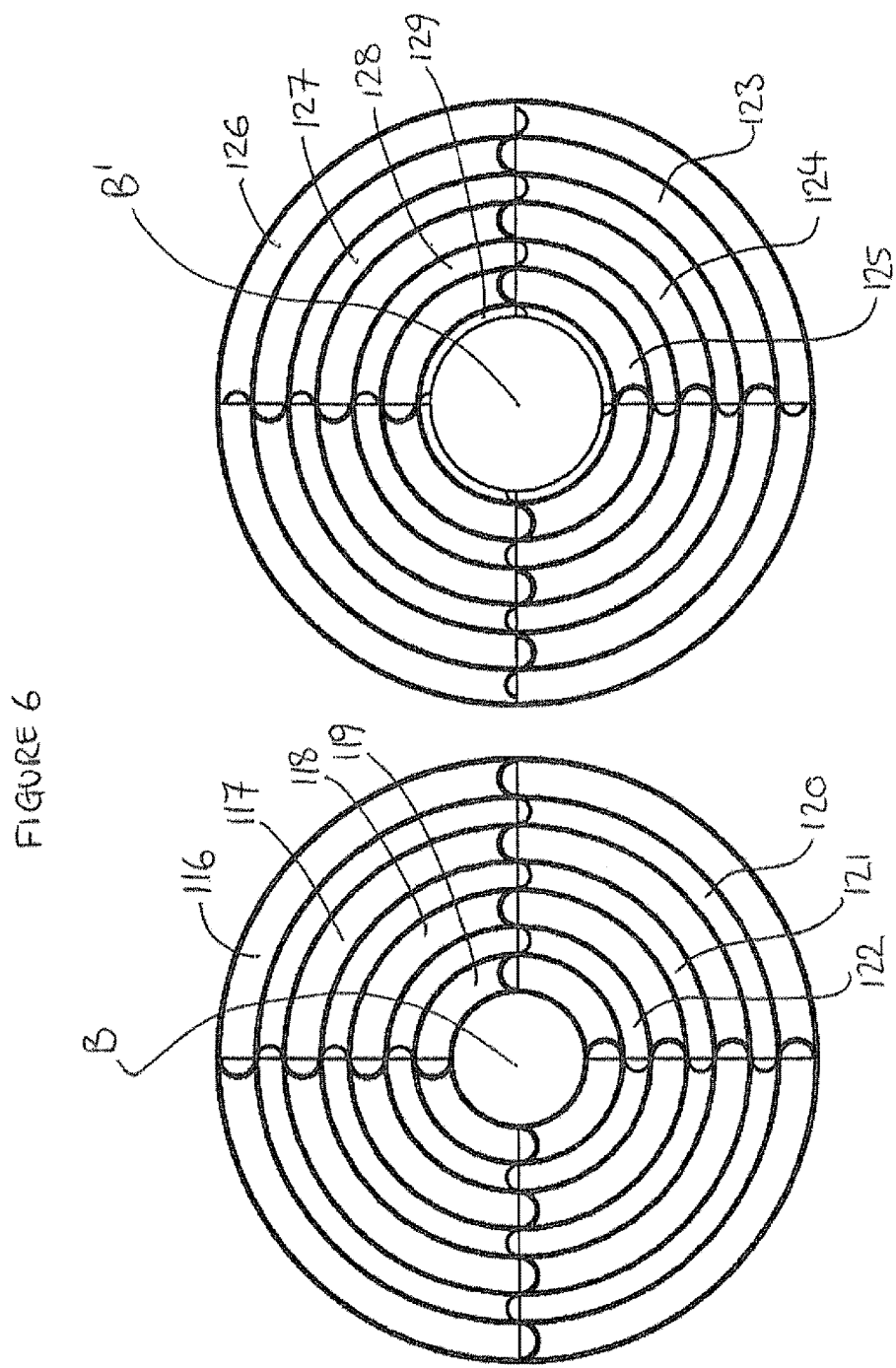
FIG. 6 is a plan view of the device of FIG. 5.
Figure 7:
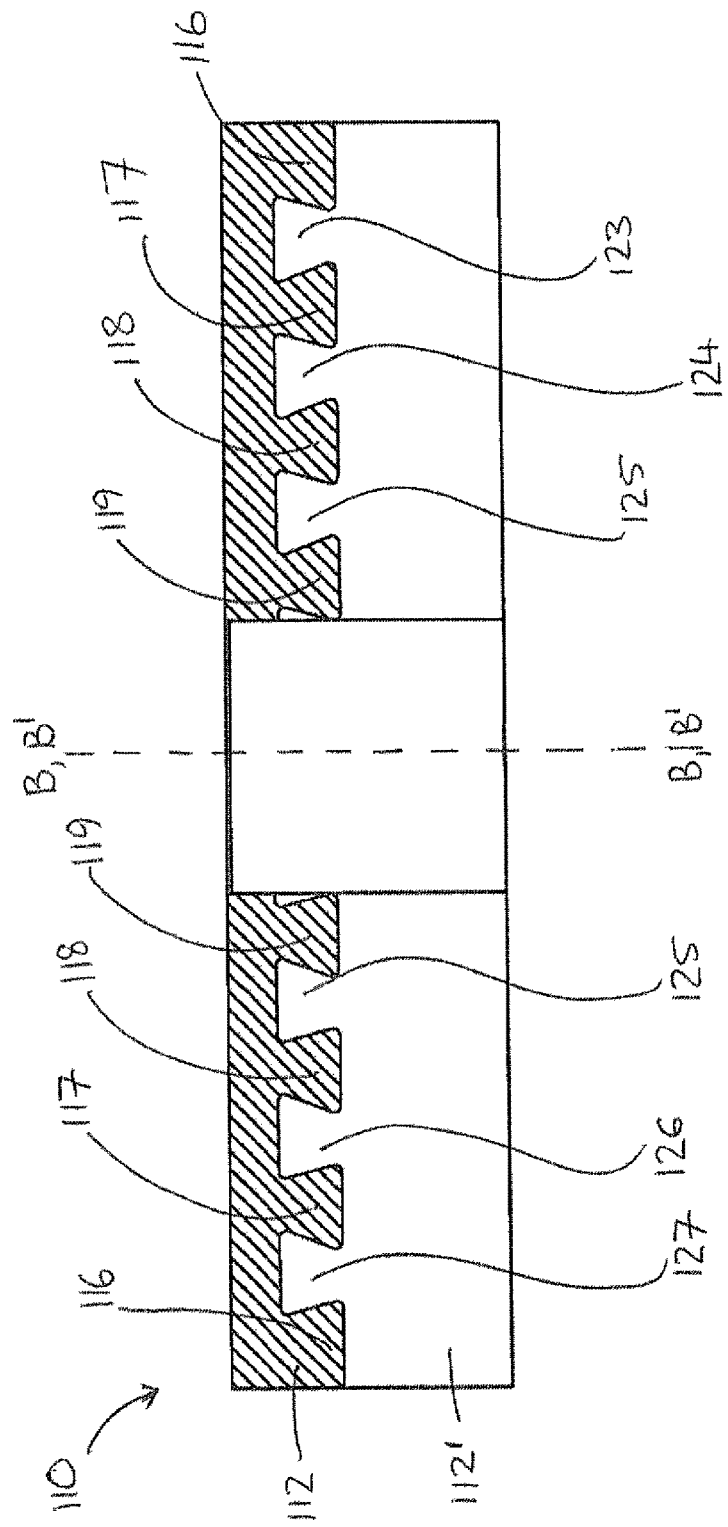
FIG. 7 is a cross-sectional view of two parts of the device of FIG. 5, connected together.

A second embodiment of the invention 110 is shown in FIGS. 5 to 7. The connector 110 is similar to the connector 10, and similar features are referenced with similar reference numerals, prefixed with "1". The connector 110 is an example of a "quadruple pick-up", 90° rotation connector.

The connector 110 includes two parts 112 and 112'. The two parts 112 and 112' are not identical, but are engageable with one another. Each part 112, 112' has a respective connecting face which is substantially transverse to a longitudinal axis B, B' of the respective part 112, 112'.

The first part includes a plurality of engagement formations 116, 117, 118, 119. The engagement formations 116-119 are substantially annular, and are concentric about a longitudinal axis B. Each engagement formation 116-119 extends axially, in a direction which is substantially parallel to the longitudinal axis B. Each engagement formation 116-119 is separated from an adjacent engagement formation by a receiving formation 120, 121, 122.

Each engagement formation 116, 117, 118, 119 is substantially annular, and includes four sectors W, X, Y and Z. Each sector W, X, Y, Z of each engagement formation 116-119 has a first end and a second end. The sectors W, X, Y, Z of each formation 116-119 are arranged head-to-tail, such that the first end of each sector W, X, Y, Z is circumferentially adjacent the second end of an adjacent sector W, X, Y, Z. Each sector W, X, Y, Z of each engagement formation 116-119 is a partial helicoid. Each sector W, X, Y, Z extends through approximately 90°.

Each sector W, X, Y, Z of each engagement formation 116-119 includes an upper surface, which is substantially helicoidal. Each sector W, X, Y, Z also has a lower surface, an inner circumferential wall, and an outer circumferential wall. Each sector W, X, Y, Z also has an end face which is situated at the first end of the sector W, X, Y, Z, such that each engagement formation includes four 'steps'. In the present example, the end face of sector W, X, Y, Z of each engagement formation 116, 117, 118, 119 is curved. However, each end face may be any shape as required. The heights of the end faces of the sectors W, X, Y, Z in each engagement formation are substantially the same as one another, as are the heights of the end faces of different engagement formations 116-119. However, the heights of the end faces of different engagement formation 116-119 need not be the same as one another. The inner and outer circumferential walls of each sector W, X, Y, Z slope inwardly towards the lower surface of the sector, such that the end face of each sector W, X, Y, Z is substantially trapezoidal in cross section. Other cross-sectional shapes are also possible and the cross-sectional shape may change over the extent of the engagement/receiving formations.

The circumferential walls of the engagement formations 116-119 define walls of receiving formations 120, 121, 122. The receiving formations are concentric about the longitudinal axis B. Each of the receiving formations 120-122 of the first part 112 also includes four sectors W, X, Y, Z, each having a first end, a second end and a substantially helicoidal upper surface extending between the first end and the second end. The sectors W, X, Y, Z of each receiving formation 120-122 are arranged head-to-tail, i.e. the first end of each sector W, X, Y, Z is adjacent the second end of an adjacent sector W, X, Y, Z.

The second part 112' of the connector 110 includes a plurality of engagement formations 123, 124, 125, which are generally annular and concentric about a longitudinal axis B', and a plurality of receiving formations 126, 127, 128, 129, which are concentric about the longitudinal axis B'. The engagement formations 123-125 of the second part 112' are similar to the engagement formations 116-119 of the first part 112, in that each includes four sectors W, X, Y, Z. Each engagement formation 123-125 extends substantially axially, in a direction which is substantially parallel to the longitudinal axis A'. The two parts 112, 112' of the connector 110 need not have the same number of sectors as one another. For example, alternating sectors of one of the parts 112, 112' may be removed, or flattened, such that inter-engagement of the parts 112, 112' occurs over half of the surface area of the abutting faces of the two parts of the connector 110. Additionally, or alternatively one or more engagement formations may be omitted from one or both parts 112, 112'.

The receiving formations 126-129 are similar to the receiving formations 120-122 of the first part 112, in that each receiving formation 126-129 includes four sectors W, X, Y, Z, each having an upper surface which describes a partial helicoid.

Each sector W, X, Y, Z of each receiving formation 126-129 has a first end and a second end. The second end of each sector is positioned adjacent the first end of an adjacent sector. Each junction between adjacent sectors forms a step in the receiving formation, each receiving formation including four such steps. It will be appreciated that each "step" may be an incline, rather than a substantially vertical step.

The end faces of the engagement formations 116-119 of each sector W, X, Y, Z are aligned along a respective radii; i.e., the end faces of the first sectors W of each of the engagement formations are aligned along a first radius, and the end faces of the second, third and fourth sectors X, Y, Z of each of the engagement formations are aligned along three respective radii which extends outwardly from the longitudinal axis B. This need not be the case, and the end faces of the sectors W, X, Y, Z may be staggered or offset from one another.

Each of the engagement formations 116-119 of the first part 112 is receivable in a corresponding receiving formation 126-129 of the second part 112'. Similarly, each engagement formation 123-125 of the second part 112' is receivable in a corresponding receiving formation 120-122 of the first part 112.

In use, the first part 112 and the second part 112' are positioned adjacent one another and the axes B, B' are substantially aligned, such that the engagement formations 116-119 extending from the connecting face of the first part 112 face the engagement formations 126-129 which extend from the connecting face of the second part 112'. The first end of each sector W, X, Y, Z of the first engagement formation 116 of the first part 112 is positioned adjacent the first end of a sector W, X, Y, Z of the first receiving formation 126 of the second part 112'. Similarly, the first end of each sector W, X, Y, Z of the first engagement formation 123 of the second part 112' is positioned adjacent the first end of a sector W, X, Y, Z of the first receiving formation 120 of the first part 112, and so on.

Therefore, each engagement formation 116-119, 123-125 of each part 112, 112' is aligned with a corresponding receiving formation 120-122, 126-129 of the other part 112, 112' of the connector 110.

The upper face of each of the engagement formations 116-119 of the first part 112 abuts the upper face of the corresponding receiving formation 126-129 of the second part 112', and vice versa.

Rotation of the two parts 112, 112' relative to one another, causes the engagement formations 116-119 of the first part 112 to engage with the receiving formations 126-129 of the second part 112'. In the present example, since the connector 110 includes four sectors of approximately equal angular size, relative rotation of the two parts 112, 112' through 90° effects full inter-engagement of the two parts 112, 112', wherein each end face of each sector W, X, Y, Z of each engagement formation 116-119 of the first part 112 abuts an end face of a sector W, X, Y, Z of a corresponding receiving formation 126-129 of the second part 112', and vice versa.

Since the cross section of each engagement formation 116-119, 123-125 is substantially trapezoidal, the engagement formations 116-119 and 123-125 "dovetail" together.

However, any "tessellating" arrangement of engagement formations and receiving formations is possible. Inter-engagement of the two parts 112, 112' inhibits linear movement of the two parts 112, 112' relative to one another in a direction parallel with the axes B, B' and may completely prevent such movement. Full inter-engagement of the two parts 112, 112' prevents any such relative linear movement whatsoever, without simultaneous relative rotational movement of the two parts 112, 112'. Rotation of the two parts 112, 112' in a direction opposite to that which brings about engagement of the two parts 112, 112', causes disengagement or partial disengagement of the two parts 112, 112'.

Figure 8:
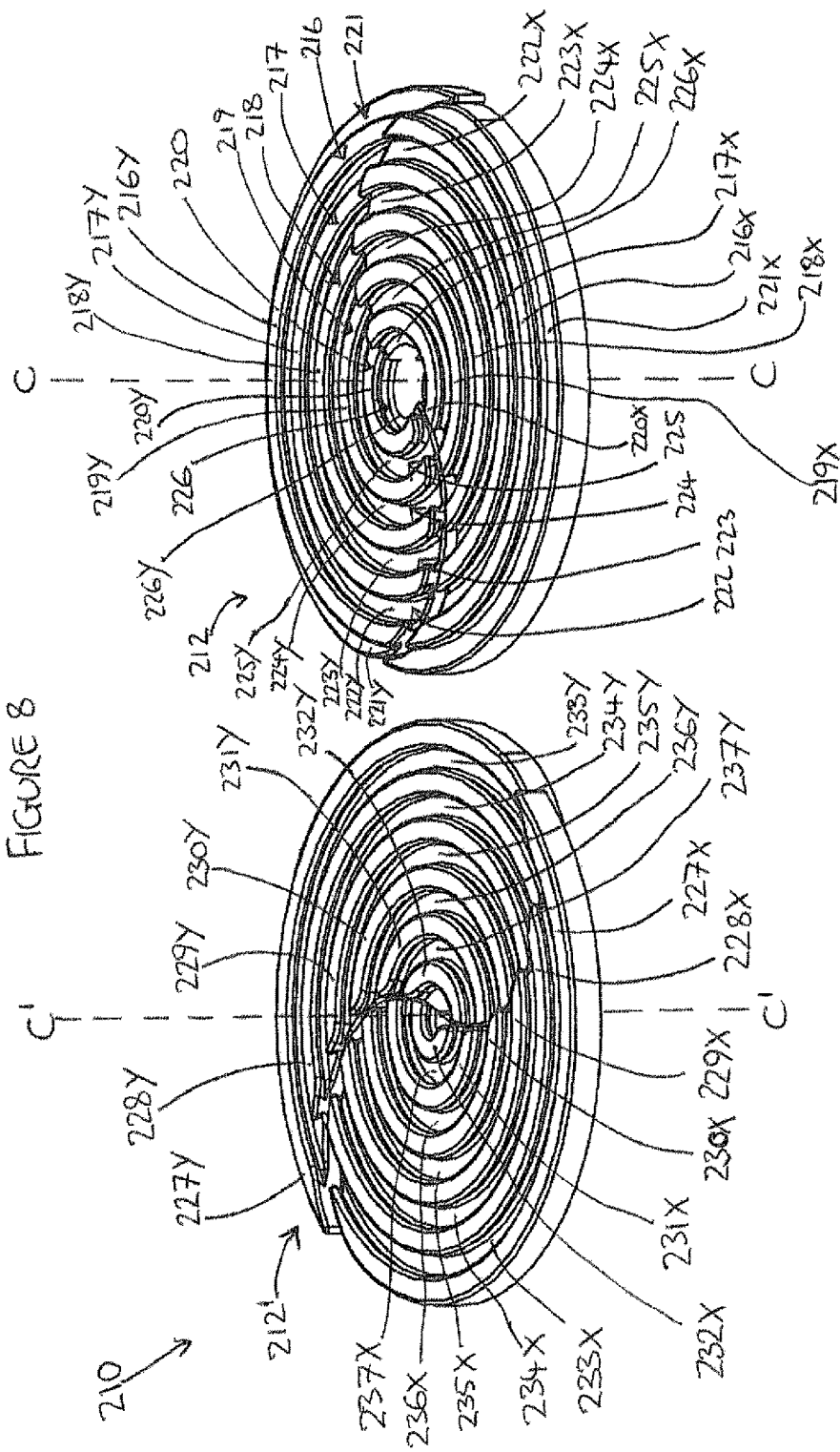
FIG. 8 is a perspective view of a third embodiment of a device in accordance with the present invention.
Figure 9:
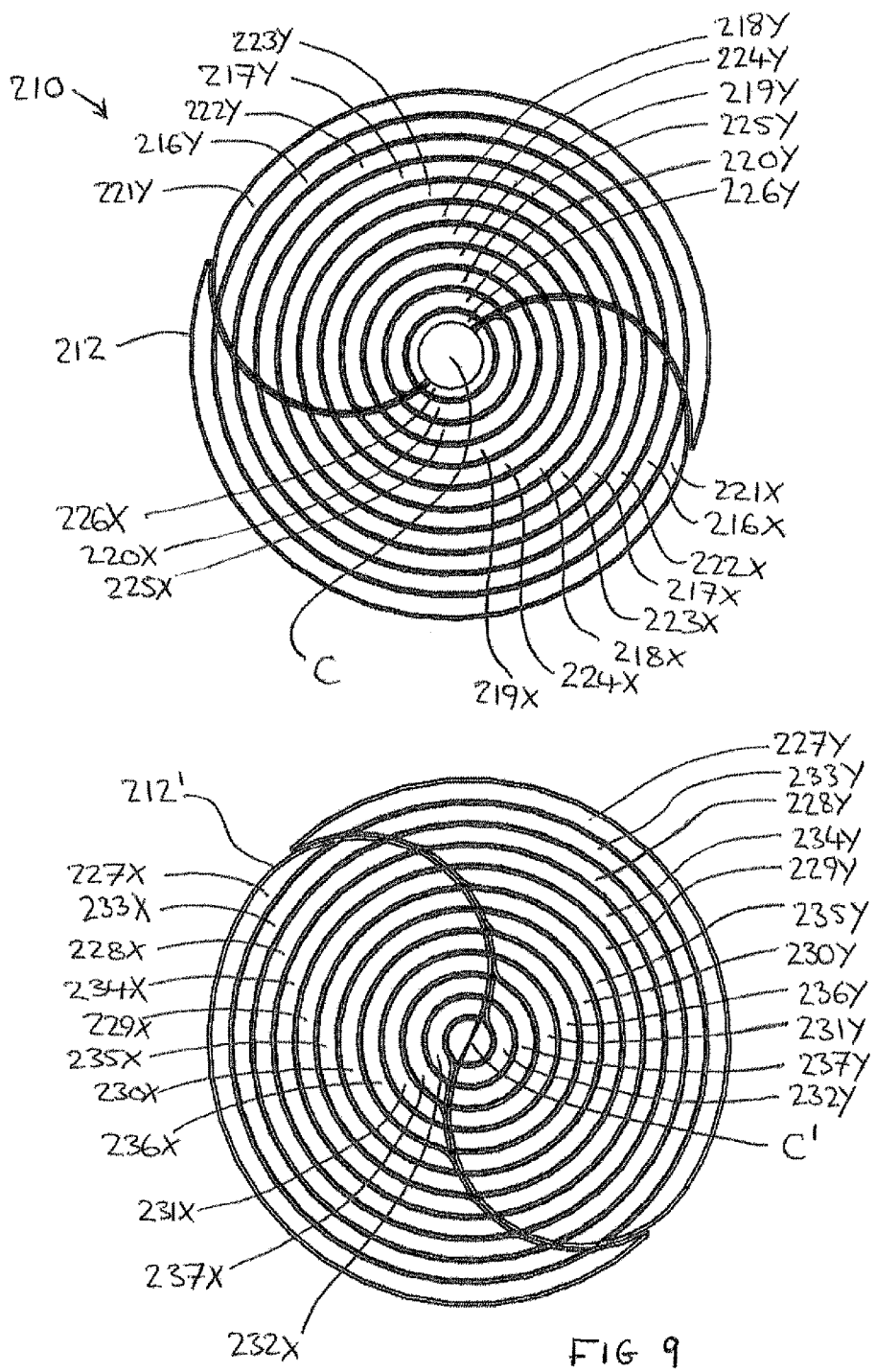
FIG. 9 is a plan view of the device of FIG. 8.
Figure 10:
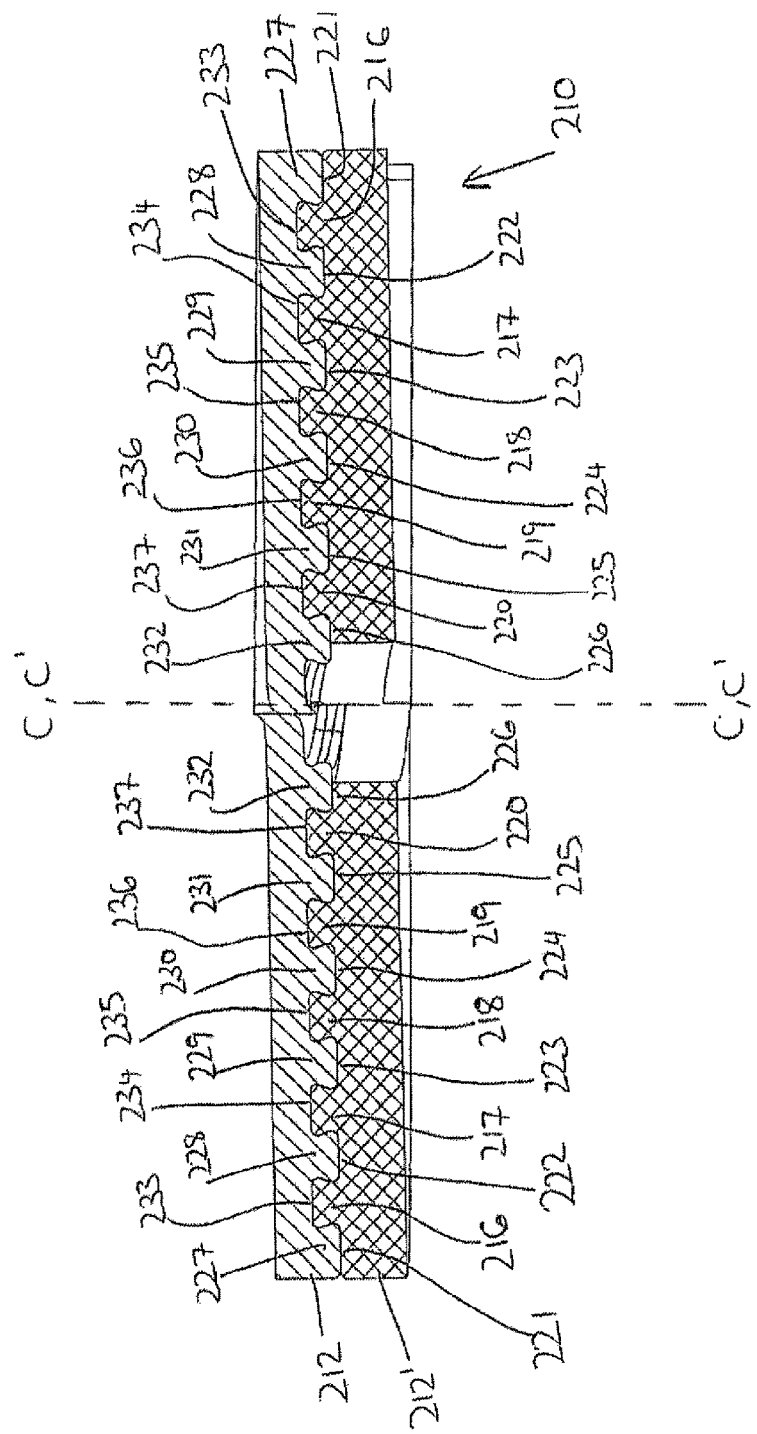
FIG. 10 is a cross-sectional view of the device of FIGS. 8 and 9, with two parts of the device connected together.

A third embodiment of the invention is shown in FIGS. 8 to 10. A connector 210 includes two parts 212, 212'. The first part 212 includes a plurality of engagement formations 216, 217, 218, 219, 220. The engagement formations 216-220 are substantially annular and concentric about a longitudinal axis C. Each engagement formation 216-220 includes two sectors X, Y. However, each part 212, 212' may have any number of sectors. Each sector X, Y has a first end, a second end, an upper surface, and a lower surface. Each sector X, Y of each engagement formation 216-220 also includes an inner circumferential wall and an outer circumferential wall which, together, form two substantially circular side walls. The upper surface of each sector X, Y of each engagement formation 216-220 is substantially helicoidal. Each sector X, Y of each engagement formation 216-220 includes an end face which is positioned at the first end of the sector X, Y, and which is generally transverse to the side walls and the upper surface of the sector X, Y. Each end face of each sector X, Y of each engagement formation may be any shape, as desired. The side walls of each engagement formation 216-220 slope inwardly from the upper surface of the engagement surface to the lower surface thereof, such that each engagement formation is substantially trapezoidal in cross section. However, each engagement formation may have any suitable cross-sectional shape which enables interengagement of the two parts 212, 212' of the connector 210.

Each sector X, Y of each engagement formation 216-220 extends around approximately 180° of the respective engagement formation 216-220. The two sectors X, Y of each engagement formation 216-220 are arranged head-to-tail, such that the first end of each sector X, Y is circumferentially adjacent the second end of the other sector X, Y of the same engagement formation 216-220. Since the upper surface of each segment X, Y of each engagement formation is substantially helicoidal, the upper surface of the second end of each sector X, Y meets the first end of the adjacent sector X, Y towards the lower surface of the adjacent sector, rather than being aligned with the upper surface of the adjacent sector. Thus, there is a "step" between the upper surfaces of adjacent sectors X, Y of each engagement formation 216-220, with each engagement formation 216-220 including two steps which are positioned approximately 180° apart. Thus, this embodiment of the invention is a two pick-up, 180° connector. Each "step" may be an incline, rather than including a face which extends substantially axially parallel to the longitudinal axis C.

The first part 212 of the connector 210 also includes a plurality of receiving formations 221, 222, 223, 224, 225, 226. Each of the receiving formations 221-226 is substantially annular, and is defined by an outer wall of one engagement formation and an inner wall of the adjacent engagement formation. It will be appreciated that the innermost and/or outermost receiving formation may be defined by only a single wall.

Each receiving formation 221-226 has a substantially helicoidal upper surface. Each receiving formation includes two sectors X, Y, each of which extends approximately 180° around the receiving formation 221-226. The sectors of each receiving formation 221-226 are arranged "head-to-tail", such that the second end of each sector is adjacent the first end of the other sector of the same receiving formation. Since the upper surface of each sector is substantially helicoidal, each junction between the second end of each sector X, Y with the first end of the other sector X, Y results in a step or incline in the upper surface of the receiving formation 221-226. In this example, since each receiving formation includes two sectors, each receiving formation 221-226 includes two such steps, which are positioned substantially diametrically opposite one another.

In the example shown, the junctions of the sectors X, Y of each of the engagement formations 216-220 and the junctions between the sectors X, Y of each of the receiving formations 221-226 are not radially aligned with one another. The junctions in the upper surfaces of the sectors X, Y of the engagement formations 216-220 and in the upper surfaces of the receiving formations 221-226 are staggered. Furthermore, each step of each engagement formation and receiving formation is not aligned with a radius of the connector 210. However, it will be appreciated that one or more of the steps may be aligned with a radius of the connector 210.

The second part 212' of the connector 210 is similar, but not identical, to the first part 212. The second part 212' includes a plurality of engagement formations, in this example six engagement formations 227, 228, 229, 230, 231, 232 which are arranged concentrically about a longitudinal axis C' and extend substantially axially, in a direction which is substantially parallel to the longitudinal axis C'. The features of each engagement formation 227-232 of the second part 212' are similar to those of the engagement formations of the first part 212. Each engagement formation 227-232 includes two sectors X, Y, each of which has a substantially helicoidal upper surface, with a step or incline being formed at each junction between the first end of each sector and the second end of the adjacent sector.

The second part 212' also includes a plurality of receiving formations 233, 234, 235, 236, 237, arranged concentrically about the longitudinal axis C'. Each receiving formation 233-237 of the second part 212' corresponds with an engagement formation 216-220 of the first part, and vice versa. The features of the receiving formations 233-237 of the second part 212' are similar to those of the receiving formations 221-226 of the first part 212. Each receiving formation 233-237 includes two sectors, X, Y, each of which has a substantially helicoidal upper surface, with the junctions between adjacent sectors forming two steps in the upper surface of each receiving formation 233-237. Similarly to the first two embodiments of the invention, each part 212, 212' of the connector 210 has a connecting face which is generally transverse to the longitudinal axis C, C' of the respective part 212, 212'. The engagement formations 216-220, 227-232 extend generally axially from the respective connecting face, in a direction which is substantially parallel with the respective longitudinal axis C, C'.

Whilst the present example of the embodiment of the invention is described as having five engagement formations on the first part 212 and six engagement formations on the second part 212', it will be understood that the third embodiment of the invention may have any number of engagement formations and a corresponding number of receiving formations. Not every engagement formation need be received in a receiving formation, and similarly, not every receiving formation need receive an engagement formation. Therefore, the two parts 212, 212' of the connector 210 need not have corresponding numbers of engagement formations and receiving formations.

The first part 212 of the connector is engageable with the second part 212' of the connector 210. In use, the two parts 212, 212' of the connector 210 are positioned such that the connecting faces and hence the engagement formations of the two parts 212, 212', 216-220, 227-232 are face to face. The axes C, C' are aligned such that the first, outermost engagement formation 216 of the first part 212 is aligned with the first, outermost receiving formation 233 of the second part. Similarly, the first, outermost engagement formation 227 of the second part 212' is aligned with the first, outermost receiving formation 221 of the first part 212, and so on.

The two parts 212, 212' of the connector are rotated relative to one another about the longitudinal axes C, C, and the upper surface of each engagement formation 216-220, 227-232 slides along the upper surface of the corresponding receiving formation of the other part. Such rotation of the two parts 212, 212' relative to one another causes each engagement formation 216-220, 227-232 of each part to engage with a corresponding receiving formation 221-226, 233-237 of the other part of the connector. The sloping walls of the engagement formations 216-220, 227-232 mean that the two parts 212, 212' "dovetail" or "tessellate" together. Rotation of the two parts 212, 212' through approximately 180° causes the end face of each of the sectors of each of the engagement formations to abut the step of a sector X, Y of the receiving formation in which the engagement formation is received.

Rotation of the two parts 212, 212' relative to one another in a direction opposite to that which effects interengagement of the two parts causes disengagement or partial disengagement of the two parts 212, 212'.

Figure 11:
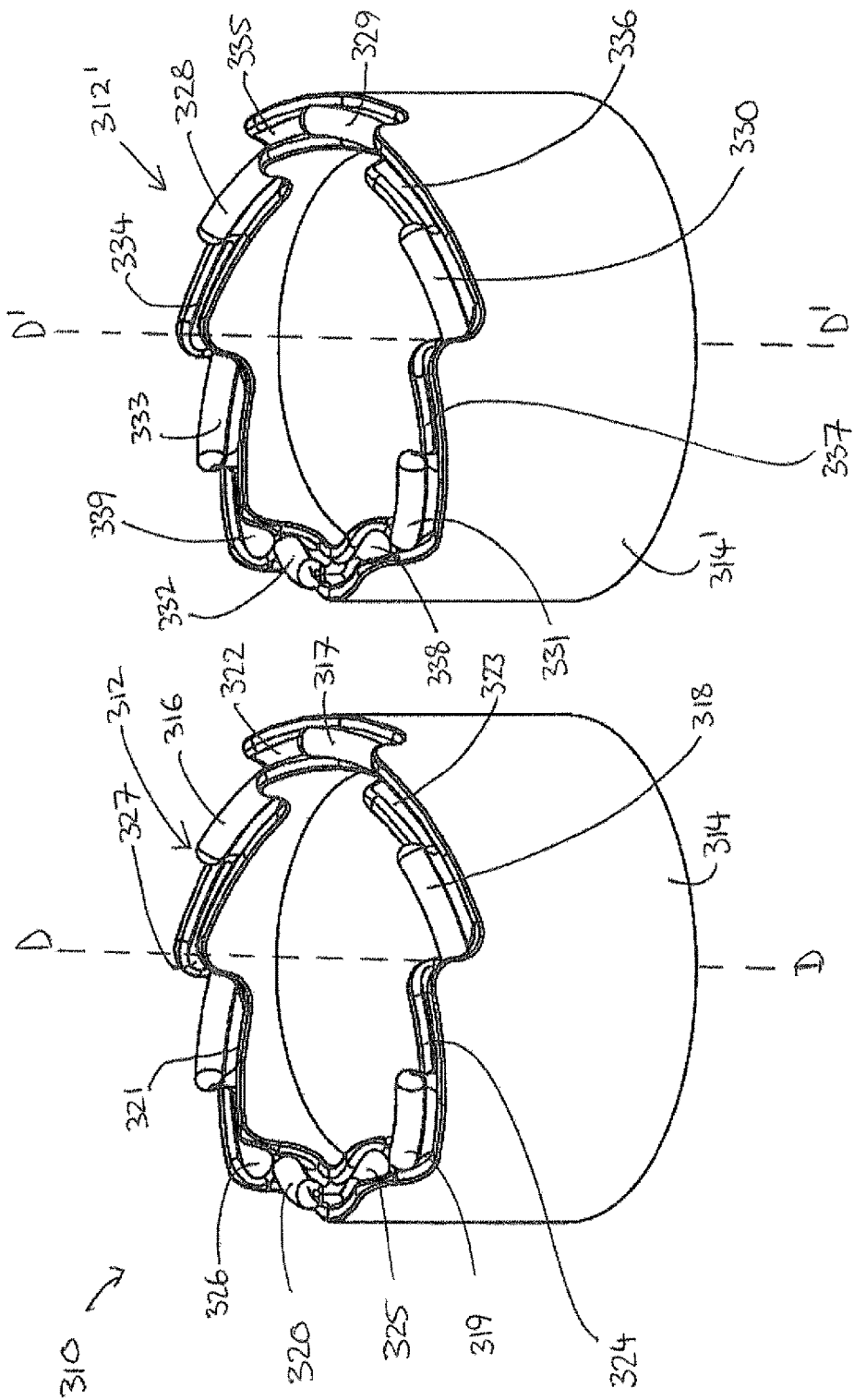
FIG. 11 is a perspective view of a fourth embodiment of a device in accordance with the present invention.
Figure 12:
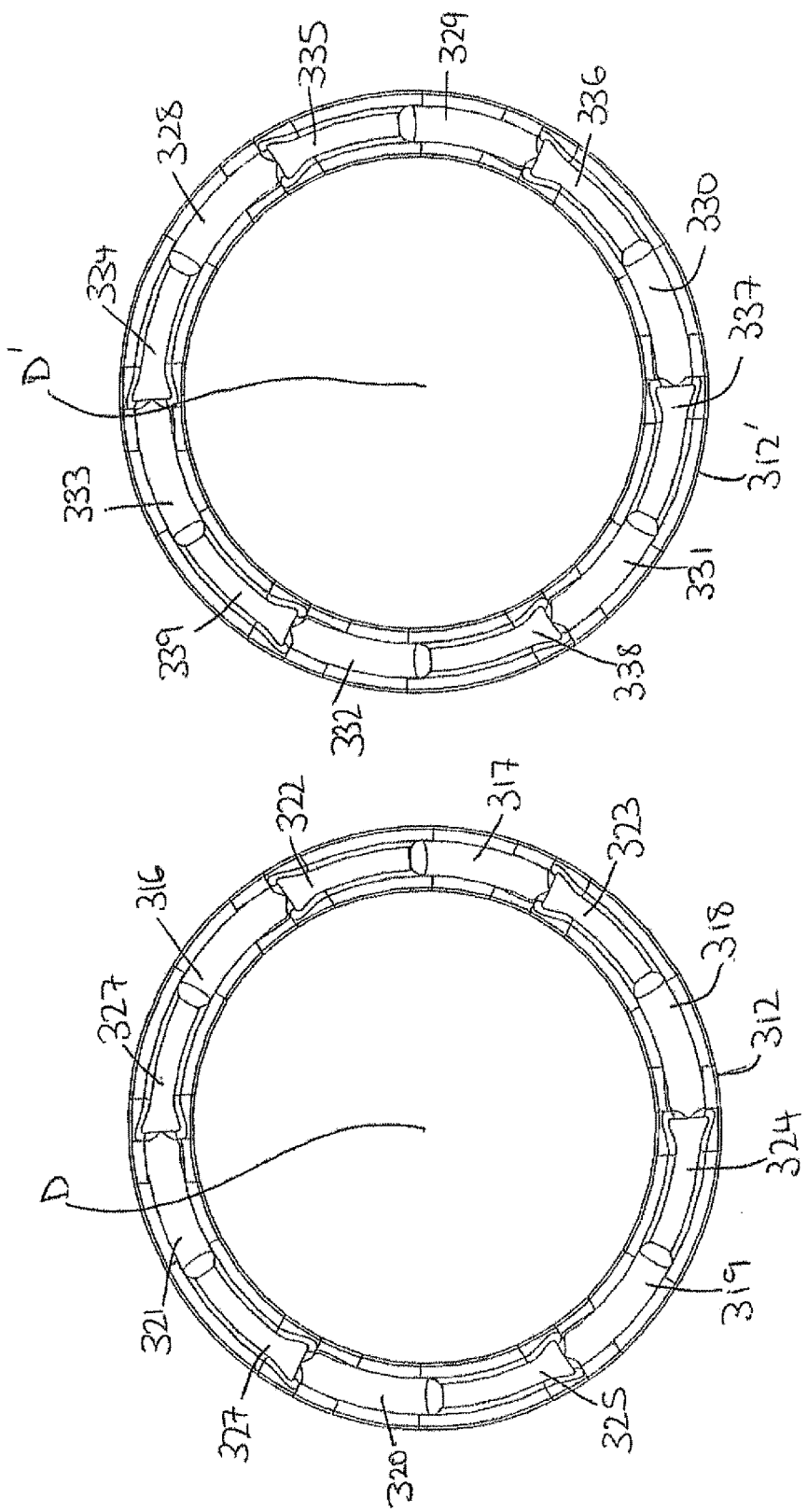
FIG. 12 is a plan view of the device of FIG. 11.
Figure 13:
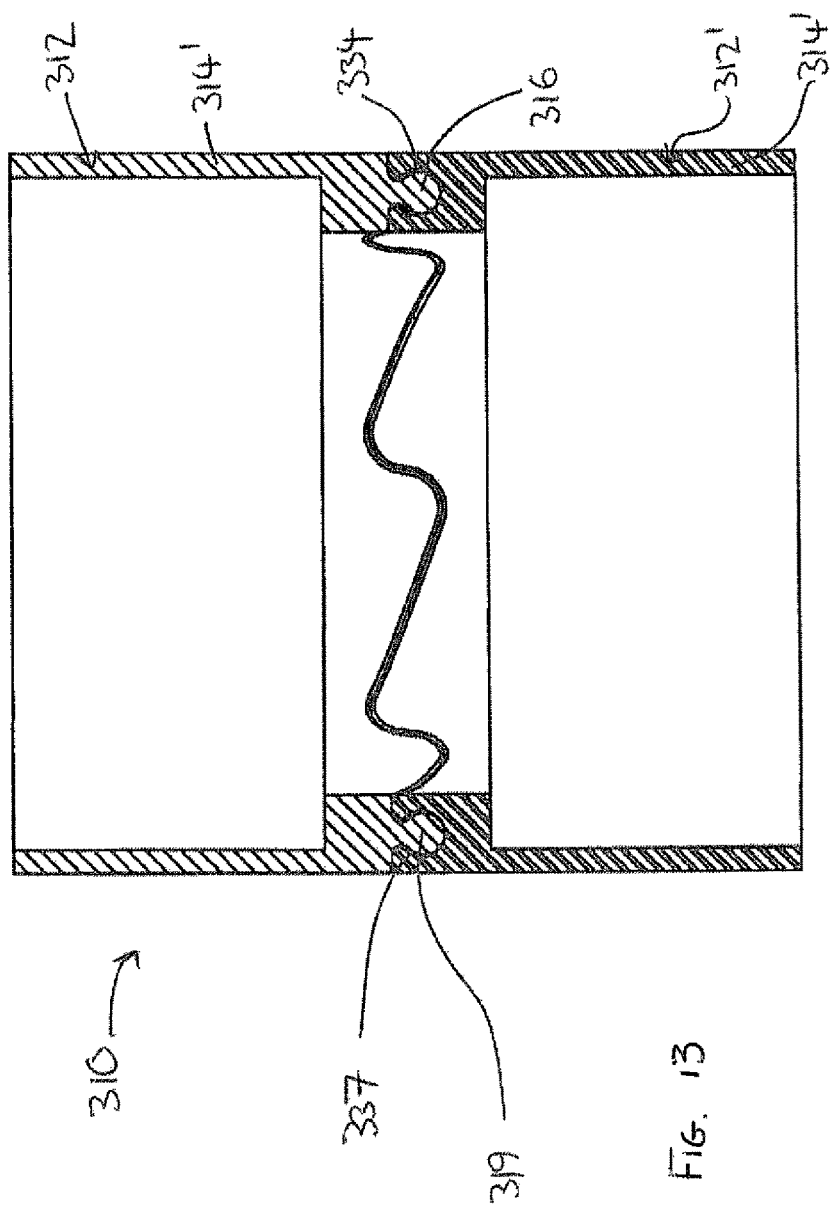
FIG. 13 is a cross-sectional view of two parts of the device of FIGS. 11 and 12 connected together.

A fourth embodiment of the invention is shown at 310 in FIGS. 11-13. The connector 310 includes two parts 312, 312'. In the present example, the two parts 312, 312' are identical, although this need not necessarily be the case.

The first part 312 includes a body 314, which is substantially cylindrical. The body 314 includes an opening 315, such that the body 314 is a substantially hollow cylinder. It will be appreciated that the body 314 need not be hollow. The first part 312 has a substantially central longitudinal axis D.

The first part 312 also includes a connecting face which is substantially annular and extends generally transversely to the longitudinal axis D. The connecting face of the first part 312 includes a plurality of engagement formations 316, 317, 318, 319, 320, 321 (in this example six) which are arranged in a substantially circular arrangement. Each engagement formation 316-321 extends through approximately 30°. Each engagement formation 316-321 is substantially circular in cross-section. However, each engagement formation 316-321 may have any appropriate cross-sectional shape.

Each engagement formation has a first end and a second end, an upper surface and two side walls. The upper surface of each engagement formation is inclined between the first end and the second end of the engagement formation.

Each engagement formation 316, 320 is adjacent a receiving formation 322, 323, 324, 325, 326, 327. Thus, the engagement formations 316-321 and receiving formations 322-327 alternate around the circumference of the first part 312.

Each receiving formation 322-327 is shaped so as to receive an engagement formation of the second part 312'. Each receiving formation 321-327 has a first end, a second end, an upper surface and a pair of side walls. In the present example, each receiving formation has a substantially circular cross-section. Each receiving formation is a curved channel. The upper surface of each receiving formation is inclined between its first end and its second end.

The second part 312' of the connector 310 is identical to the first part 312, having a plurality of engagement formations 328, 329, 330, 331, 333 and a plurality of receiving formations 334, 335, 336, 337, 338, 339 (in this example, six), in which the engagement formations 316, 317, 318, 319, 320, 321 of the first part 312 are receivable. Similarly, the engagement formations 334-339 of the second part 312' are receivable in the receiving formations 322-327 of the first part 312.

The first part 312 may include only a single engagement formation, which is engageable with a single receiving formation of the second part 312', such that relative rotation of the two parts through approximately 360° effects full interengagement.

The connector 310 may include a series of annular engagement formations which are arranged concentrically about the longitudinal axes D, D', such that relative rotation of the two parts 312, 312' of the connector 310 about the axes D, D' causes simultaneous engagement of each of the engagement formations.

In use, the connecting faces of the two parts 312, 312' of the connector 310 are brought together such that the engagement formations 316-321, 328-333 of the two parts 312, 312' face the engagement formations 316-321, 328-333 of the other part 312, 312' and the longitudinal axes D, D' of the two parts 312, 312' are substantially aligned.

The first end of each engagement formation 316-321, 328-333 of each part 312, 312' is positioned adjacent the first end of a receiving formation 322-327, 334-339 of the opposing part 312, 312'. Rotation of the two parts 312, 312' relative to one another causes each engagement formation to slide along the corresponding receiving formation of the opposing part until the first end of each engagement formation is positioned adjacent the second end of the receiving formation in which it is received. In this example, relative rotation of the two parts 312, 312' through approximately 30° causes full interengagement of the two parts.

Since each engagement formation is 'undercut' and each receiving formation is the inverse of the shape of the corresponding engagement formation of the opposite part, partial or full interengagement of the two parts 312, 312' inhibits, and may completely prevent relative linear movement of the two parts 312, 312' in a direction generally parallel to the longitudinal axes D, D', without simultaneous relative rotation of the two parts 312, 312'.

Rotation of the two parts 312, 312' relative to one another in a direction opposite to that which effects interengagement of the two parts 312, 312' causes partial or complete disengagement of the two parts 312, 312'.

The connector 310 is suitable for use in connecting pipes or other tubular objects together. Each part 312, 312' of the connector may be fitted to an end of a pipe, or may be integrally formed therewith.

Being able to control the degree of rotation required to effect full interengagement by providing an appropriate number of engagement formations, means that the ultimate relative position of the pipes on the end of which the parts of the connector 310 are provided, can be selected and controlled.

Plumbing connections can thus easily be made using the connector 310. Seals of rubber, for example, may be provided to inhibit leakage. Additionally, or alternatively, an adhesive and/or a sealant may be applied to maintain and seal the connection between the two parts 312, 312'.

Each part of each connector 10, 110, 210, 310 may include a backing member, which carries each of the engagement formations and receiving formations of that part. The backing member may extend beyond the circumference of the outermost engagement formation or receiving formation, and may be used to attach the part of the connector to an object or a surface. Alternatively, the engagement formation(s) and/or receiving formation(s) of one or both parts of the connector may be integrally formed in an object or surface.

Attaching the first part 12, 112, 212, 312 of the connector 10, 110, 210, 310 to an object, and the second part 12', 112', 212', 312' to another object enables the two objects to be connected together. For example, a single connector 10, 110, 210, 310 can be used to attach a picture to a wall, one part of the connector being attached to the wall, and the other part of the connector being attached to the rear of the picture. There may be no need to drill the wall or puncture the wall with screws or nails. Furthermore, the picture is able to rest substantially flush with the wall, owing to the shallowness of the connector. Hanging a picture on a nail by a cord attached to the rear of the picture causes a gap between an upper part of the picture and the wall.

As a further example, a connector 10, 110, 210, 310 may be used to connect parts of flat-packed furniture together. For example, connecting a leg to a tabletop usually requires a threaded fastener to be provided, and for the leg to be turned through several revolutions relative to the tabletop, in order to engage the whole of the threaded fastener, and to provide a secure engagement between the leg and the table. Attaching one part of a connector in accordance with the present invention to an underside of the tabletop, and the other part to an in use upper end of the leg, enables the leg to be securely engaged with the tabletop by rotating the leg through less than 360° relative to the tabletop.

In order to fully engage the two objects, it is only necessary to rotate the two parts through up to 360° relative to one another, and preferably only through between 90° and 180°. It will be appreciated that the number of "pick-up points", which is determined by the number of sectors into which each engagement formation and receiving formation is divided, affects the angle through which the parts have to be rotated relative to one another in order to achieve full engagement. The more pick-up points which are provided, the more convenient the connector 10, 110, 210, 310 may be to use, since the initial relative orientation of the two parts is less important. The more pick-up points are provided, the smaller the angle through which the parts have to be rotated through relative to one another to achieve full engagement. The optimum number of pick-up points and hence the degree of rotation required to achieve full engagement of the two parts may depend upon the application in which the connector is to be used.

The connection between the two parts of the connector 10, 110, 210, 310 is described above as being temporary, insofar as the two parts of the connector are disconnectable from one another by rotating the two parts relative to one another in a direction which is opposite to the direction in which the parts are rotated in order to achieve connection. The two parts of the connectors 10, 110, 210, 310 are frictionally engaged with one another. Where both parts of the connector 10, 110, 210, 310 are manufactured from an unpliable material, the engagement formations are unable to disengage one another by virtue of a force being applied in a longitudinal direction. Where one or both of the parts are manufactured from a pliable material, the two parts, when engaged or fully engaged, may be "peeled" apart, by deforming the or each pliable part.

However, the connection may be made permanent. For example, at least one part may include a locking formation such as a catch, tenon or barb, which inhibits or prevents rotation of the parts of the connector relative to one another in the direction opposite to the engagement direction.

Adding a projection to a part of the connector 10, 110, 210, 310 may increase the frictional engagement between the two parts. For example, narrowing a receiving formation may tighten the receiving formation's grip on the corresponding engagement formation of the other part. Overcoming this increased friction may cause "locking" of the two parts in an engaged configuration. It may be necessary to use a tool to overcome the increased friction.

A separate locking device, for example a pin or bolt, may be provided to hold the two parts of the connector together in an engaged configuration. Each engagement formation of each part of each connector may act as a pawl, which engages with a receiving formation, the upper surface of which includes a series of steps, in the form of a ratchet. Additionally, or alternatively, one or both parts of the connector may be provided with an adhesive which permanently, or semi-permanently, bonds the two parts of the connector together in the fully engaged position, or in a partially engaged position relative to one another.

Figure 14:
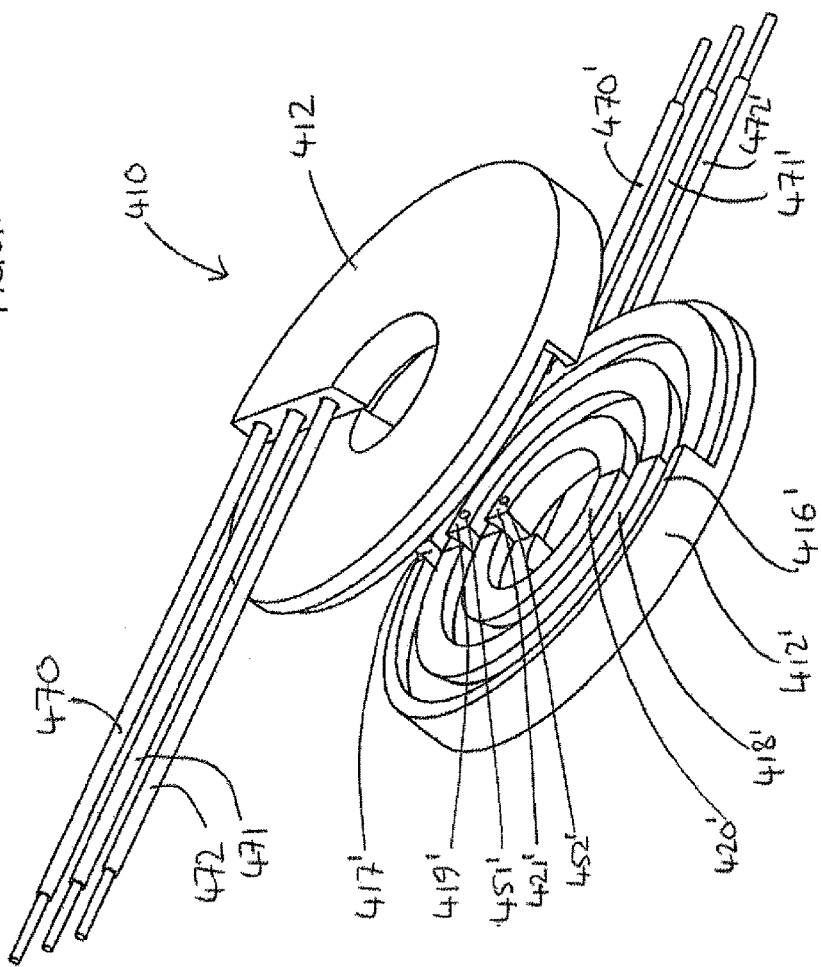
FIG. 14 is a perspective view of a device including electrical connections.
Figure 15:
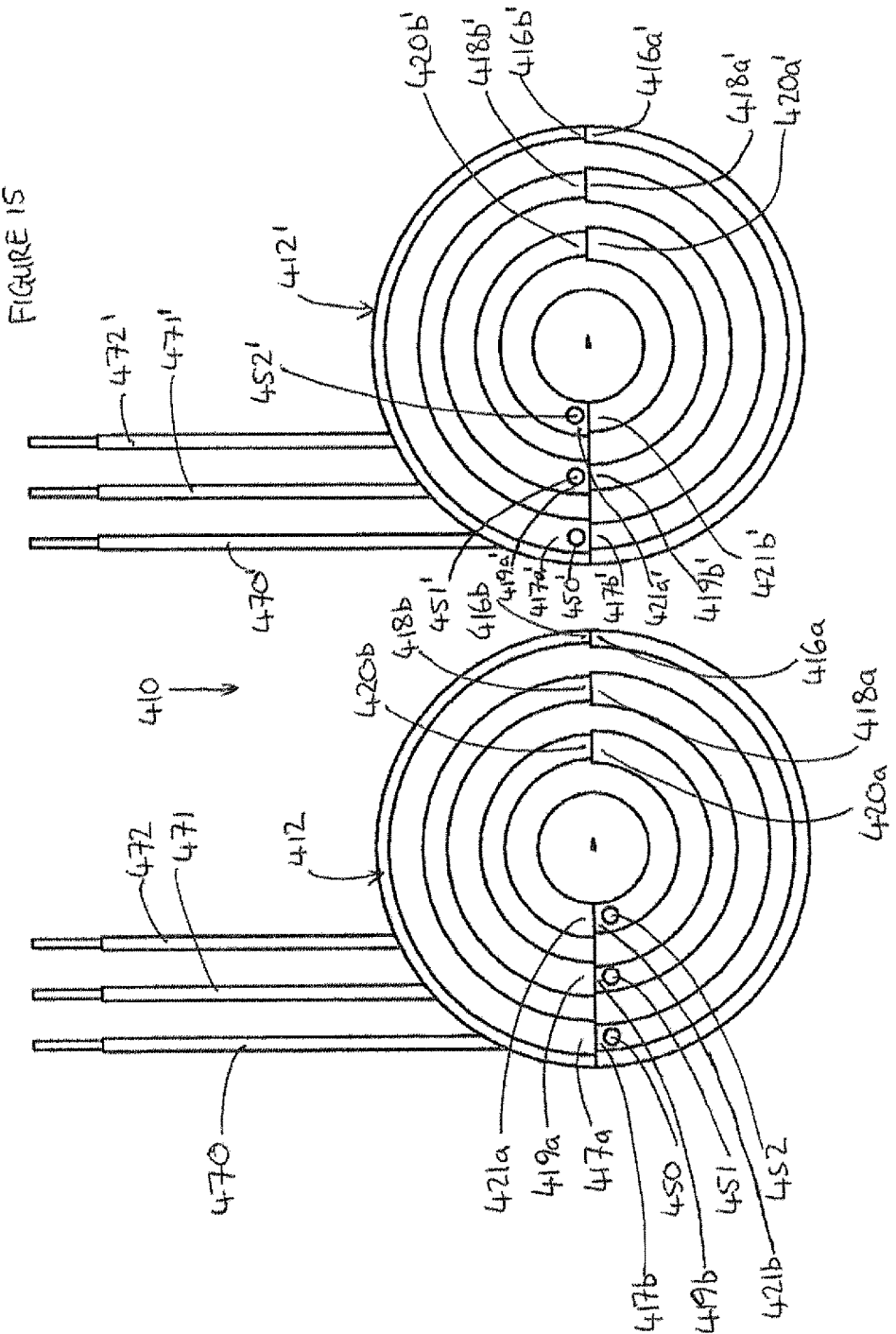
FIG. 15 is a plan view of the device of FIG. 14.

Each of the connectors described above may be an electrical connector. Such a connector is shown at 410 in FIG. 14. The connector 410 is similar to the first embodiment of the invention, but could alternatively have a similar configuration to the second, third or fourth embodiments. The connector 410 has a first part 412 and a second part 412'. The present example of the first part 412 includes six engagement formations 416, 417, 418, 419, 420, and 421. Each of the engagement formations has a first end 416a, 417a, 418a, 419a, 420a, 421a, and a second end 416b, 417b, 418b, 419b, 420b, 421b. The first part 412 includes three electrically conductive elements 450, 451, 452 each of which is positioned on an upper surface of the respective engagement formation towards the second end thereof. Each electrically conductive element 450, 451, 452 is connected to an electrical connector, for example a wire 470, 471, 472 each of which is embedded in the first part 412 of the connector 410. Three wires are shown in the present example. The first wire 470 may be a live wire, the second wire 471 may be a neutral wire and the third wire 472 may be an earth, for example.

The second part 412' of the connector 410 is similar to the first part 412, insofar as it includes six engagement formations 316' 317', 318', 319', 320', 321', each having a substantially helicoidal upper surface. The second part 412' include three electrically conductive elements 450', 451' and 452', each of which is positioned towards the first end of an engagement formation, on the upper surface thereof. Each electrically conductive element 450', 451' 452' is connected to an electrical conductor, for example, a wire 470', 471', 472'.

It will be understood that the number of engagement formations, receiving formations and electrically conductive elements shown provided on each part 412, 412' is exemplary, and any number may be provided as required. In use, the two parts 412, 412' are inter-engaged in a similar manner to the first connector 10, described above. The positions of the electrical elements 450-452, 450'-452' on the two parts 412, 412' are such that when the two parts 412, 412' are fully engaged, each electrical element 450-452 of the first part 412 contacts the corresponding electrical element 450'-452' of the second part 412', permitting the flow of electrical current from one part 412, 412' of the connector 410 to the other part 412, 412'. Therefore, the connector 410 may be used as an electrical connector as part of an electric circuit.

Of course, different numbers of electrical elements may be provided, and the electrical elements may be positioned or configured differently. The only requirement is that at least a part of an electrical element which is positioned on the first part 412 contacts at least a part of an electrical element which is positioned on the second part when the two parts 412, 412' of the connector 410 are fully or partially engaged.

The positions of the electrically conducting elements may be staggered, such that the connections are made sequentially, rather than simultaneously as the two parts 412, 412' of the connector 410 are interengaged.

The electrically conducting elements may be positioned such that contact between the electrically conducting elements of the two parts is not effected until a further component or assembly is added, or until a further connecting step is carried out.

The connector 410 may be used as an alternative to terminal block, which is well known in the field of electric circuits. The wires 470-472, 470'-472' need not be integral with the parts 412, 412' of the connector 410, and in such a situation, a user is able to connect a cable or wire, for example to one part 412, 412' of the connector 410, and another wire, cable or part of an electrical device to the other part of the connector 410, then rotate the two parts 412, 412' of the connector 410 together so as to complete an electrical circuit. Apart from the electrical elements 450-452, 450'-452', the connector 410 is manufactured from an electrically insulating material. Alternatively, the entire connector may be manufactured from an electrically conducting material. The electrical elements 450-452, 450'-452' may have a safety covering, for example, which is removed during rotation of the two parts 412, 412' relative to one another, such that the electrical elements 450-452, 450'-452' are not accessible to a user, so as to reduce or avoid the risk of electrocution.

The connector 410 may be used as a means of holding an electrical device in or on a docking device, or in or on a charging device. Known docking/charging devices generally rely upon a connector on a base of the electrical device being held in contact with an electrical connector on the docking or charging device. Known docking/charging devices are generally reliant on the electrical device being held in or on the docking/charging device under gravity. An electrical item bearing one part of the electrical connector 410, is electrically connectable to a docking/charging device which carries the other part of the connector 410, by means of rotation. Such an electrical connection is secure, and is not gravity-dependent, and does not require repeated insertion and removal of a connector or a lead, for example, into a "port" of the device. The connector 410 is mounted on or embedded in the exterior of the electrical device.

The amount of wear on the connector is reduced, since the forces applied to effect connection and disconnection are rotational, and hence are not applied in a single direction. The connector has a low-profile, and does not protrude very far, if at all, from the exterior of the electrical device.

A seal, for example an o-ring, may be positioned externally of the connector 410, to increase the Ingress Protection (IP) rating of the connector 410. A seal or sealant may additionally or alternatively be provided between adjacent engagement formations of one or both parts 412, 412' of the connector 410.

One or both parts 412, 412' of the connector 410 may be manufactured from an elastomeric material, so as to provide snug inter-engagement of the two parts 412, 412', which improves the water-tightness of the connection.

Figure 16:
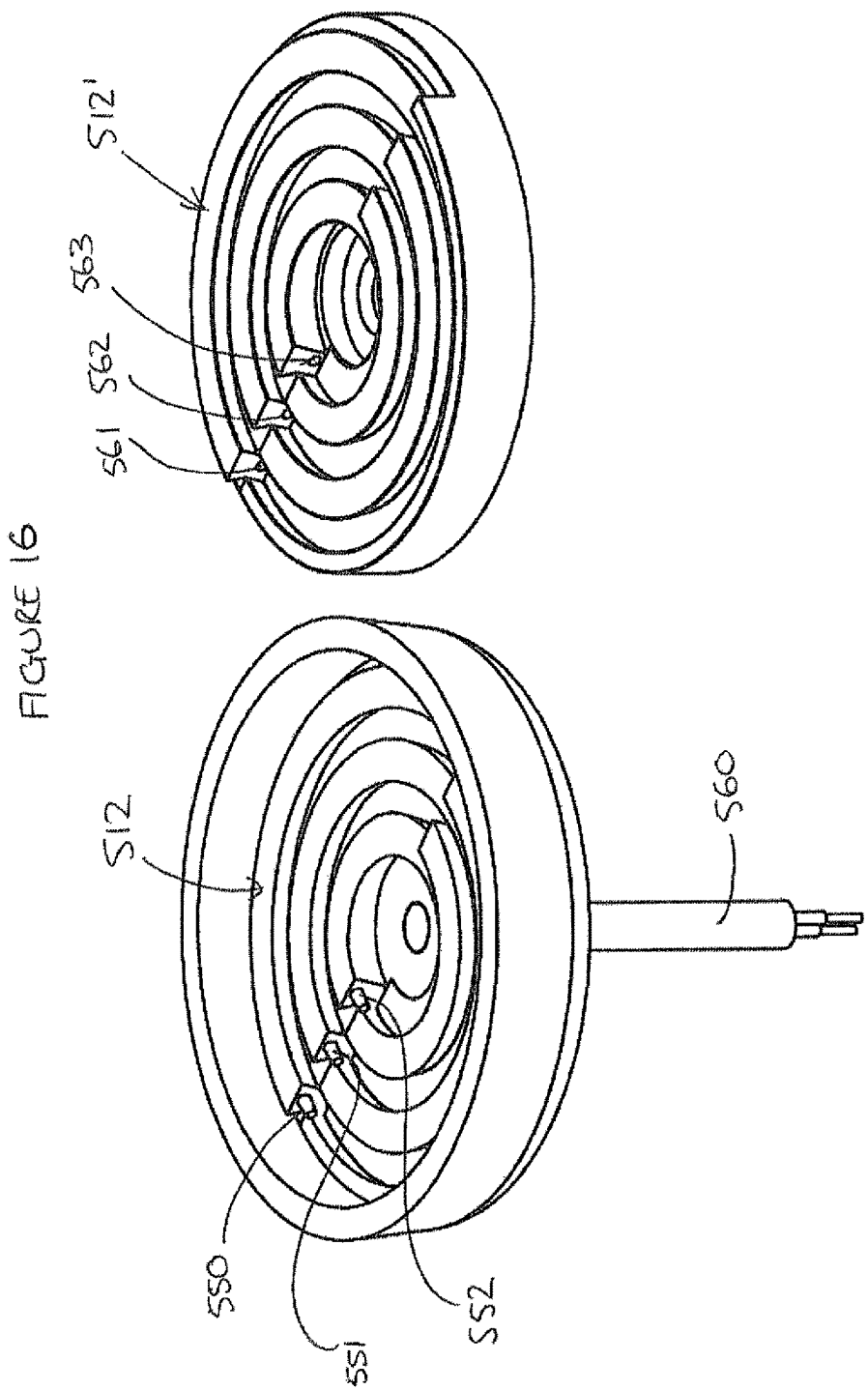
FIG. 16 is a perspective view of two parts of a device including a connector having electrical connections.
Figure 17:
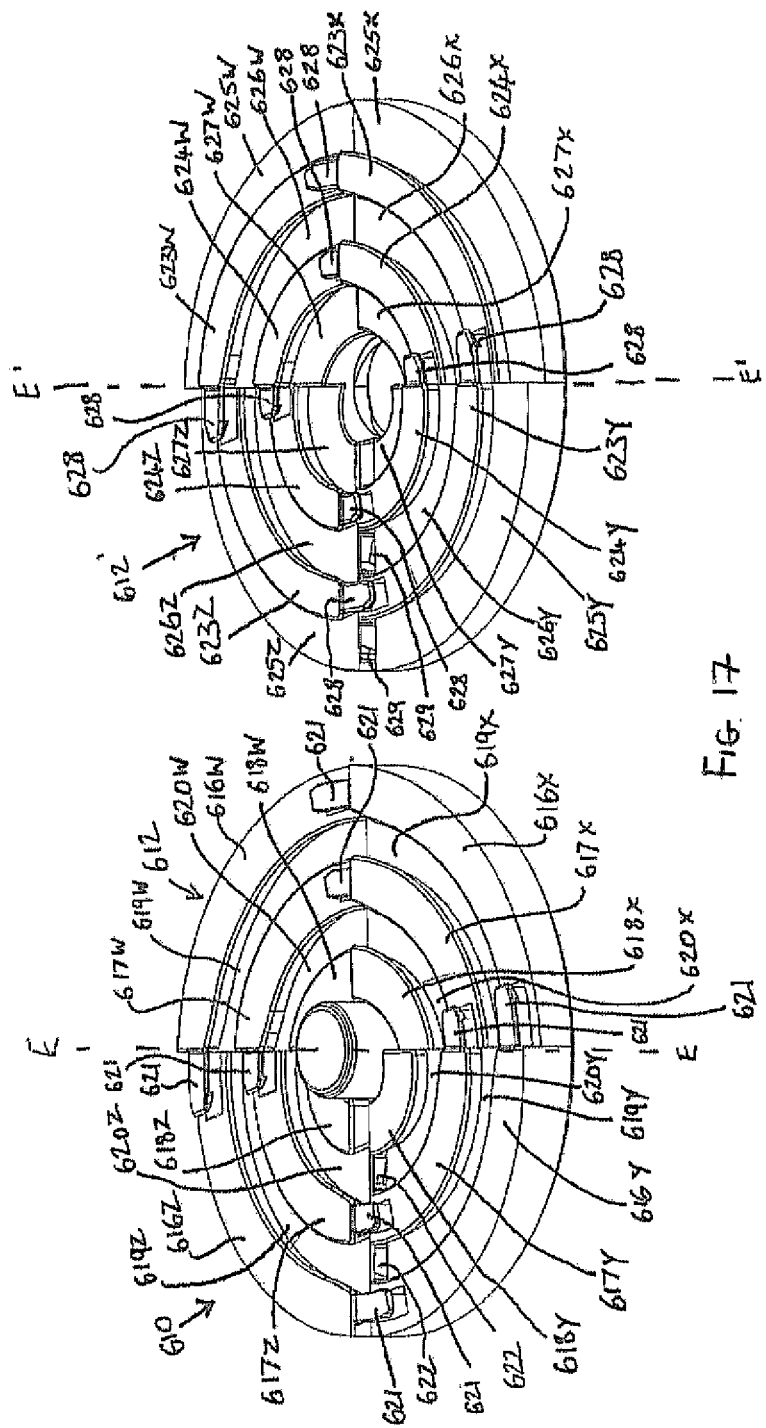
FIG. 17 is a perspective view of a fifth embodiment of a device in accordance with the present invention.

Such a connector can be provided as an electrical connection, for example in a ceiling rose for a light fitting, as shown in FIGS. 16 and 17. The connector 510 is similar to the connector 410 described above, except that the electrically conducting elements are positioned on end faces of the engagement formations. Each engagement formation of first part 512 includes an electrically conductive pin 550, 551, 552 and each engagement formation of a second part 512' of the connector 512 includes an opening 560, 561, 562 which includes an electrically conductive element and in which a pin 550, 551, 552 of the first part 512 is receivable when the two parts 512, 512' of the connector 510 are connected together.

Each pin 550, 551, 552 of the first part is connected an electrical cable which is connectable to an electrical device, for example a lighting device. Each pin 550, 551, 552 may be connected to a respective cable, for example live, neutral and earth.

The second part 512' of the connector is connected to a lighting circuit, and is attachable to a surface, for example a ceiling. Each electrical element is electrically connected to the lighting circuit. Each electrical element is embedded in the second part 512' of the connector 510, such that the electrical elements cannot be touched, inadvertently or intentionally. The pins 550-552 of the first part 512 are of a relatively small diameter and the openings 560-562 are of a corresponding diameter, such that a human finger, for example, is too large to fit inside the opening and contact the electrically conductive elements.

In use, a lighting device is attached to the cables 560 extending from the first part 512 of the connector. The second part 512' is attached to a lighting circuit.

An electrical connection is made between the lighting device and the lighting circuit by offering the first part 512 of the connector up to the second part 512' such that connecting faces of the two parts face one another, and rotating the first part 512 relative to the second part 512' so as to inter-engage the engagement formations of the two parts 512, 512', until the pins 550-552 are received in the openings 560-562 of the second part 512', and the electrically conductive elements of both parts 512, 512' are in contact with one another. The two parts 512, 512' are fixable in the engaged configuration, for example by inserting fasteners through both parts of the connector 510.

Figure 18:
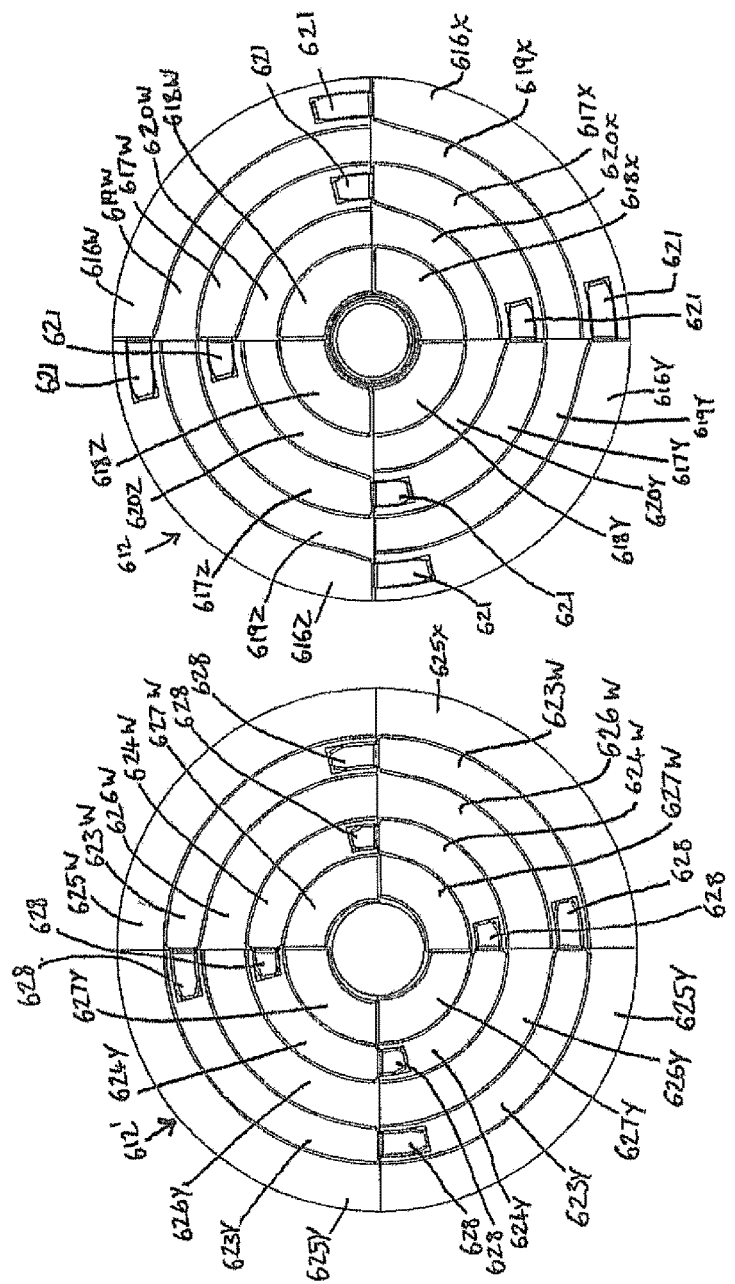
FIG. 18 is a plan view of the device shown in FIG. 17.
Figure 19:
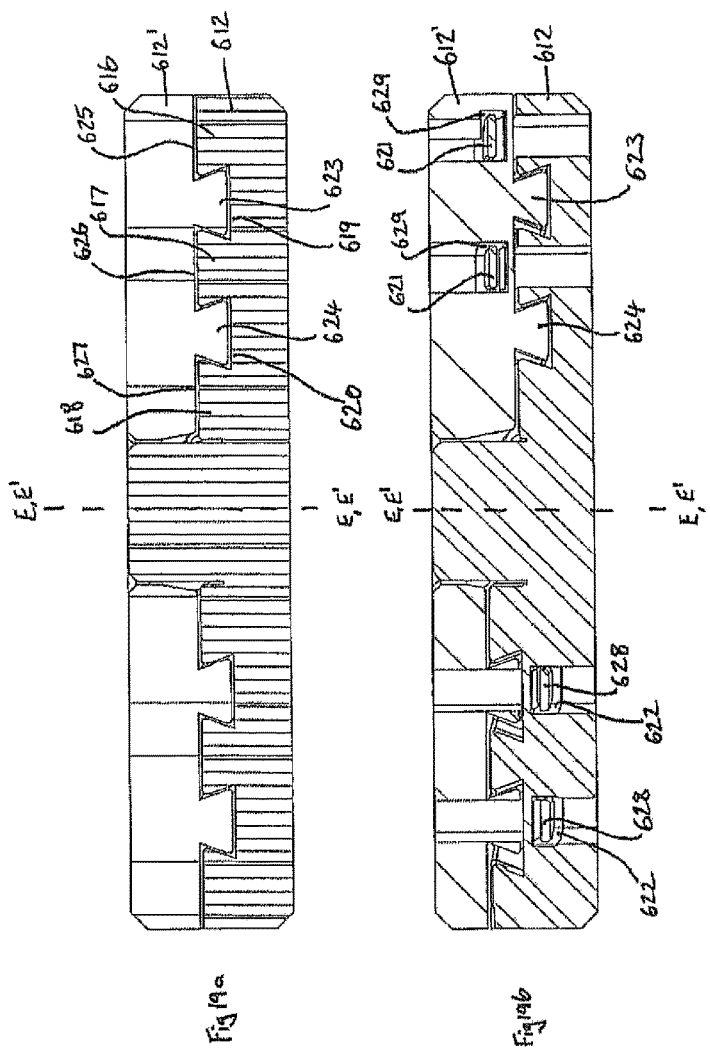
FIGS. 19a and 19b are cross sectional views of the device of FIG. 17, with two parts of the device connected together.

An example of a connector 610 having a locking formation is shown in FIGS. 17 to 19. The connector 610 is similar to the connector 110, inasmuch as the connector is a "quadruple pick-up" 90° rotation connector. The connector includes two parts 612, 612'. The two parts are not identical, but are engageable with one another. Each part 612, 612' has a respective connecting face which is substantially transverse to a longitudinal axis E, E' of the respective part 612, 612'.

The first part 612 includes a plurality of engagement formations 616, 617, 618. Any number of engagement formations may be provided, as required. The engagement formations 616-619 are substantially annular, and are concentric about the longitudinal axis E. Each engagement formation 616-619 extends axially, in a direction which is substantially parallel to the longitudinal axis E.

Each engagement formation 616-618 includes four sectors W, X, Y Z. Each sector W, X, Y, Z of each engagement formation 616-618 has a first end and a second end. The sectors W, X, Y, Z of each formation are arranged head-to-tail, such that the first end of each sector W, X, Y, Z is circumferentially adjacent the second end of an adjacent sector W, X, Y, Z. Each sector W, X, Y, Z is a partial helicoid. However, it will be appreciated that each sector may have a substantially flat upper surface, provided that together the sectors W, X, Y, Z of each engagement formation 616-618 describe a substantially helicoidal connecting face. Each sector W, X, Y, Z extends through approximately 90°.

Each sector W, X, Y, Z of each receiving engagement formation has an end face which is situated at the first end of the sector W, X, Y, Z, such that each engagement formation includes four 'steps'. Each end face of each sector W, X, Y, Z includes a locking formation 621. Each locking formation is a catch which extends circumferentially from the end face of the respective sector W, X, Y, Z. An underside of each catch 621 includes a tooth which extends downwardly from the underside of the catch 621. The underside of each catch 621 is spaced from an upper surface of the adjacent sector W, X, Y, Z, such that there is a clearance between the catch 621 and the upper surface of the adjacent sector W, X, Y, Z. Each catch 621 is thus capable of flexing slightly.

It will be appreciated that as many locking formations 621 may be provided as is deemed necessary, and not every sector of every engagement formation need include a locking formation 621.

Each engagement formation 616-618 is separated from an adjacent engagement formation by a receiving formation 619, 620. The receiving formations 619, 620 are concentric about the longitudinal axis E. Each receiving formation 619, 620 also includes four sectors W, X, Y, Z, each having a first end and a second end. An upper surface of each sector W, X, Y, Z of each receiving formation is preferably substantially helicoidal, but may also be substantially flat, provided that together, the four sectors W, X, Y, Z of each receiving formation describes a substantially helicoidal surface. The sectors W, X, Y, Z of each receiving formation are arranged head-to-tail, such that the first end of each sector W, X, Y, Z is adjacent the second end of an adjacent sector W, X, Y, Z. Each sector W, X, Y, Z includes a recess 622 which is positioned beneath the first end of the sector W, X, Y, Z, and which is communicable with the second end of an adjacent sector W, X, Y, Z.

The second part 612' includes a plurality of engagement formations 623, 624 which are generally annular and concentric about the longitudinal axis E'. The second part 612' also includes a plurality of receiving formations 625, 626, 627. The engagement formations 623, 624 of the second part 612' are similar to the engagement formations of the first part 612, and each includes four sectors W, X, Y, Z. Each sector W, X, Y, Z of each engagement formation 623, 624 includes a locking formation 628, which is similar to the locking formations 621 of the first part 612.

It will be appreciated that as many locking formations 628 may be provided as is deemed necessary and not every sector of every engagement formation need include a locking formation 628.

The receiving formations 625-627 of the second part 612' are similar to the receiving formations of the first part 612, and each also includes four sectors W, X, Y, Z. The receiving formations 619, 620 of the first part 612 are engageable with the engagement formations 623, 624 of the second part 612' and the receiving formations 625, 626, 627 of the second part 612' are engageable with the engagement formations 616, 617, 618 of the first part 612. Each sector W, X, Y, Z of each receiving formation 625-627 of the second part 612' includes a recess 629, which is similar to the recesses 622 of the first part 612. The number of recesses 629 provided in the second part 612' preferably corresponds to the number of locking formations 621 provided on the first part 612, and vice versa.

When the two parts 612, 612' are engaged with one another, as described in relation to other embodiments, i.e. by rotation of the two parts 612, 612' relative to one another, and by engagement of each engagement formation 616, 617, 618, 623, 624 with a receiving formation of the other part 612, 612', the locking formations 621, 628 of each part 612, 612' are receivable in and engageable with a corresponding recess 622, 629 of the other part 612, 612'. Once the two parts have been rotated such that the two parts are 'home', each locking formation 621, 628 enters the corresponding recess 622, 629 beneath the first end of the adjacent sector W, X, Y, Z of the corresponding receiving formation of the other part 612, 612'. The tooth of each catch 621, 628 impinges on a substantially longitudinally extending face of an adjacent receiving formation 619, 620, 625, 626, 627 with which the engagement formation 616, 617, 618, 623, 624 is engaged. This inhibits or prevents the catch 621, 628 from being disengaged from the recess 622, 629, thus permanently or semi-permanently engaging the two parts 612, 612' in the connected configuration. The flexibility of each of the catches 621, 628 means that, if desired, the two parts 612, 612' may be disengaged from one another, if a sufficient force is applied to rotate the two parts 612, 612' relative to one another in a direction which causes the engagement formations 616, 617, 618, 623, 624 to disengage from the corresponding receiving formation 619, 620, 625, 626, 627 of the other part 612, 612'.

Such a connector may, for example, be used in assembling parts of products which are intended to remain connected to one another, as the locking formation inhibits or prevents inadvertent disconnection of the parts.

Figure 20:
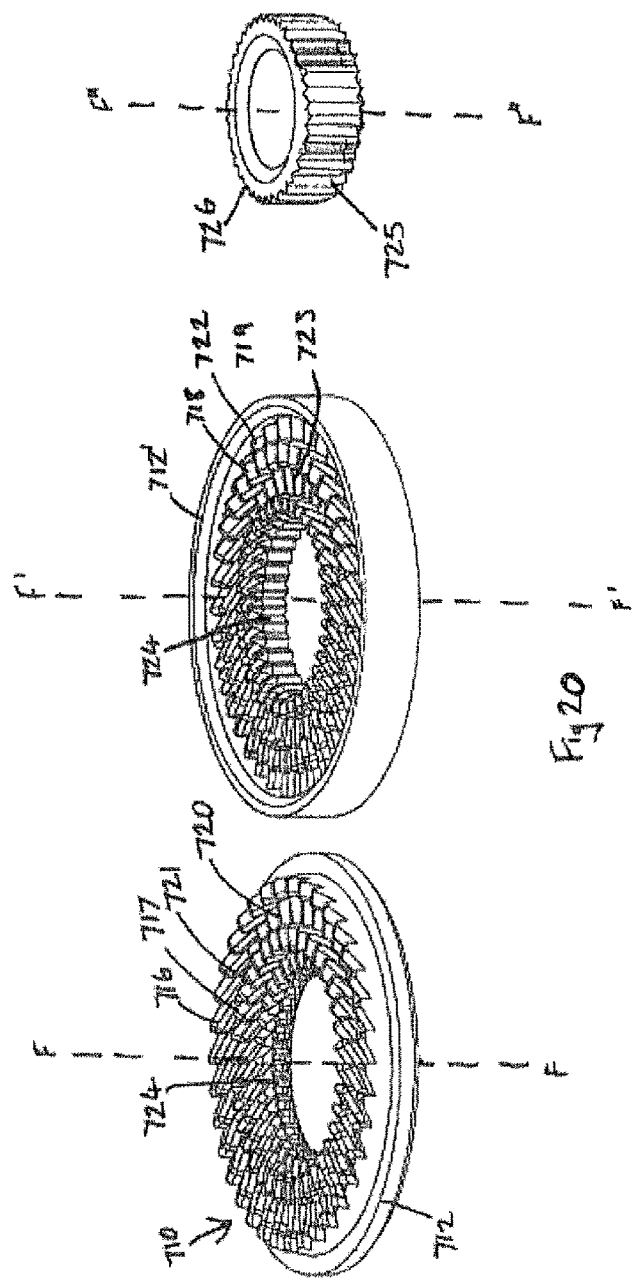
FIG. 20 is a perspective view of a sixth embodiment of a device in accordance with the present invention, the device including a separate locking member.
Figure 21:
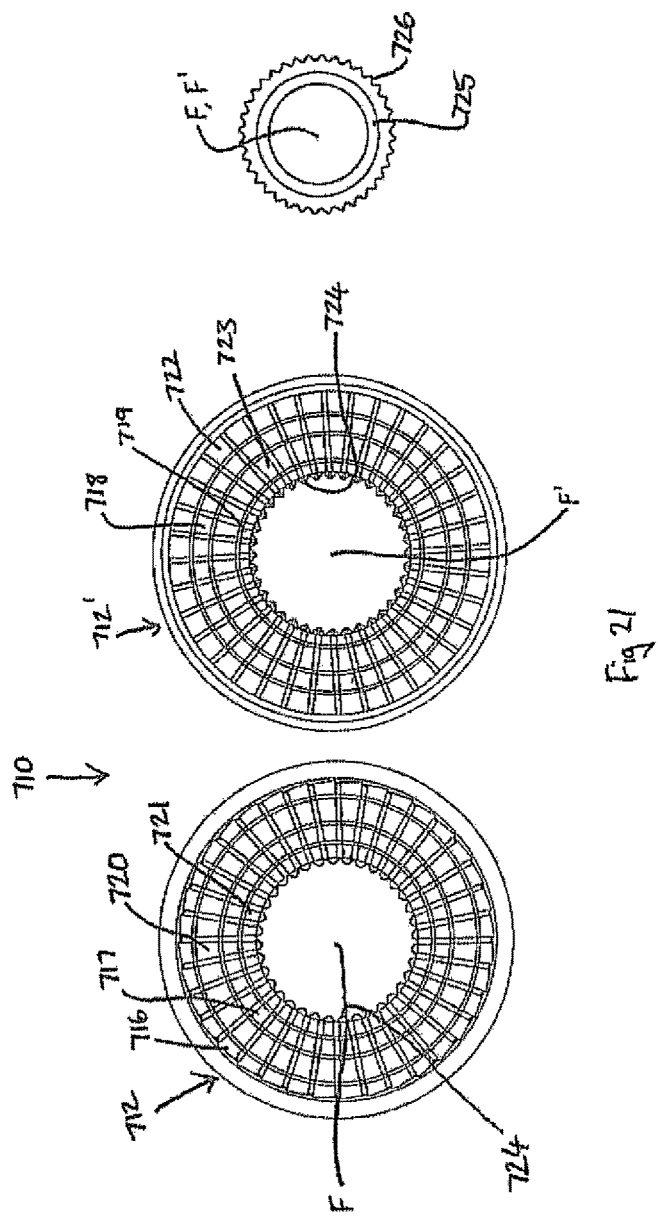
FIG. 21 is a plan view of each part of the device of FIG. 20.
Figure 22:
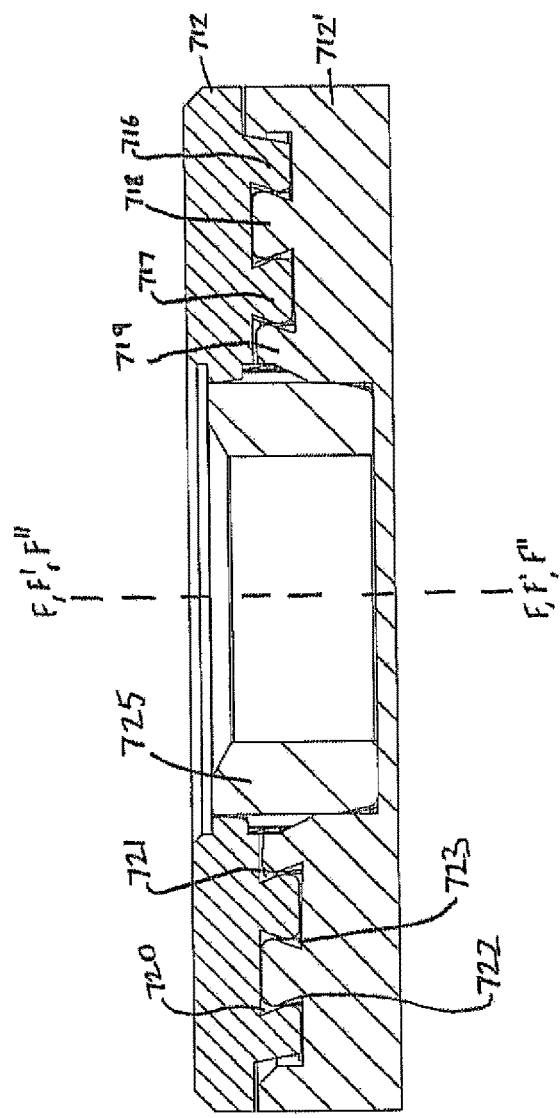
FIG. 22 is a cross-sectional view of the parts of the device connected together, with the locking device in place.

An example of a connector 710 having a separate locking device is shown in FIGS. 20 to 22.

The connector 710 has two connecting parts, 712, 712', each having a connecting face which is substantially transverse to a longitudinal axis F, F' of the respective part 712, 712'. The connecting face of each part 712, 712' has a plurality of engagement formations 716, 717, 718, 719. The engagement formations 616-620 are annular and concentric about the respective longitudinal axis F, F'. Each engagement formation 716-719 has a plurality of segments, each of which has a substantially helicoidal upper surface. In the example shown, each engagement formation 716-719 includes thirty-six segments, such that the connector 710 is a thirty-six pick up point, 10° rotation connector.

Each engagement formation 716-719 of each part 710 is radially spaced from an adjacent engagement formation 716-719 by a receiving formation 720, 721, 722, 723. Each engagement formation 716-719 of each part 712, 712' is engageable with a respective receiving formation 720-723 of the other part 712, 712'.

The pitch of the engagement formations 716-719 and the receiving formations is relatively large, for example the pitch may be 180 mm. As a result of this and the fact that the degree of rotation required to achieve full engagement is relatively small, it is possible for the two parts 712, 712' to engage one another under gravity, without any external rotational force having to be applied to the two parts 712, 712'.

Each part 712, 712' is substantially annular and has an inner circumference which includes a locking formation 724. In the example shown, the locking formation 724 includes a plurality of splines or teeth, which are provided in a zig-zag configuration. The splines extend radially inwardly from the inner circumferences of the two parts 712, 712'. The locking formations 724 of the two parts 712, 712' lie adjacent one another, one above the other, when the two parts 712, 712' are fully engaged with one another.

The connector 710 also includes a locking device 725 which is substantially circular, and this case is annular. The locking device has a substantially longitudinal axis F". A nominal outer circumference of the locking device 725 is substantially the same as a nominal inner circumference of each of the parts 712, 712', such that a push fit engagement between the locking device 725 and the two parts 712, 712' is permitted. The outer circumference of the locking device 725 includes a second locking formation 726, which is engageable with the locking formations 724 of the two parts of the connector 712, 712'.

The second locking formation also includes a plurality of splines or teeth in a zig-zag configuration, which are engageable with the splines of the locking formations 724 of the first part 712 and the second part 712'. The splines of the locking device 725 extend generally outwardly from the outer circumference of the locking device 725.

Once the two parts 712, 712' of the connector 710 are engaged with one another, by rotation of the two parts 712, 712' relative to one another, the locking device 725 is receivable through the centers of the two annular parts 712, 712'. The locking device is slideable in a generally longitudinal direction, through the connected parts 712, 712', by off-setting the teeth of the locking formations 724 from the teeth of the locking formation 726 of the locking device 725. The height of the locking device 725 is such that it is simultaneously engageable with the first part 712 and the second part 712' of the connector 710.

The teeth of the interlocked locking formations 724, 726 prevent or inhibit rotation of the two parts 712, 712' with respect to one another, thus preventing or inhibiting disconnection of the two parts 712, 712'. If it is subsequently desired to disconnect the two parts 712, 712', then the locking device 725 is slideable out of engagement with one or both of the parts 712, 712' to enable the two parts to rotate in a direction opposite to that which causes engagement of the two parts 712, 712'. If it is desired to permanently connect the two parts together, the locking device 725 may be adhered to the two parts 712, 712' of the connector 710.

Minimal rotation is required to engage and disengage the parts of the connector, and therefore is quick to use. Therefore, such a connector may be used in a fire extinguisher or gas cylinder bracket, where a strong connection is required, but a quick release mechanism is also required.

This embodiment of the invention may be particularly useful in hanging pictures or other wall mounted objects, as it is possible to achieve engagement by the application of an axial load.

Figure 24:
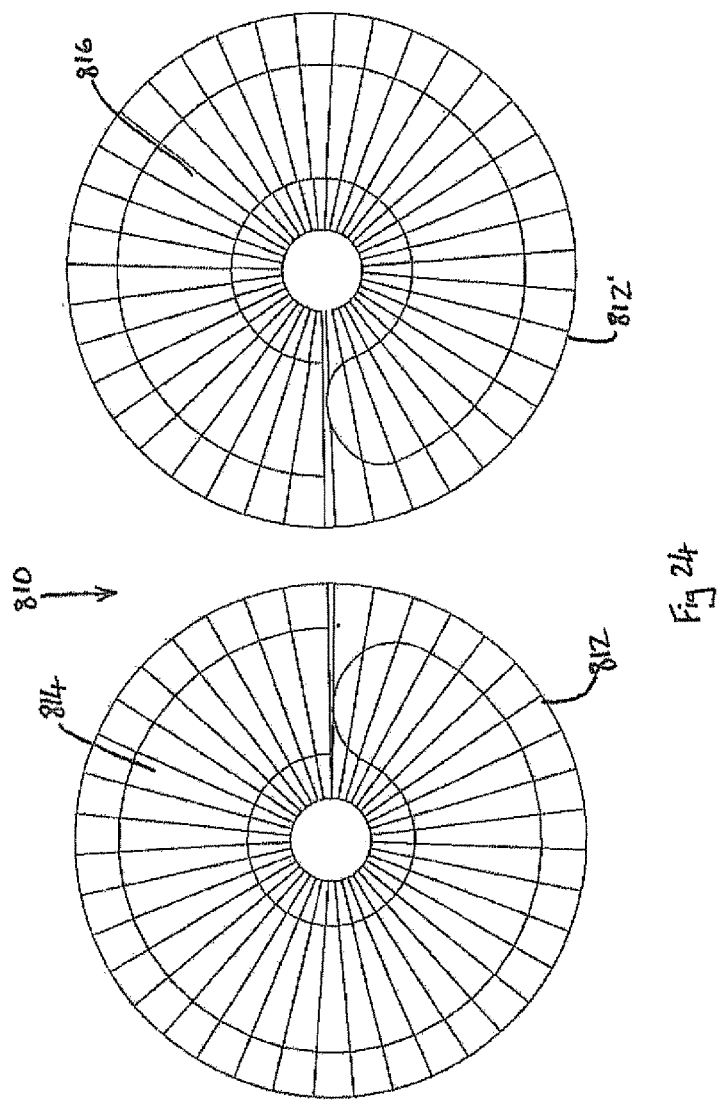
FIG. 24 is a plan view of the device of FIG. 23.
Figure 25:
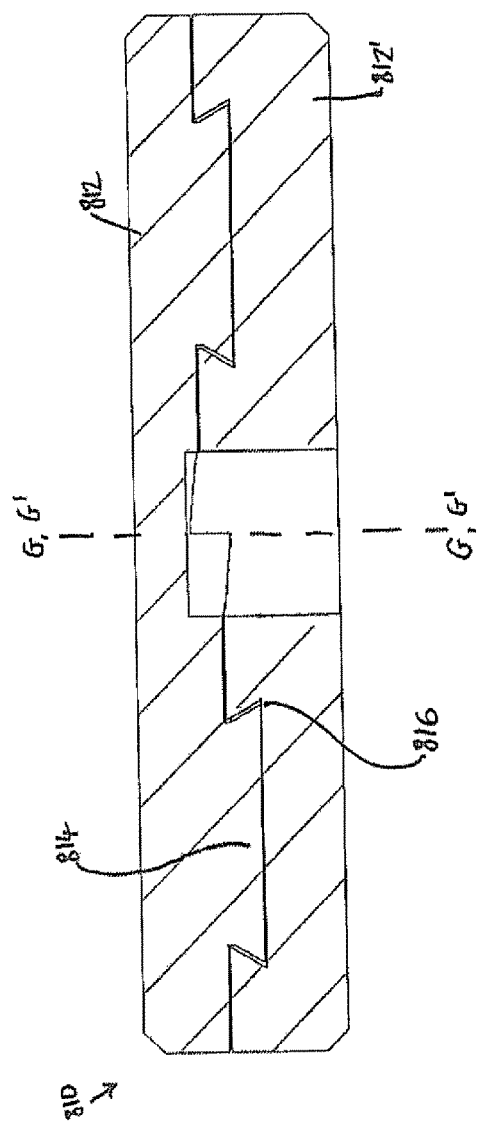
FIG. 25 is a cross-sectional view of two parts of the device connected together.

Whilst each of the embodiments is described above as having an engagement formation and a receiving formation including a plurality of sectors, wherein each of the sectors has a substantially helicoidal surface, each sector may have a substantially flat surface, wherein together, the sectors of each engagement formation or receiving formation describe a substantially helicoidal connecting face. Such a connector is shown in FIGS. 23 to 25.

A connector 810 has a first part 812 and a second part 812', each of which has a respective longitudinal axis G, G'.

The first part 812 includes a connecting face which extends substantially transversely relative to the longitudinal axis G. The connecting face includes an engagement formation 814 which has a substantially helicoidal surface. It will be appreciated that the connecting face may include a plurality of engagement formations which may be arranged substantially concentrically. The engagement formation 814 includes a plurality of segments. Each segment has a substantially flat surface which is substantially transverse to the longitudinal axis G. However, the segments are stepped, such that each successive segment is at a slightly different height Together the segments form a substantially helicoidal upper surface of the engagement formation 814.

The second part 812' includes a receiving formation 816, with which the engagement formation 814 of the first part 812 is engageable, by rotation of the first and second parts 812, 812' relative to one another. The receiving formation includes a connecting face which extends substantially transversely relative to the longitudinal axis G'. Similarly to the engagement formation 814 of the first part 812, the receiving formation 816 includes a plurality of segments, each of which has a substantially flat lower surface which extends generally transversely to the longitudinal axis G', and each of which is a different height from adjacent segments such that a lower surface of the receiving formation 816 is substantially helicoidal. The lower surface of the receiving formation and the upper surface of the engagement formation 14 are 'stepped'.

Advantages of this embodiment of the invention are that the interaction of the 'steps' at the junctions of adjacent sectors of the engagement formation 814 and the receiving formation 816 inhibits or prevents disengagement of the two parts particularly under a load applied in a substantially axial direction. Removal of the load reduces the amount by which the steps of the engagement formation 814 and the receiving formation 816 impinge on one another, and rotation of the two parts 812, 812' relative to one another to enable disengagement is possible.

This embodiment of the invention may be particularly useful in the fixing of heavy loads for transportation. The downward force applied to the connector during use inhibits disengagement of the two parts of the connector, thus holding the load in position relative to a surface of a transportation vehicle.

Figure 26:
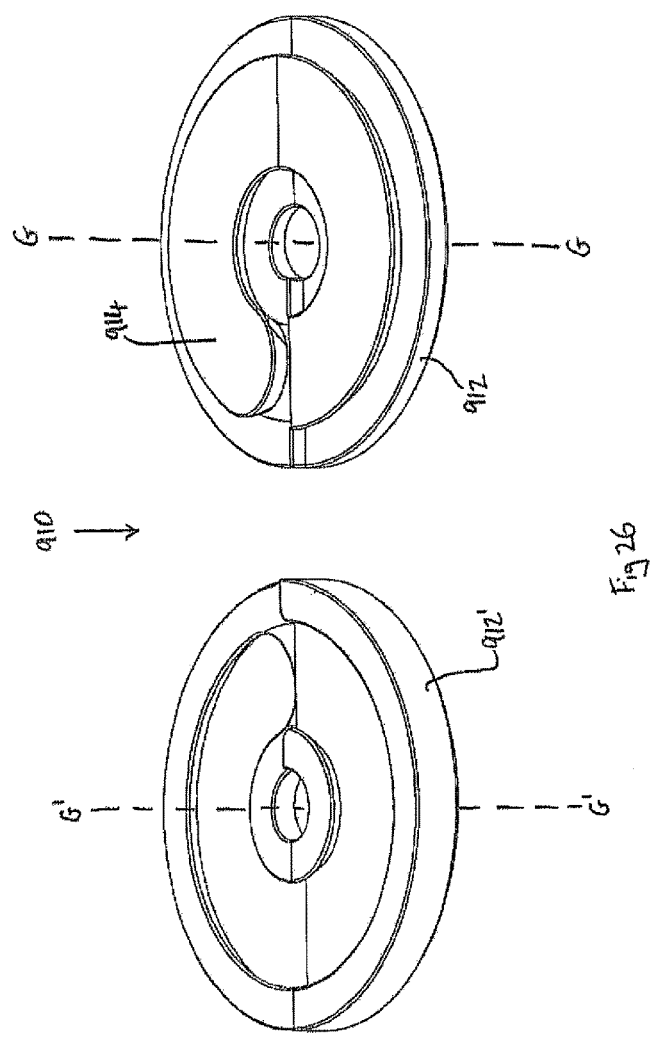
FIG. 26 is a perspective view of an eighth embodiment of the device of the present invention.
Figure 28:
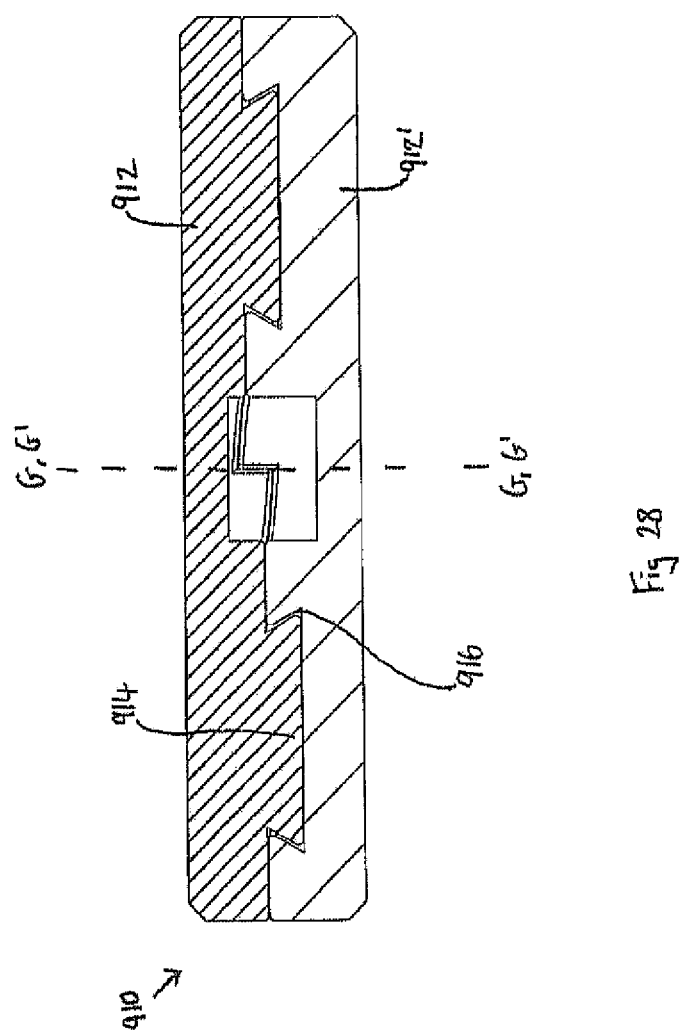
FIG. 28 is a cross-sectional view of two parts of the device connected together.

A simpler embodiment of the connector 810 is shown generally at 910 in FIGS. 26 to 28. The connector 910 is similar in the majority of aspects to the connector 810, and similar parts are given similar numbers, but prefixed with a '9', instead of an '8' The engagement formation 914 of the first part does not include a plurality of sectors and has a smooth, substantially helicoidal surface. Similarly, the receiving formation 916 does not include segments and has a smooth, substantially helicoidal lower surface, with which the engagement formation 914 of the first part 912 is engageable.

The connectors 810 and 910 described and shown in FIGS. 23 to 28 are single pick-up, 360° rotation connectors, but it will be appreciated that the engagement formations and the receiving formations may include segments which are stepped in such a way as to provide an alternative number of pickup points and to alter the angle through which the two parts 812, 812' have to be rotated relative to one another to achieve full engagement. The number of segments provided may be selected as appropriate.

The connectors 810, 910 provide relatively strong connections, owing to the need to rotate the parts through 360° to achieve full engagement and, subsequently, disengagement. Therefore, it is difficult to inadvertently disengage the two parts. These connectors may be particularly useful in attaching ceiling roses or other fittings to ceilings or walls.

Figure 29:
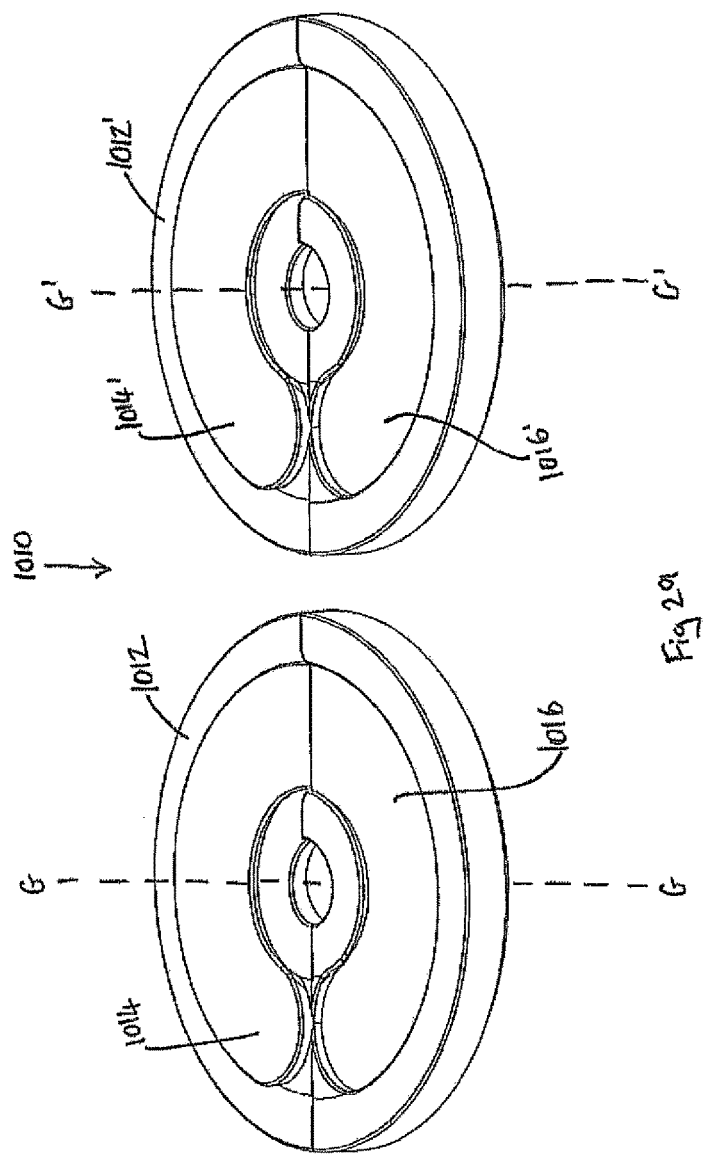
FIG. 29 is a perspective view of a ninth embodiment of the device of the present invention.
Figure 30:
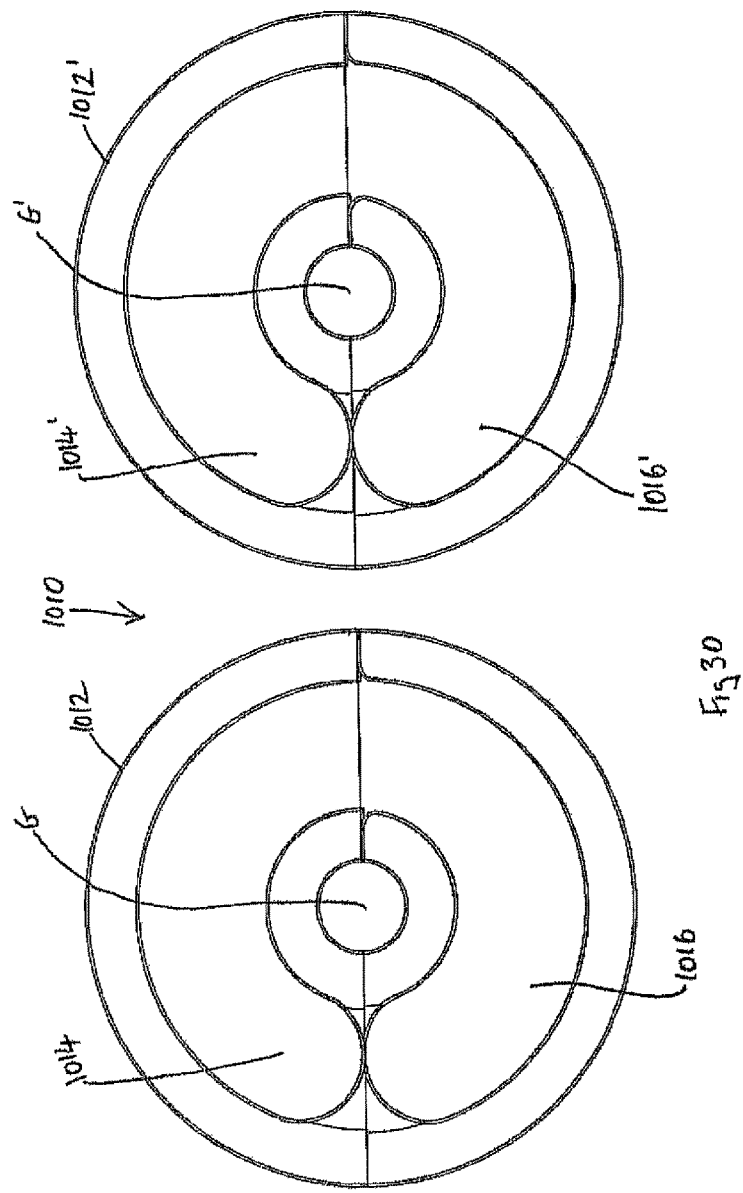
FIG. 30 is a plan view of the device of FIG. 29.
Figure 31:
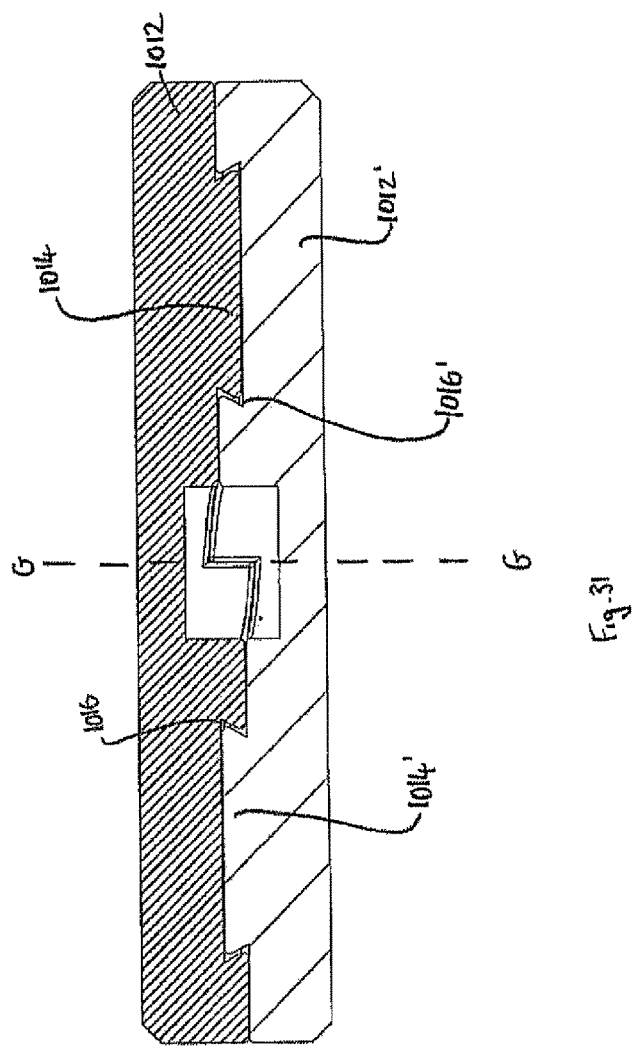
FIG. 31 is a cross-sectional view of two parts of the device connected together.

An alternative embodiment to the connectors 810, 910 is shown at 1010 in FIGS. 29 to 31. The connector 1010 is similar to connectors 810, 910 and features which are similar have similar reference numerals, preceded with '10' rather than '8' or '9'. The connector 1010 differs from the connectors 810 and 910 in that the two parts 1012, 1012' of the connector 1010 are identical to one another.

Each part 1012, 1012' has a connecting face which extends substantially transversely to a respective longitudinal axis G, G'. Each connecting face includes a respective engagement formation 1014, 1014' and a respective receiving formation 1016, 1016'. The engagement formation 1014 of the first part 1012 is receivable in the receiving formation 1016' of the second part 1012' and vice versa.

The connector 1010 is 'hermaphroditic', and hence is also similar to the first connector 10 described above, but each part has only a single engagement formation 1014, 1014' and a single receiving formation 1016, 1016', rather than having a plurality of concentric engagement formations and receiving formations.

An advantage of 'hermaphroditic' connectors is that only a single molding tool is required for manufacture. The single formation embodiment 1010 is relatively simple, and can be used where a particularly strong connection is not required, for example to connect fabric together, for example in lieu of a button or other fastener in clothing.

Figure 32:
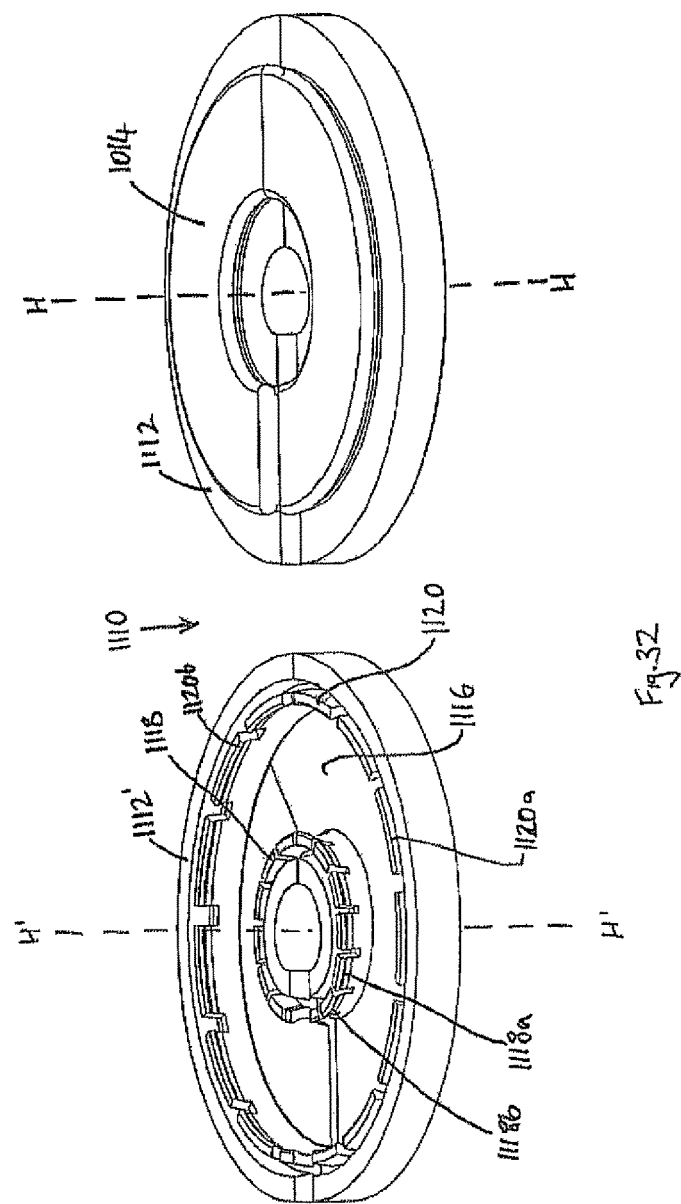
FIG. 32 is a perspective view of an tenth embodiment of the device of the present invention.
Figure 33:
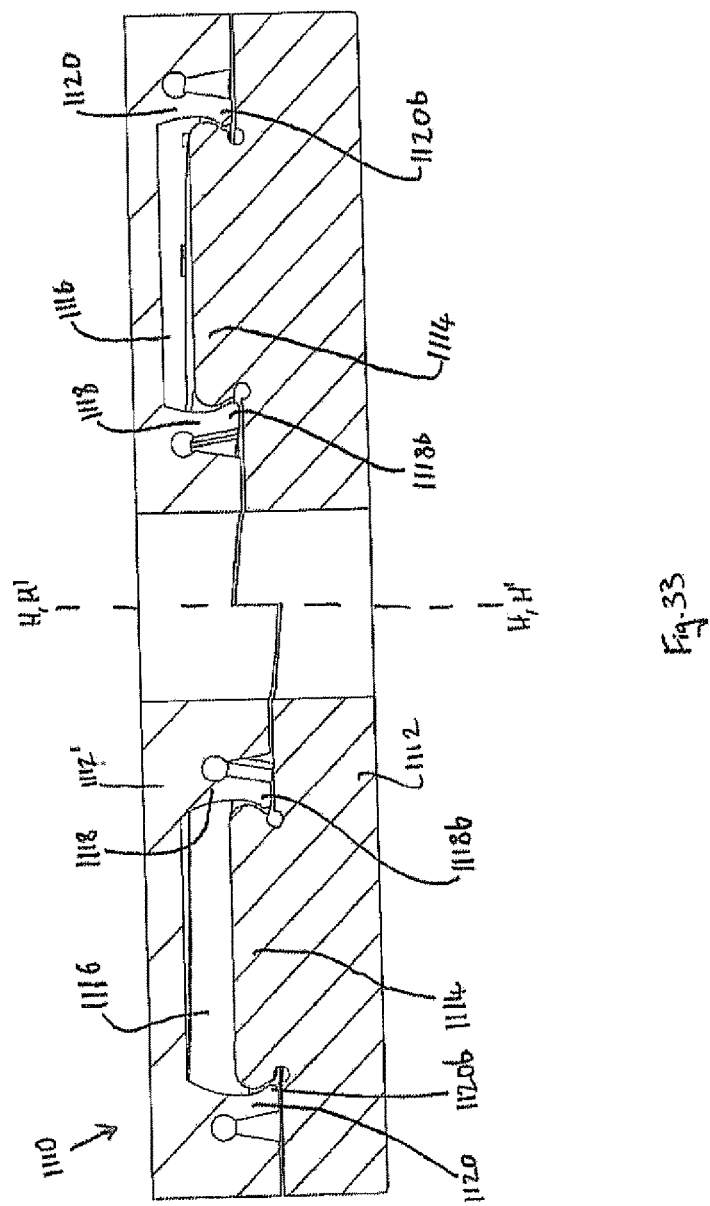
FIG. 33 is a plan view of the device of FIG. 32.
Figure 34:
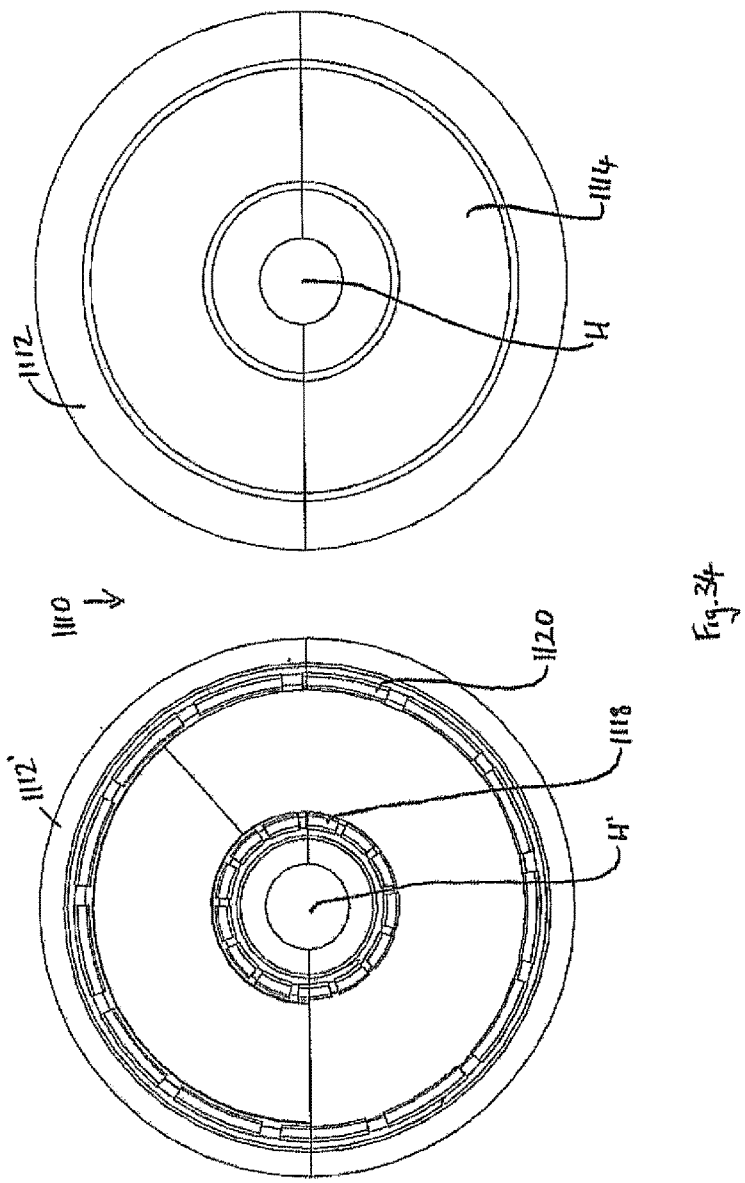
FIG. 34 is a cross-sectional view of two parts of the device connected together.

A further embodiment of the invention is shown in FIGS. 32 to 34. A connector is shown generally at 1110. The connector 1110 has two parts 1112, 1112', each of which has a respective longitudinal axis H, H'. The two parts 1112, 1112' are substantially annular.

The first part 1112 includes a connecting face which extends generally transversely to the longitudinal axis H and includes an engagement formation 1114. The engagement formation 1114 is similar to that of the connector 910, in that it is substantially annular, and has a substantially helicoidal upper surface. The engagement formation has a first end and a second end. The engagement formation 1114 has generally circular side walls which are curved.

The second part 1112' also has a connecting face which extends generally transversely to the longitudinal axis H'. The connecting face of the second part 1112' includes a receiving formation 1116, in which the engagement formation 1114 of the first part 1112 is receivable.

The receiving formation has a substantially helicoidal lower surface, to abut the upper substantially helicoidal surface of the engagement formation 1114 of the first part 1112. The receiving formation of the second part is defined by an inner wall 1118 and an outer wall 1120, each of which is substantially annular. Each wall 1118, 1120 has an upper surface which is substantially helicoidal. Each of the inner wall 1118 and the outer wall 1120 includes a plurality of circumferentially spaced portions 1118a, 1120a, the upper surface of each of which is substantially helicoidal. However, it will be appreciated that the upper surface of each portion 1118a, 1120a may be substantially flat, and generally transverse to the respective longitudinal axis H, H', but a different height to adjacent portions 1118a, 1120a, such that together the upper surfaces of the portions define a substantially helicoidal upper surface.

Each portion 118, 1120 of each wall 1118, 1120 includes a lip 1118b, 1120b, which is positioned at an upper end of the respective wall 1118, 1120. The lip 1118b of each portion 1118a of the wall 1118 extends generally radially outwardly, and the lip 1120b of each portion 1120a of the wall 1120 extends generally radially inwardly.

In use, the first part 1112 of the connector 1110 is engageable with the second part 1112' by virtue of a 'push-fit', when the axes H, H' are aligned. Since the walls 1118, 1120 of the second part 1112' include a plurality of portions, the walls 1118, 1120 are able to flex, and the engagement formation 1114 can be pushed in a generally longitudinal direction into the receiving formation. Full engagement is achieved when the first end of the engagement formation 1114 abuts a first end of the receiving formation 1116, such that the upper surface of the engagement formation 1114 contacts the lower surface of the receiving formation 1116 around the entire circumference of the connector 1110. The lips 1118b, 1120b of the walls 1118, 1120 engage the curved walls of the engagement formation to inhibit the two parts of the connector 1110 being inadvertently pulled apart, or falling apart.

One or both of the parts 1112, 1112' may be made of an elastomeric material to aid the connection of the two parts 1112, 1112', by making the engagement formation 1114 and/or the walls 1118, 1120 flexible.

In order to disengage the two parts 1112, 1112', the parts 1112, 1112' are rotated relative to one another, through almost 360° such that the first end of the engagement formation 1114 is adjacent the second end of the receiving formation 1116. This lifts the engagement formation 1114 out of the receiving formation 1116 slightly (by an amount which is equivalent to the pitch of the helix), so that the two parts 1112, 1112' can more easily be pulled apart. An advantage of the push-fit arrangement is that an audible indication that engagement has been achieved is provided.

Figure 35:
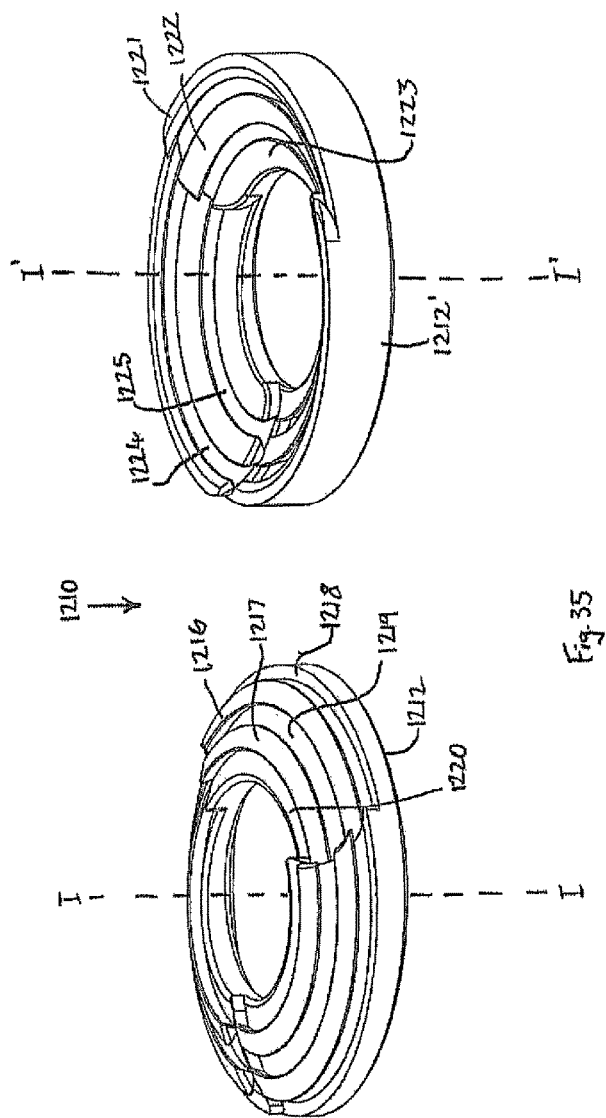
FIG. 35 is a perspective view of an eleventh embodiment of the device of the present invention.
Figure 36:
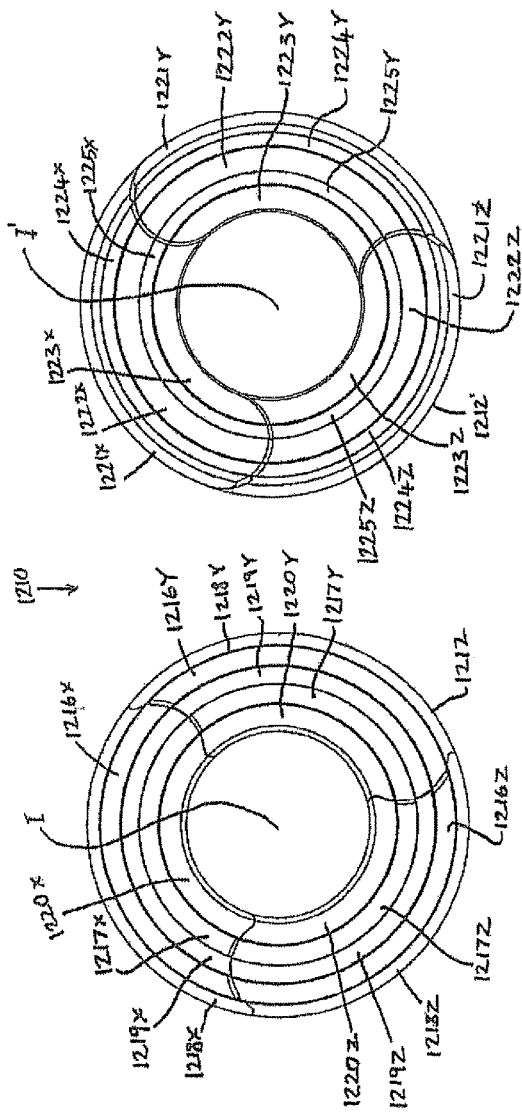
FIG. 36 is a plan view of the device of FIG. 35.
Figure 37:
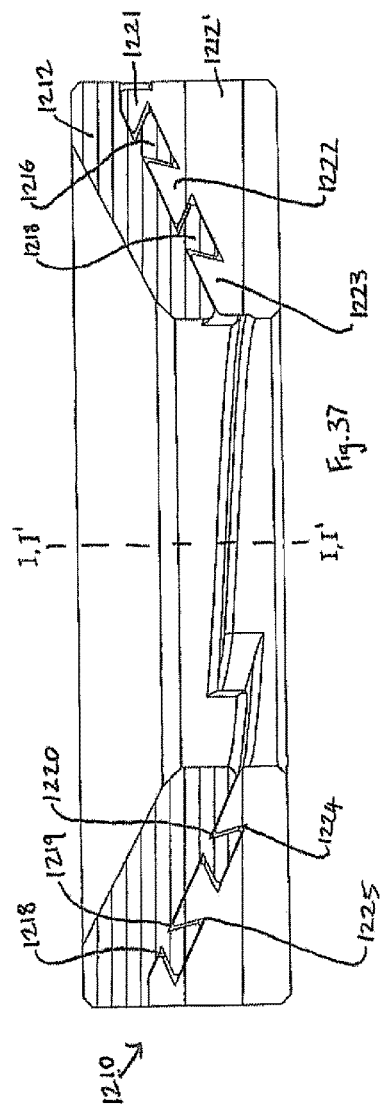
FIG. 37 is a cross-sectional view of two parts of the device connected together.

A further embodiment of the invention is shown in FIGS. 35 to 37 at 1210. The connector 1210 has a first part 1212 and a second part 1212' which are engageable with one another. The two parts 1212, 1212' have respective longitudinal axes I, I'.

The first part 1212 has a connecting face which extends generally transversely relative to the longitudinal axis I. However, the connecting face of the first part 1212 is substantially frusto-conical. The first part 1212 is the male part of the connector 1210.

The connecting face of the first part 1212 includes a plurality of engagement formations. In the example shown, the first part includes two engagement formations 1216, 1217; however, it will be appreciated that any number of engagement formations may be provided. Each engagement formation 1216, 1217 is substantially annular and includes a plurality of sectors, in this example, three sectors X, Y, Z. The engagement formations 1216, 1217 are concentric about the longitudinal axis I. An upper surface of each sector of each engagement formation 1216, 1217 is a partial helicoid. Each engagement formation is substantially trapezoidal in cross-section.

The first part 1212 includes a plurality of receiving formations 1218, 1219, 1220 which are positioned adjacent the engagement formations 1216, 1217. Each receiving formation 1218, 1219, 1220 is substantially annular and includes a plurality of sectors X, Y, Z. A lower surface of each sector X, Y, Z of each receiving formation is a partial helicoid. Each receiving formation 1218, 1219, 1220 is substantially trapezoidal in cross section, so as to enable engagement with an engagement formation of the second part 1212'.

The second 1212' part is not identical to the first part 1212. The second part 1212' has an inverted substantially frusto-conical connecting face which extends generally transversely to the longitudinal axis F. The second part 1212' is the female part of the connector 1210. The second part 1212' includes three engagement formations 1221, 1222, 1223, each of which is substantially annular and includes three sectors X, Y, Z. The engagement formations 1221-1223 of the second part 1212' are engageable with the receiving formations 1218-1220 of the first part 1212, and are substantially trapezoidal in cross-section. The second part 1212' also includes two receiving formations 1224, 1225 which are engageable with the engagement formations 1216, 1217 of the first part 1212. Each of the receiving formations is substantially annular and includes three sectors X, Y, Z. Each sector X, Y, Z of each receiving formation 1224, 1225 has a lower surface which is a partial helicoid.

Since the engagement formations 1216, 1217, 1221, 1222, 1223 and the receiving formations 1218, 1219, 1220, 1224, 1225 of the connector 1210 include three sectors, the connector 1210 is a three pick up point, 120° rotation connector 1210. The frusto-conical arrangement of the two parts 1212, 1212' aids initial alignment of the longitudinal axes I, r, and aids engagement of the two parts 1212, 1212'. This type of connector may be particularly useful in hose connectors or fixings for fence posts, for example, where positioning of the two objects to be connected together is important.

It will be appreciated that the two connecting faces of the respective parts 1212, 1212' may be conical, rather than frusto-conical, and that any number of engagement formations and receiving formations may be provided.

Figure 38:
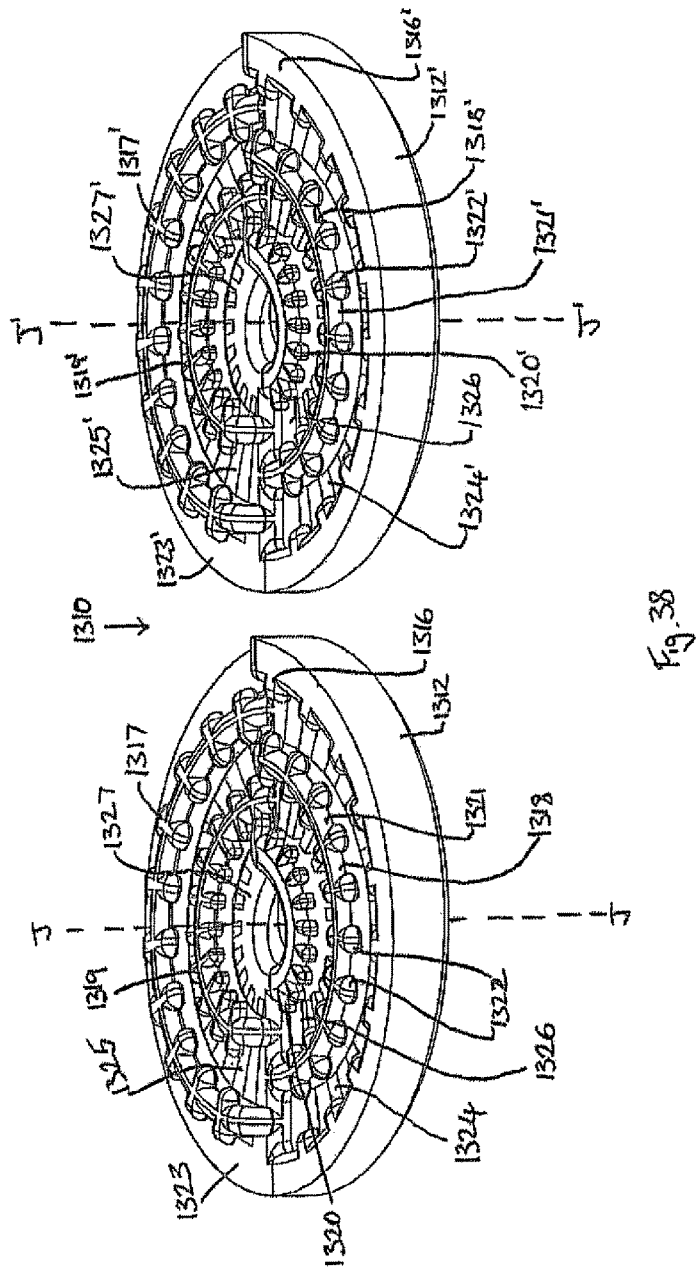
FIG. 38 is a perspective view of a twelfth embodiment of the device of the present invention.
Figure 39:
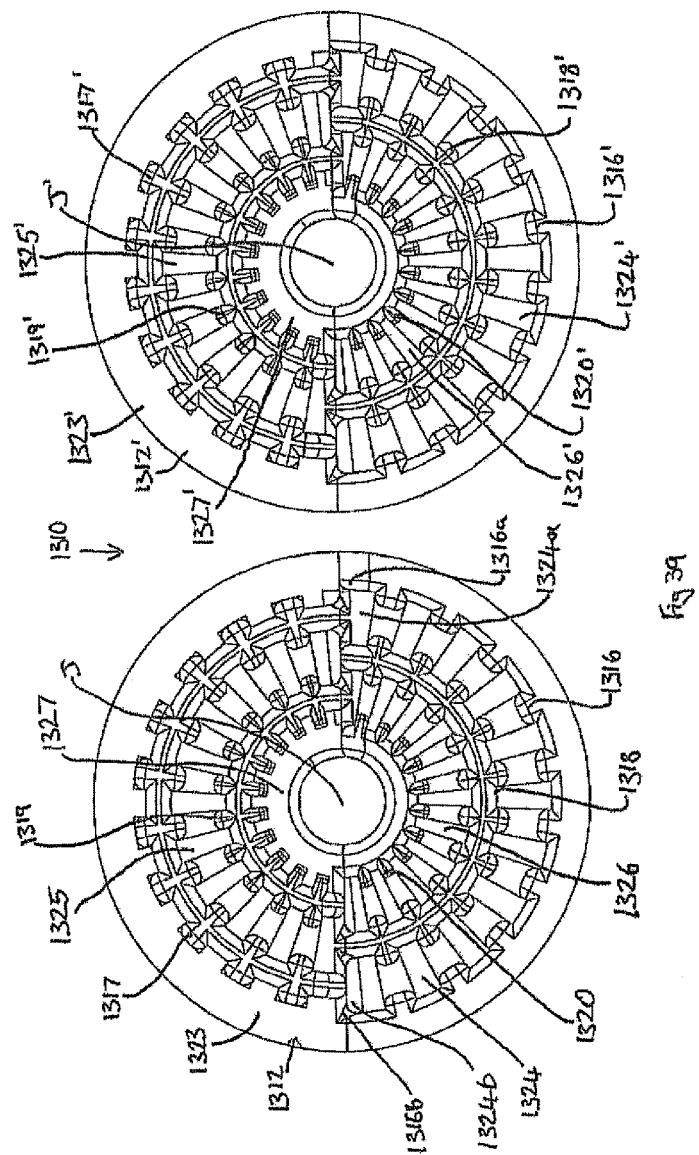
FIG. 39 is a plan view of the device of FIG. 38.
Figure 40:
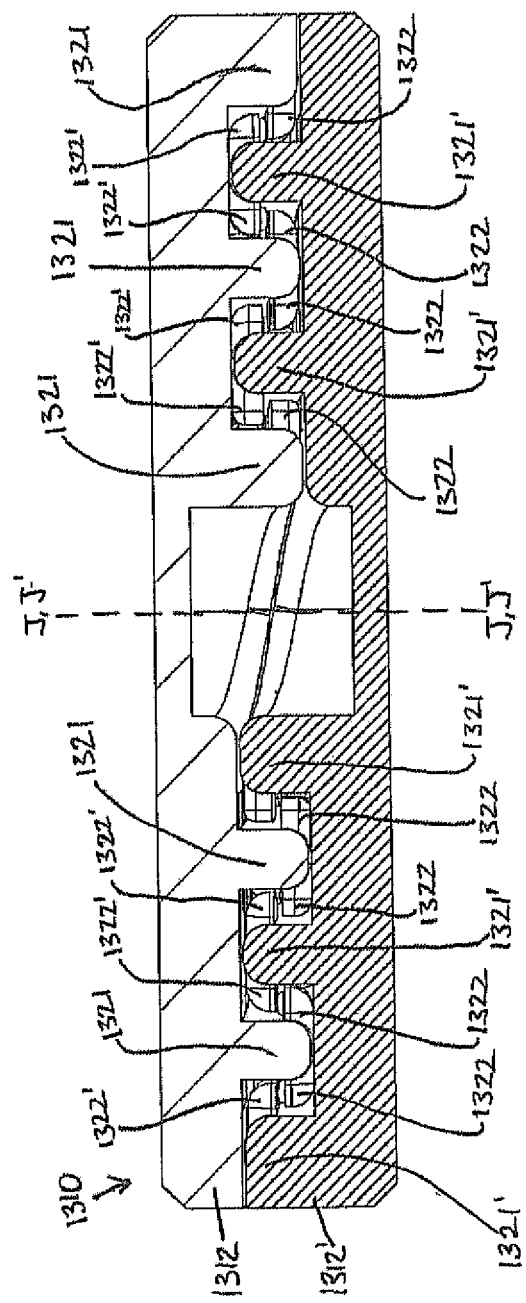
FIG. 40 is a cross-sectional view of two parts of the device connected together.

A further embodiment of the invention is shown at 1310 in FIGS. 38 to 40.

The connector 1310 has two parts 1312, 1312' which are identical to one another. Each part 1312, 1312' has a respective longitudinal axis J, J' and a connecting face which extends generally transversely relative to the respective longitudinal axis J, J'. The connector 1310 is similar to that shown in FIGS. 1 to 3 in that the connector is a 180° rotation, single pick up point connector.

Each part includes a plurality of engagement formations 1316, 1317, 1318, 1319, 1320, 1316', 1317', 1318', 1319', 1320'. Whilst in the present example, each part 1312, 1312' includes five engagement formations, it will be appreciated that any number of engagement formations may be provided as required. Each engagement formation 1316-1320, 1316'-1320' is substantially semi-annular and has a first end and a second end. The first end 1316a and the second end 1316b of engagement formation 1316 are illustrated in FIG. 38. The first end of each successive engagement formation 1316-1320, 1316'-1320' is positioned adjacent the second end of the adjacent engagement formation 1316-1320, 1316'-1320', and is spaced radially therefrom. Thus, the positions of the engagement formations 1316-1320, 1316'-1320' alternate between sides of the connecting face of the respective part 1312, 1312'.

Each engagement formation has a substantially helicoidal upper surface such that the first end of each engagement formation 1316-1320, 1316'-1320' extends axially outwardly from a base of the connecting face of the respective part 1312, 1312' more than the second end of the engagement formation 1316-1320, 1316'-1320'. Alternatively, it will be appreciated that the base of the connecting face, may he substantially helicoidal, and each engagement formation 1316-1320, 1316'-1320' may be the same height along its entire length between the first end and the second end, such that the upper surface of the engagement formation is substantially helicoidal. Each engagement formation describes a partial helicoid.

Each engagement formation 1316-1320, 1316'-1320' includes a body 1321, 1321' which extends substantially axially upwardly from the connecting face of the respective part 1312, 1312'. Each body is generally semi-circular in cross-section. Each engagement formation 1316-1320, 1316'-1320 also includes a plurality of projections 1322, 1322' which extend radially from an upper part of each body 1321, 1321'. The projections 1322, 1322' are circumferentially spaced along the respective engagement formation 1316-1320, 1316'-1320'. The outermost engagement formation 1316, 1316' has projections 1322, 1322' which extend only radially outwardly from the body 1321, 1321' of the engagement formation 1316, 1316' and the innermost engagement formation 1320, 1320' has projections 1322, 1322' which extend only radially inwardly from the body of the engagement formation 1320, 1320'. The remaining engagement formations 1317-1319, 1317'-1319' have projections which extend radially outwardly and projections which extend radially inwardly, such that each of the engagement formations 1317-1319, 1317'-1319 has a T-shaped cross section at each point where the projections 1322, 1322' extend from the respective body 1321, 1321'.

In the example shown, the bodies 1321, 1321' and the projections 1322, 1322' are curved, but it will be appreciated that any shape may be selected as appropriate.

Each part 1312, 1312' includes a plurality of receiving formations 1323, 1324, 1325, 1326, 1327, 1323', 1324', 1325', 1326', 1327'. Each receiving formation 1323-1327, 1323'-1327 has a first end and a second end, as illustrated with respect to the receiving formation 1324 of the first part 1312 in FIG. 38. Each receiving formation 1323-1327, 1323'-1327 is substantially semi-annular and has a substantially helicoidal lower surface, for receiving a corresponding receiving formation of the other part 1312, 1312' of the connector 1310. The first end of each receiving formation 1323-1327, 1323'-1327' is positioned adjacent the second end of an engagement formation 1316-1320, 1316'-1320' which is radially aligned with the receiving formation 1323-1327, 1323'-1327'. Thus, considering an annulus of the connecting face, half of the annulus is an engagement formation 1316-1320, 1316'-1320' and the other half of the annulus is a corresponding receiving formation 1323-1327, 1323'-1327'.

In use, the two parts 1312, 1312' of the connector 1310 are positioned such that their axes J, J' are aligned. The first end of each engagement formation 1316-1320, 1316'-1320 is positioned adjacent the first end of the corresponding receiving formation 1323-1327, 1323'-1327' of the opposite part 1312, 1312', and the two parts 1312, 1312' are rotated relative to one another through 180°, until the first end of each engagement formation 1316-1320, 1316'-1320' is positioned circumferentially adjacent the corresponding engagement formation 1316-1320, 1316'-1320' of the opposite part 1312, 1312' of the connector 1310. In this configuration, the two parts 1312, 1312' are fully inter-engaged. Since the projections 1322, 1322' of the engagement formations 1316-1320, 1316'-1320' are positioned towards an upper end of the respective body 1321, 1321', there is a clearance between an underside of each projection 1322, 1322' and the respective connecting face. The radially extending projections 1322, 1322' of each engagement formation 1316-1320, 1316'-1320' are able to slide beneath the projections 1322, 1322' of the radially adjacent engagement formations 1316-1320, 1316'-1320' of the opposite part 1312, 1312'.

The provision of surfaces which are discontinuous, by virtue of the radially extending projections, enables the material used in the manufacture of such a connector to be reduced, therefore the cost of production and the weight of the connector are both reduced. The production tool required to manufacture such a connector is simpler than that required for the other embodiments of the invention, since the tool itself need not be helicoidal. The connecting faces of the connector may be aesthetically pleasing owing to the configuration of the bodies 1321, 1321' and the projections 1322, 1322'. It is also possible to control friction and torque acting between the two parts 1312, 1312' of the connector 1310 by virtue of the use of an underside of each engagement formation 1316-1320, 1316'-1320' as well as the upper surface which engages the lower surface of the corresponding receiving formation 1323-1327, 1323'-1327'.

Such a connector may be particularly useful in hanging pictures, decorations or electrical fittings to upright surfaces, such as walls.

Figure 43:
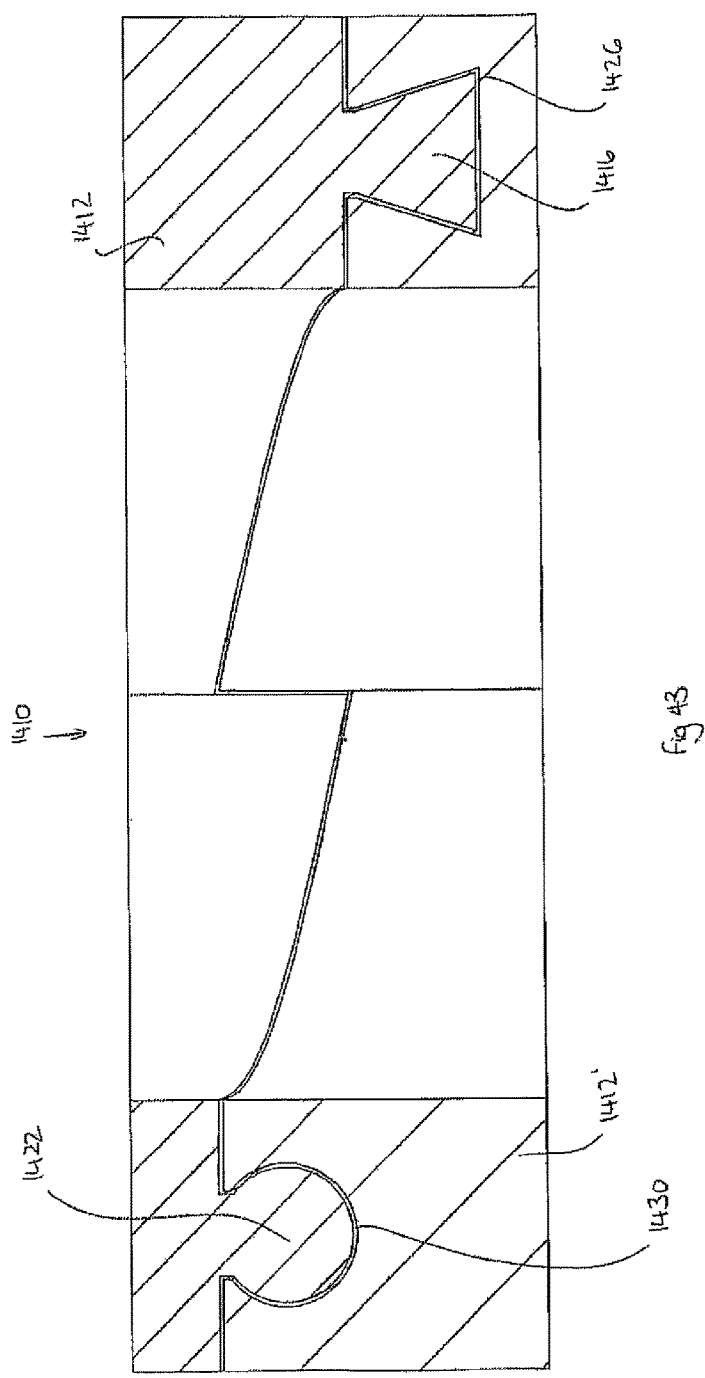
FIG. 43 is a cross-sectional view of two parts of the device connected together.

A further embodiment of the invention is shown in FIGS. 41 to 43. The connector 1410 is a 90° rotation connector, but has only a single pick-up point. A first part 1412 of the connector 1410 has four engagement formations 1416, 1418, 1420, 1422, which extend upwardly from a connecting face of the first part 1412. Each engagement formation has a different cross-sectional shape. Engagement formation 1416 is substantially T-shaped in cross section, engagement formation 1418 is substantially hexagonal and has an apex on its upper surface, engagement formation 1420 is substantially trapezoidal in cross-section, and engagement formation 1422 is substantially circular in cross section.

A second part 1412' of the connector 1410 has four corresponding receiving formations 1424, 1426, 1428, 1430, each of which corresponds with one of the engagement formations 1416, 1418, 1420, 1422 of the first part 1412. Since the engagement formations 1416-1422 and the receiving formations 1424-1430 have corresponding cross sections, it is not possible to engage the first part 1412 with the second part 1412' unless each engagement formation 1416-1422 is positioned adjacent the corresponding receiving formation 1424-1430 of the second part 1412'.

It will be appreciated that additional or alternative engagement formations and receiving formations may be provided, and any suitable cross-sectional shape may be provided. Concentric engagement formations and receiving formations may be provided as required to strengthen the connection between the parts 1412, 1412'.

This embodiment of the invention may be used as a lock, or as an educational toy, for example.

The connector may be used as a clamp, wherein an object may be clamped between two parts of the connector. For example, a relatively thin material may be inserted between the two parts of the connector, such that interengagement of the two parts of the connector is still possible.

Figure 44:
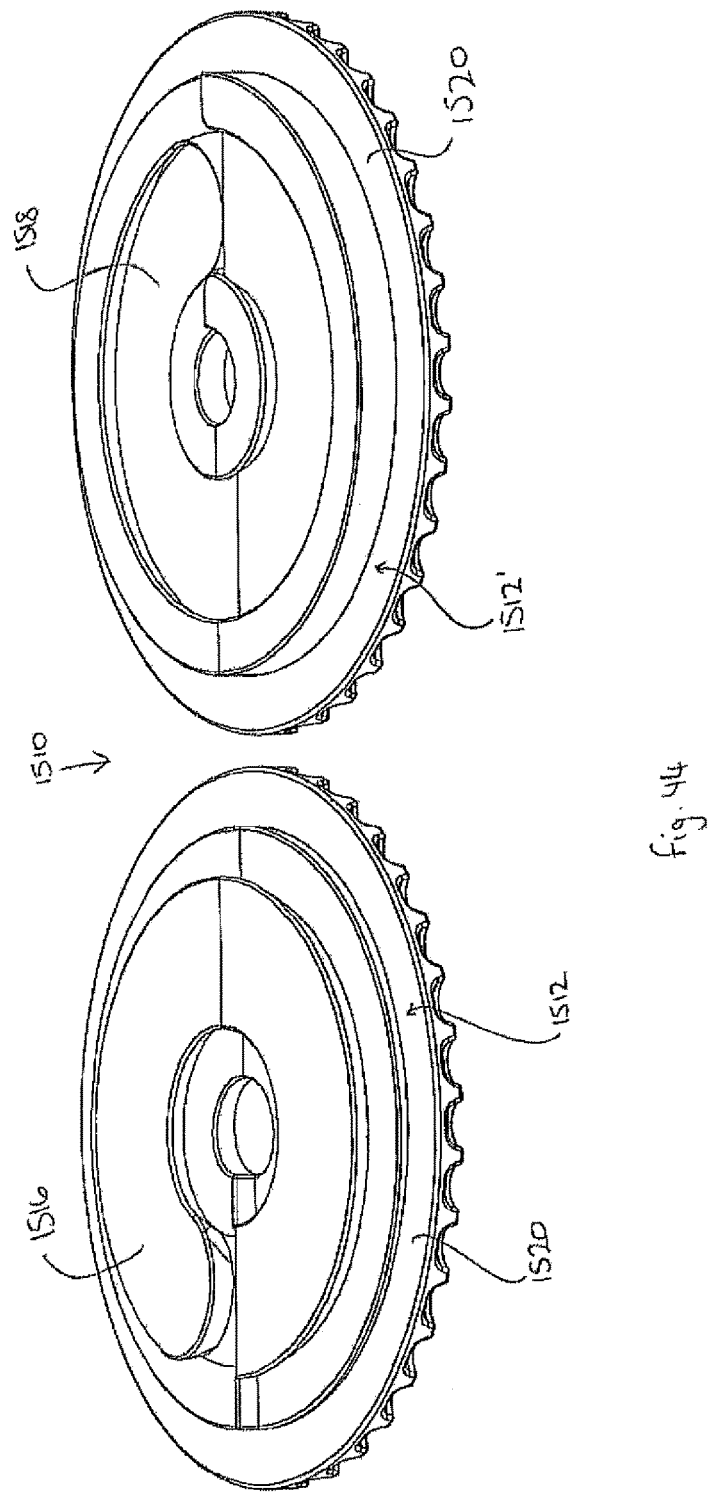
FIG. 44 is a perspective view of a fourteenth embodiment of the invention.

An example of a clamp is shown in FIG. 44. A clamp 1510 has two parts 1512, 1512'. The first part 1512 has an engagement formation 1516 including a substantially helicoidal upper surface. The second part 1512' has a receiving formation 1518 for engaging with the engagement formation 1516 of the first part 1512. Each part 1512, 1512' includes a substantially annular flange 1520 between which objects may be clamped. For example, the clamp may be used as a paper fastener, with the engagement formation engaging with the receiving formation, through apertures in the papers to be fastened together, such that the flanges 1420 abut the outermost sheets of paper, and hold the papers together.

Figure 45:
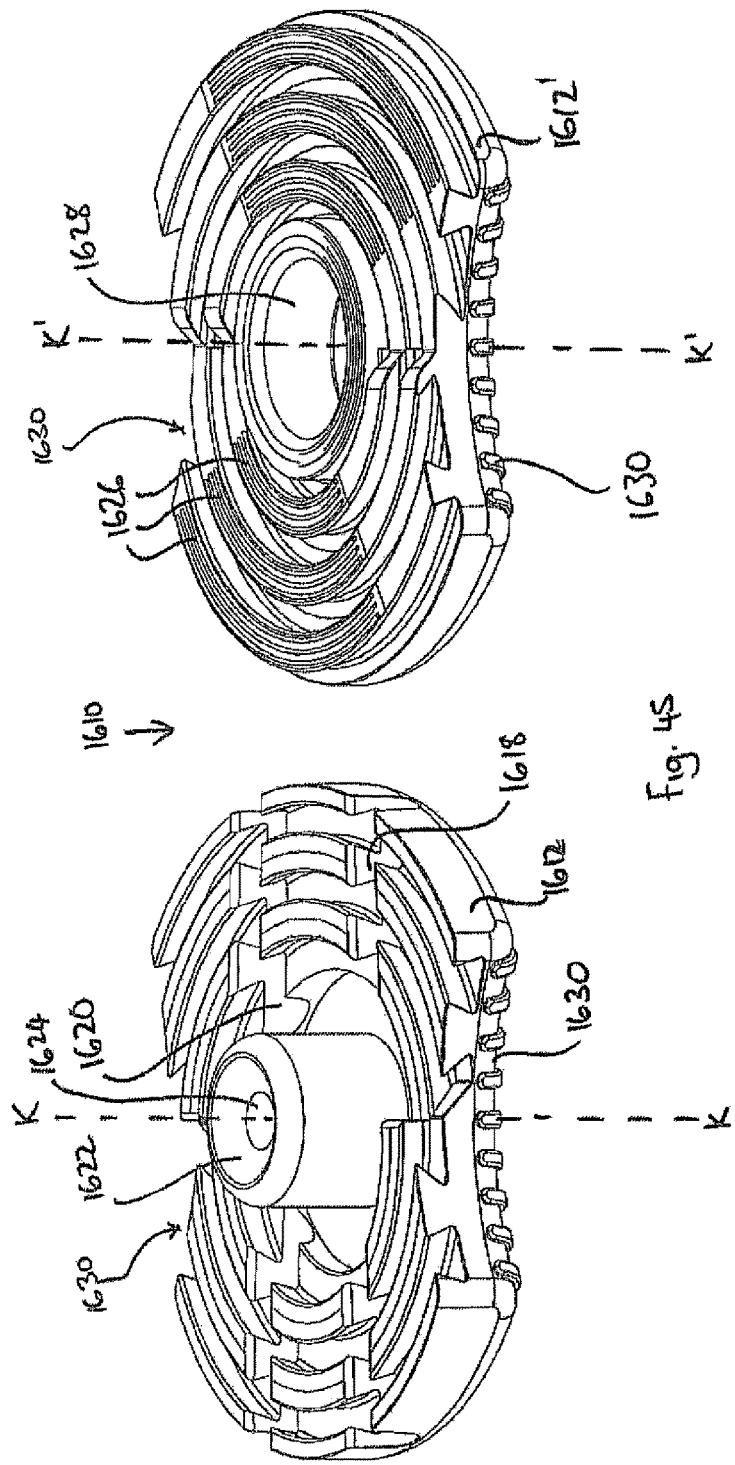
FIG. 45 Is a perspective view of a fifteenth embodiment of the invention.

A further embodiment of the invention is shown in FIG. 45. A connector 1610 has two parts 1612, 1612'. The first part 1612 has a plurality of engagement formations and receiving formations, similar to other embodiments of the invention described above. In addition, the first part includes a pair of channels 1618, 1620 each of which extends across a connecting face of the first part 1612. Items to be clamped or held in position, for example electrical cables, are receivable in the channels 1618, 1618. The first part 1612 also includes a central spigot 1622 which extends along a longitudinal axis K. An aperture 1624 is provided in the spigot 1622, for receiving an item such as an electrical cable.

The second part 1612' of the connector 1610 has a plurality of engagement formations and receiving formations which are engageable with the engagement formations and receiving formations of the first part 1612. The second part 1612' is engageable with the first part 1612 so as to hold items received in the channels 1618, 1620 of the first part in position. The engagement formations of the second part 1612' includes grip portions 1626 on upper surfaces of the engagement formations, to grip the items received in the channels 1618, 1620.

The second part 1612' includes a central aperture 1628 which extends along a substantially longitudinal axis 1628 of the second part 1612', in which the spigot 1622 of the first part 1612 is receivable.

Each of the first part 1612 and the second part 1612' includes a pair of diametrically opposed gripping formations 1630, which assist manual manipulation of the two parts 1612, 1612', particularly for engagement and disengagement of the two parts 1612, 1612'. The gripping formations 1630 include indents, and a plurality of ridges which increase friction between each part 1612, 1612' and a user's hand or a tool which is used to engage and disengage the two parts 1612, 1612'.

Figure 46:
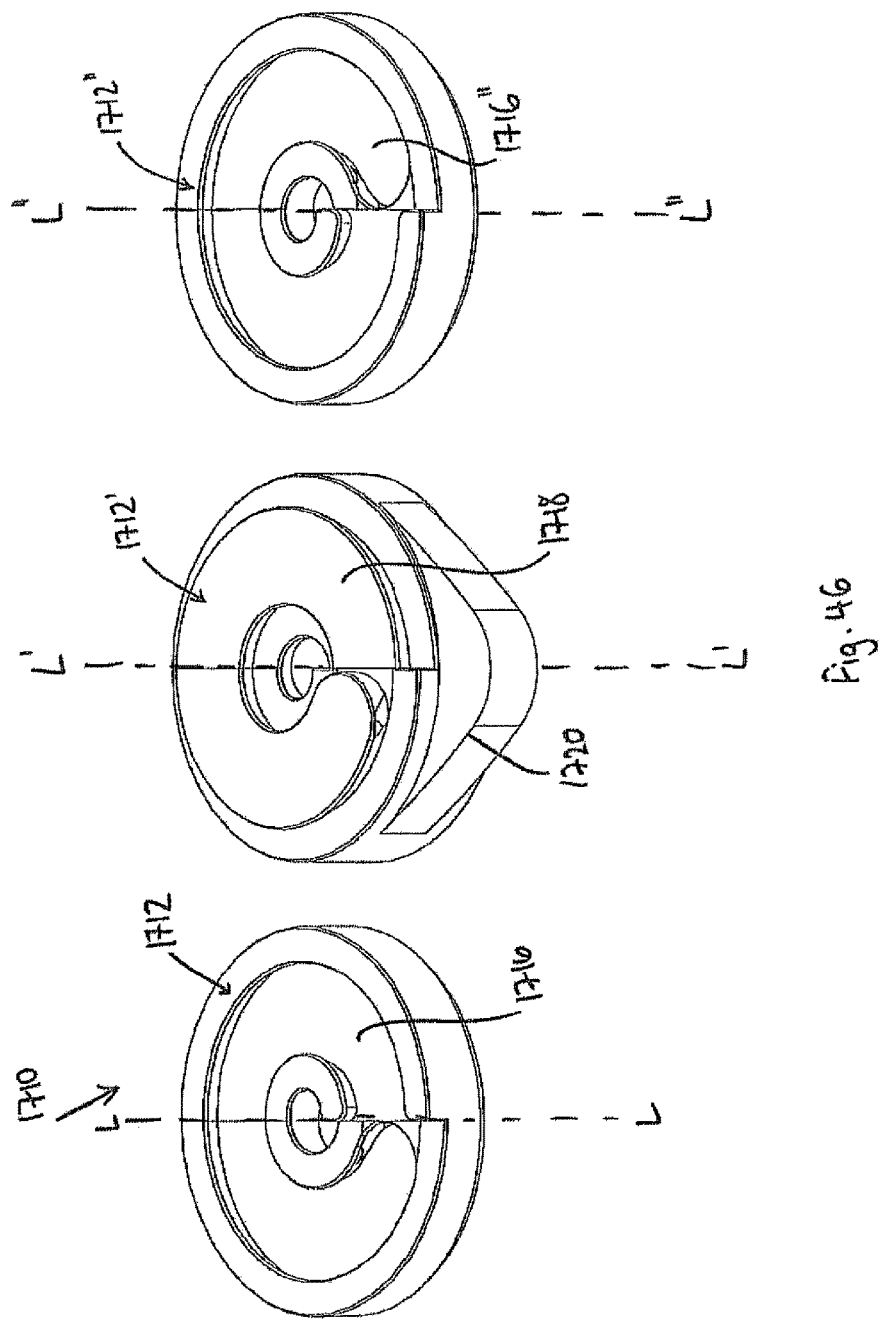
FIG. 46 is a perspective view of a sixteenth embodiment of the invention.

A further embodiment of the invention is shown in FIGS. 46 and 47. A connector 1710 has three parts 1712, 1712', 1712". The first part 1712 and the third part 1712" are similar, and both inter-engage with an intermediate part 1712'.

Each of the first part 1712 and third part 1712" includes a receiving formation 1716, 1716" which has a substantially helicoidal lower surface, and is engageable with an engagement formation 1718 of the intermediate part 1712'. The receiving formations 1716, 1716' extend in opposite directions.

The intermediate part 1712' has two connecting faces, each of which extends substantially transversely to a longitudinal axis L' of the intermediate part 1712'. Each connecting face includes an engagement formation 1718. The intermediate part 1712' also includes a projection 1720 which extends generally radially outwardly from the intermediate part 1712'.

The first part 1712 and the third part 1712" are attachable to items to be connected together. The intermediate part 1712' is then engageable with both the first part 1712 and the third part 1712", by virtue of the engagement formations 1718 engaging with the receiving formations of the first part 1712 and the third part 1712". A user may grasp the projection 1720 and rotate the intermediate part 1712' relative to the first part 1712 and the third part 1712", such that the items to which the first part 1712 and the third part 1712" are attached do not have to rotate relative to one another to achieve connection of the two items. The fact that the engagement formations 1718 extend in opposite senses and the receiving formations of the first part 1712 and the third part 1712" extend in opposite senses enables such a connection to occur.

It will be appreciated that the engagement formations 1718 may be provided on the first part 1712 and the third part 1712" and the receiving formations 1716, 1716" may be provided on the intermediate part 1712'. Any number of engagement formations and receiving formations may be provided, as required.

Each part of each connector may be engageable with a plurality of other parts. Such a connector is shown in FIG. 48. The connector includes a first part 1812 which has a receiving formation 1820, as described above, and a plurality of secondary parts, 1814, 1816, 1818, each including at least one engagement formation which is engageable with the receiving part 1820 first part 1812. Each secondary part 1814, 1816, 1818 may be substantially arcuate, such that the secondary parts 1814, 1816, 1818 are engageable individually with the first part 1812 of the connector 1810 to complete a full circle. Additionally, or alternatively, each secondary part may be substantially annular, such that a plurality of secondary parts may be individually engaged with the first part 1812, such that the secondary parts 1814, 1816, 1818 are radially spaced relative to one another.

Alternatively, the connector may include a first part of the connector which has a plurality of engagement formations and receiving formations, as described above, and a plurality of secondary parts, each including at least one receiving part which is suitable for receiving an engagement formation of the first part. It will be appreciated that any number of engagement formations and receiving formations and any number of secondary parts may be provided.

The engagement formations of a connector may be hollow, such that the end face of the or each engagement formation is an opening, such that one part of the connector can "self-tap" into a relatively soft material, for example plasterboard. Such a connector is shown in FIGS. 49 and 50. The connector 1910 includes two parts 1912, 1912', and is similar in most respects to the connector 610, except that each engagement formation of the first part 1912 is substantially hollow. Each engagement formation of the first part 1912 includes a tapping formation 1920 at a first end of the respective engagement formation. Each tapping formation 1920 is preferably a point which is able to dig into a relatively soft material. The engagement formations of the first part 1912 are then able to dig into the material, by following the groove made by the respective tapping formation 1920.

The second part 1912' is then engageable with the first part 1912, as shown in FIG. 51, by virtue of the engagement formations of each part 1912, 1912' engaging with the corresponding engagement formations and receiving formations of the other part 1912, 1912' as described above.

This connector provides a strong connection, as a large surface area of the connector is frictionally engaged with the relatively soft material, yet the connector does not penetrate deeply into the material. Furthermore, the connector 1910 does not extend very far, or at all, outwardly from the surface into which it has been inserted.

The connectors 10, 110, 210, 310, 410, 610, 710, 810, 910, 1010, 1110, 1210, 1310, 1410, 1510, 1610, 1710, 1810, 1910, may be any size appropriate to the objects being connected together. The sizes of connectors of the kind described herein may range between nanoscale and of the order of meters. Large scale connectors of the kind described herein may be used in construction of buildings and the like. Where certain embodiments of the invention have been described as being useful for particular applications, this is not intended to be limiting, since any of the embodiments may be used in any application, as is deemed appropriate.

It will be appreciated that full engagement may not be required in all applications, and that full engagement may be inhibited, as a safety feature, or to enable checking of the connection, with full engagement being accomplishable by certain trained or qualified personnel, for example. Use of a specific tool to effect engagement may be necessary.

Each part of each connector 10, 110, 210, 310, 410, 610, 710, 810, 910, 1010, 1110, 1210, 1310, 1410, 1510, 1610, 1710, 1810, 1910 may be attachable to an object to be attached to another object. However, one or both parts of each connector 10, 110, 210, 310, 410, 610, 710, 810, 910, 1010, 1110, 1210, 1310, 1410, 1510, 1610, 1710, 1810 1910, may be integrally formed with an object which is to be connected to another object.

It will be understood that more than one connector may be used, in order to connect more than two items together, for example to connect together a plurality of items which overlie one another, so as to "stack" a plurality of items together. The longitudinal axes of the connectors are substantially aligned in such an arrangement. The connector 1710 is an example of a connector which may enable such stacking of items.

The connectors described above and shown in the accompanying drawings have engagement formations and receiving formations having substantially uniform cross-sections. Alternatively, one or more engagement formations and/or receiving formations may include "cut away" portions, such that the cross-section of the engagement formations/receiving formations varies along its length. Additionally, or alternatively one or more engagement formations and/or one or more receiving formations may include a projection or enlarged portion to increase frictional engagement between two parts of the connector.

In the examples shown and described above, both circumferential walls of each engagement formations are engaged by circumferential walls of adjacent receiving formations of the other part of the connector (although this may not be the case for an innermost or outermost engagement formations). Providing one or more cut away portions in an engagement formation enables the engagement formation to engage only one circumferential wall of a receiving formation of the other part of the connector. A cut away portion may extend along part of or the entire length of an engagement formation.

The examples of the connectors shown permit relative rotation of the two parts through up to 360°. However, rotation through more than 360° may be achieved by enabling one or more engagement formations of one or more parts of the connector to penetrate or dig into an engagement formation of the other part of the connector.

Each part of each connector may be manufactured from any suitable material, and each part of each connector may be manufactured from a different material. For example, one part of a connector of the type described above may be manufactured from a material which is softer than the material from which the other part is made. The softer material (which may, for example, be an elastomeric material) may be pliable, so as to more easily and more closely inter-engage with the other part.

The geometry of each embodiment of the device may be generated by the application of a formula:

$$H \times S = P$$

wherein:
H=the height of the engagement formation (from a base of the connecting face);
S=the number of segments (i.e. a division of 360 degrees); and
P=the pitch of the helicoid.

The selection of a particular geometry may be driven by H, S or P.

A base part of each part of each device may be any shape as is appropriate to the application in which the device is to be used. For example, the base from which the connecting face of each part extends may be flat, frusto-conical, or substantially helicoidal.

It will be appreciated that there are alternative methods for generating connector geometries.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A connector device including a first part and a second part which are inter-engageable with one another,
   the first part having a first longitudinal axis and a connecting face which extends substantially transversely to the first longitudinal axis and includes an engagement formation which extends substantially axially, and
   the second part having a second longitudinal axis and a connecting face which extends substantially transversely to the second longitudinal axis and includes a receiving formation which extends substantially axially and in which the engagement formation of the first part is receivable,
   wherein each of the engagement formation and the receiving formation includes at least one substantially helicoidal and non-spiral surface which extends at least partially around the longitudinal axis of the respective part of the device and which has a first end and a second end, such that rotation of the two parts relative to one another about the longitudinal axes, when the two parts are substantially co-axially aligned, such that the connecting faces of the two parts face one another in a substantially axial direction, causes positive engagement of the engagement formation of the first part with the corresponding receiving formation of the second part, which inhibits relative axial movement of the first and second parts,
   wherein each engagement formation includes an inner circumferential wall, and an outer circumferential wall, wherein the inner and outer circumferential walls subtend an acute angle to an upper surface of the engagement formation, such that when the two parts of the connector are connected together, the engagement formations are dovetailed or tessellated, and
   wherein the second end of each substantially helicoidal and non-spiral surface terminates at its first end, or terminates at a first end of another of said at least one substantially helicoidal and non-spiral surface, with a junction there between forming an axially extending end face.

2. The connector device according to claim 1, wherein the first part includes a plurality of engagement formations, each of which includes a surface which is at least partially helicoidal, wherein rotation of the two parts of the device relative to one another effects substantially simultaneous engagement of each of at least two engagement formations with a corresponding receiving formation.

3. The connector device according to claim 1, wherein the second part includes at least one engagement formation and the first part includes at least one receiving formation in which a corresponding engagement formation of the second part is receivable.

4. The connector device according with claim 1, wherein the or each receiving formation of the first part is a part of an engagement formation of the first part, and the or each receiving formation of the second part is part of an engagement formation of the second part of the device.

5. The connector device according to claim 1, wherein each part of the device includes multiple pick-up points, such that the two parts are orientable in a plurality of initial positions relative to one another, to enable relative rotation of the two parts to effect inter-engagement of the two parts of the device.

6. The connector device according to claim 1, wherein each engagement formation includes a plurality of sectors, each of which includes a substantially helicoidal surface.

7. The connector device according to claim 1, wherein the angle through which the two parts of the device are rotatable relative to one another to inter-engage the two parts is less than or equal to 360 degrees.

8. The connector device according to claim 7, wherein the angle through which the two parts of the device are rotatable relative to one another, to inter-engage the two parts is less than or equal to 180 degrees.

9. The connector device according to claim 8, wherein the angle through which the two parts of the device are rotatable relative to one another, to inter-engage the two parts is less than or equal to 90 degrees.

10. The connector device according to claim 1, wherein a distance moved by the two parts of the device relative to one another in a direction which is substantially parallel with the longitudinal axes during the engagement of the or each engagement formations of the first part with the or each corresponding receiving formation of the second part is less than or equal to a longitudinal distance between an upper part of the substantially helicoidal surface of at least one of the engagement formations, at the first end of the helicoidal surface, and an upper part of the same helicoidal surface at the second end thereof.

11. The connector device according to claim 1, wherein each part includes an electrically conductive element, the electrically conductive elements of the two parts being in contact with one another when the two parts of the device are connected together.

12. The connector device according to claim 1, wherein each part includes an electrically conductive element, the electrically conductive elements of the two parts being connectable to one another when the two parts are connected together.

13. The connector device according to claim 1, wherein at least one of the first part and the second part is integral with an item which is to be attached to another item.

14. The connector device according to claim 1, including a locking formation for locking the two parts in engagement with one another.

15. The connector device according to claim 1, including a locking device which is engageable with at least one of the parts of the device, to lock the parts of the device is engagement with one another.

16. A connector device including a first part and a second part which are inter-engageable with one another,
   the first part having a first longitudinal axis and a connecting face which extends substantially transversely to the first longitudinal axis and includes at least one engagement formation which extends substantially axially and which is connected along its length to the connecting face, and the second part having a second longitudinal axis and a connecting face which extends substantially transversely to the second longitudinal axis and includes at least one receiving formation which extends substantially axially, wherein the or a respective one of the engagement formations is receivable in the or a respective one of the receiving formations, wherein each of the at least one engagement formation and the at least one receiving formation includes a substantially helicoidal and non-spiral surface which extends at least partially around the longitudinal axis of the respective part of the device, and wherein each of the at least one engagement formation and each of the at least one receiving formation has a head portion and a tail portion, and wherein the head portion of the at least one engagement formation abuts the tail portion of the or an adjacent engagement formation and the head portion of the at least one receiving formation abuts the tail portion of the or an adjacent receiving formation, and wherein the each of the at least one engagement formation and the at least one receiving formation forms an arc of a circle when projected onto a plane normal to the longitudinal axis of the respective part of the device, wherein rotation of the two parts relative to one another about the longitudinal axes, when the two parts are substantially co-axially aligned, such that the connecting faces of the two parts face one another in a substantially axial direction, causes positive engagement of the at least one engagement formation of the first part with the corresponding at least one receiving formation of the second part, which inhibits relative axial movement of the first and second parts; and wherein the second end of each substantially helicoidal and non-spiral surface terminates at its first end, or terminates at a first end of another of said at least one substantially helicoidal and non-spiral surface, with a junction there between forming an axially extending end face.

17. A connector device including a first part and a second part which are inter-engageable with one another, the first part having a first longitudinal axis and a connecting face which extends substantially transversely to the first longitudinal axis and includes a plurality of engagement formations connected along their lengths to the connecting face and a plurality of receiving formations each of which extends substantially axially, and the second part having a second longitudinal axis and a connecting face which extends substantially transversely to the second longitudinal axis and includes a plurality of engagement formations and a plurality of receiving formations each of which extends substantially axially and wherein the engagement formations of the first part are receivable in the receiving formations of the second part and wherein the engagement formations of the second part are receivable in the receiving formations of the first part, wherein each of the engagement formations and the receiving formations includes a substantially helicoidal and non-spiral surface which extends at least partially around the longitudinal axis of the respective part of the device, and wherein the each of the engagement formations and the receiving formations forms an arc of a circle when projected onto a plane normal to the longitudinal axis of the respective part of the device, wherein for each part of the connector device the engagement formations alternate in position with the receiving formations, wherein rotation of the two parts relative to one another about the longitudinal axes, when the two parts are substantially co-axially aligned, such that the connecting faces of the two parts face one another in a substantially axial direction, causes positive engagement of the engagement formation of the first part with the corresponding receiving formation of the second part, which inhibits relative axial movement of the first and second parts; and wherein the second end of each substantially helicoidal and non-spiral surface terminates at its first end, or terminates at a first end of another of said at least one substantially helicoidal and non-spiral surface, with a junction there between forming an axially extending end face.

* * * * *